(12) United States Patent
Hisano et al.

(10) Patent No.: US 10,778,770 B2
(45) Date of Patent: Sep. 15, 2020

(54) NETWORK SYSTEM, FUNCTION SETTING METHOD, AND FUNCTION SETTING PROGRAM

(71) Applicant: OMRON Corporation, Kyoto-shi, Kyoto (JP)

(72) Inventors: Atsushi Hisano, Kameoka (JP); Ryota Yamada, Tokyo (JP); Tanichi Ando, Komaki (JP); Yusuke Yamaji, Ikoma (JP); Tetsuji Yamato, Kyoto (JP); Koji Takizawa, Kyoto (JP)

(73) Assignee: OMRON CORPORATION, Kyoto-shi (JP)

( * ) Notice: Subject to any disclaimer, the term of this patent is extended or adjusted under 35 U.S.C. 154(b) by 85 days.

(21) Appl. No.: 16/106,552

(22) Filed: Aug. 21, 2018

(65) Prior Publication Data
US 2018/0359319 A1  Dec. 13, 2018

Related U.S. Application Data

(63) Continuation of application No. PCT/JP2017/003731, filed on Feb. 2, 2017.

(30) Foreign Application Priority Data

Mar. 11, 2016  (JP) ................... 2016-048624

(51) Int. Cl.
*G06F 15/16* (2006.01)
*H04L 29/08* (2006.01)
(Continued)

(52) U.S. Cl.
CPC .... *H04L 67/1097* (2013.01); *G08B 13/19608* (2013.01); *G08B 13/19656* (2013.01);
(Continued)

(58) Field of Classification Search
CPC ............. H04L 67/1097; H04L 67/125; G08B 13/19608; G08B 13/19656; G08B 25/08; H04Q 9/00; Y02P 90/02
See application file for complete search history.

(56) References Cited

U.S. PATENT DOCUMENTS 4,715,147 A * 12/1987 Millay ................. B23Q 11/00
 451/28
2004/0263625 A1  12/2004 Ishigami et al.
(Continued)

FOREIGN PATENT DOCUMENTS

JP  S59-036809 A  2/1984
JP  H2-110601 A  4/1990
(Continued)

OTHER PUBLICATIONS

Vivek K. Singh et al., "Coopetitive multi-camera surveillance using model predictive control", Machine Vision and Applications, Jul. 25, 2007, pp. 375-393, vol. 19, issue 5-6, Springer; Relevance is indicated in the extended European search report dated Oct. 4, 2019.
(Continued)

*Primary Examiner* — Richard G Keehn
(74) *Attorney, Agent, or Firm* — Metrolex IP Law Group, PLLC

(57) ABSTRACT

In a network system, an own subsystem recognition unit is provided in each of subsystems, and holds a state and a function of the own subsystem. A shared information communication unit acquires states and functions of the subsystems. An objective acceptance unit accepts a setting of a target state. A shared storage unit stores knowledge regarding a combination structure of functions of the respective subsystems necessary for realizing the target state. A structure setting unit automatically sets a combination structure of functions of the respective subsystems, including determining whether the function of each of the subsystems is to
(Continued)

be activated, based on the target state, states and functions of the subsystems, and the knowledge regarding a combination structure. A role determination unit determines functions to be executed by the respective subsystems based on the automatically set combination structure. A role notification unit notifies the subsystems of the determined respective functions.

18 Claims, 36 Drawing Sheets

(51) Int. Cl.
    *G08B 13/196*     (2006.01)
    *H04Q 9/00*     (2006.01)
    *G08B 25/08*     (2006.01)

(52) U.S. Cl.
    CPC ............ *G08B 25/08* (2013.01); *H04L 67/125* (2013.01); *H04Q 9/00* (2013.01); *Y02P 90/02* (2015.11)

(56) References Cited

U.S. PATENT DOCUMENTS

| | | | | |
|---|---|---|---|---|
| 2011/0126059 | A1* | 5/2011 | Klein | G06F 11/3006 714/47.1 |
| 2013/0042003 | A1* | 2/2013 | Franco | H04L 67/1097 709/226 |
| 2015/0076371 | A1* | 3/2015 | Huang | H01L 21/67276 250/492.21 |
| 2015/0254554 | A1 | 9/2015 | Kato | |
| 2016/0179642 | A1* | 6/2016 | Cai | G06F 11/2033 714/4.12 |
| 2016/0224392 | A1* | 8/2016 | Clarke | G06F 9/505 |
| 2016/0335324 | A1* | 11/2016 | Caulfield | G06F 16/29 |
| 2016/0371134 | A1* | 12/2016 | Raghavendra | G06F 11/3055 |
| 2017/0156102 | A1* | 6/2017 | Singh | H04W 40/246 |
| 2018/0241613 | A1* | 8/2018 | Chen | H04L 41/0803 |

FOREIGN PATENT DOCUMENTS

| | | |
|---|---|---|
| JP | 2002-150441 A | 5/2002 |
| JP | 2004-343718 A | 12/2004 |
| JP | 3972704 B2 | 9/2007 |
| JP | 2009-146384 A | 7/2009 |
| JP | 2015-166962 A | 9/2015 |

OTHER PUBLICATIONS

Vallejo David et al., "A Multi-agent Architecture for Multi-robot Surveillance", International Conference on Computational Collective Intelligence ICCCI 2009: Computational Collective Intelligence. Semantic Web, Social Networks and Multiagent Systems, Oct. 5, 2009, pp. 266-278, Springer; Relevance is indicated in the extended European search report dated Oct. 4, 2019.

Daniel Playne, "Knowledge-Based Role Allocation in Robot Soccer", 2008 10th International Conference on Control, Automation, Robotics and Vision, Dec. 17, 2008, pp. 1616-1619, IEEE; Relevance is indicated in the extended European search report dated Oct. 4, 2019.

The extended European search report dated Oct. 4, 2019 in a counterpart European patent application.

An English translation of the International Search Report of PCT/JP2017/003731 dated Apr. 25, 2017.

An English translation of the Written Opinion of PCT/JP2017/003731 dated Apr. 25, 2017.

The Office Action dated Mar. 17, 2020 in a counterpart Japanese patent application.

* cited by examiner

FIG. 6

| | OPERATING STATE | OPERATING ENVIRONMENT | FUNCTION |
|---|---|---|---|
| FIRST OPENING/CLOSING SENSOR 301 | STOP DETECTION | NORMAL ENVIRONMENT | OPENING/CLOSING DETECTION EXTERNAL ACCESS DETECTABLE |
| FIRST CAMERA 303 | STOP SHOOTING/FIXED | NORMAL ENVIRONMENT | FIXED SHOOTING/SWINGING (RANGE FROM X1 TO X2 AT MAXIMUM) EXTERNAL ACCESS DETECTABLE |
| SECOND CAMERA 304 | STOP SHOOTING/FIXED | NORMAL ENVIRONMENT | FIXED SHOOTING/SWINGING (RANGE FROM Y1 TO Y2 AT MAXIMUM) EXTERNAL ACCESS DETECTABLE |
| THIRD CAMERA 305 | STOP SHOOTING/FIXED | NORMAL ENVIRONMENT | FIXED SHOOTING/SWINGING (RANGE FROM Z1 TO Z2 AT MAXIMUM) EXTERNAL ACCESS DETECTABLE |
| SECOND OPENING/CLOSING SENSOR 302 | STOP DETECTION | NORMAL ENVIRONMENT | OPENING/CLOSING DETECTION EXTERNAL ACCESS DETECTABLE |

| SUBSYSTEM / OBJECTIVE | | FIRST OPENING/CLOSING SENSOR 301 | FIRST CAMERA 303 | SECOND CAMERA 304 | THIRD CAMERA 305 | SECOND OPENING/CLOSING SENSOR 302 |
|---|---|---|---|---|---|---|
| MONITORING PERSON FROM ENTERING PREDETERMINED SPACE 400 UNTIL EXIT | COMBINATION STRUCTURE (1) | DETECTABLE | SHOOTING IS POSSIBLE FIXED | SHOOTING IS POSSIBLE FIXED | SHOOTING IS POSSIBLE FIXED | DETECTABLE |
| | COMBINATION STRUCTURE (2) | STOP DETECTION | SHOOTING IS POSSIBLE SWINGING | SHOOTING IS POSSIBLE FIXED | SHOOTING IS POSSIBLE FIXED | DETECTABLE |
| | COMBINATION STRUCTURE (3) | STOP DETECTION | SHOOTING IS POSSIBLE SWINGING | STOP SHOOTING | SHOOTING IS POSSIBLE SWINGING | DETECTABLE |
| | COMBINATION STRUCTURE (4) | DETECTABLE | SHOOTING IS POSSIBLE FIXED | SHOOTING IS POSSIBLE FIXED | SHOOTING IS POSSIBLE SWINGING | STOP DETECTION |

| | OPERATING STATE | OPERATING ENVIRONMENT | FUNCTION |
|---|---|---|---|
| FIRST OPENING/CLOSING SENSOR 301 | DETECTABLE | NORMAL ENVIRONMENT | OPENING/CLOSING DETECTION EXTERNAL ACCESS DETECTABLE |
| FIRST CAMERA 303 | SHOOTING IS POSSIBLE/FIXED | NORMAL ENVIRONMENT | FIXED/SHOOTING/SWINGING (RANGE FROM X1 TO X2 AT MAXIMUM) EXTERNAL ACCESS DETECTABLE |
| SECOND CAMERA 304 | SHOOTING IS POSSIBLE/FIXED | NORMAL ENVIRONMENT | FIXED/SHOOTING/SWINGING (RANGE FROM Y1 TO Y2 AT MAXIMUM) EXTERNAL ACCESS DETECTABLE |
| THIRD CAMERA 305 | SHOOTING IS POSSIBLE/FIXED | NORMAL ENVIRONMENT | FIXED/SHOOTING/SWINGING (RANGE FROM Z1 TO Z2 AT MAXIMUM) EXTERNAL ACCESS DETECTABLE |
| SECOND OPENING/CLOSING SENSOR 302 | DETECTABLE | NORMAL ENVIRONMENT | OPENING/CLOSING DETECTION EXTERNAL ACCESS DETECTABLE |

| | OPERATING STATE | OPERATING ENVIRONMENT | FUNCTION |
|---|---|---|---|
| FIRST OPENING/CLOSING SENSOR 301 | DETECTABLE | UNAUTHORIZED ACCESS | OPENING/CLOSING DETECTION |
| FIRST CAMERA 303 | SHOOTING IS POSSIBLE/FIXED | NORMAL ENVIRONMENT | FIXED SHOOTING/SWINGING |
| SECOND CAMERA 304 | SHOOTING IS POSSIBLE/FIXED | UNAUTHORIZED ACCESS | FIXED SHOOTING/SWINGING |
| THIRD CAMERA 305 | SHOOTING IS POSSIBLE/FIXED | NORMAL ENVIRONMENT | FIXED SHOOTING/SWINGING |
| SECOND OPENING/CLOSING SENSOR 302 | DETECTABLE | NORMAL ENVIRONMENT | OPENING/CLOSING DETECTION |

| OBJECTIVE \ SUBSYSTEM | | CONVEYER C10 | ROBOT R11 | ROBOT R12 | ROBOT R21 | ROBOT R22 | ROBOT R31 |
|---|---|---|---|---|---|---|---|
| ASSEMBLING PRODUCT α | COMBINATION STRUCTURE (1) | CONVEYANCE SPEED X1<br>STOPPING TIME Y1 AT LOCATIONS OF ROBOTS R11 AND R12<br>STOPPING TIME Y2 AT LOCATIONS OF ROBOTS R21 AND R22<br>STOPPING TIME Y3 AT LOCATION OF ROBOT R31 | ASSEMBLE COMPONENT a1 | ASSEMBLE COMPONENT a1 | ASSEMBLE COMPONENT b1 | ASSEMBLE COMPONENT b1 | ASSEMBLE COMPONENT c1 |
| ASSEMBLING PRODUCT β | COMBINATION STRUCTURE (2) | CONVEYANCE SPEED X1<br>STOPPING TIME Y4 AT LOCATIONS OF ROBOTS R11 AND R12<br>STOPPING TIME Y5 AT LOCATIONS OF ROBOTS R21 AND R22<br>STOPPING TIME Y6 AT LOCATION OF ROBOT R31 | ASSEMBLE COMPONENT a2 | ASSEMBLE COMPONENT a3 | ASSEMBLE COMPONENT b2 | ASSEMBLE COMPONENT b3 | ASSEMBLE COMPONENT c2 |
| ASSEMBLING PRODUCT γ | COMBINATION STRUCTURE (3) | CONVEYANCE SPEED X1<br>STOPPING TIME Y7 AT LOCATIONS OF ROBOTS R11 AND R12<br>STOPPING TIME Y8 AT LOCATIONS OF ROBOTS R21 AND R22<br>STOPPING TIME Y9 AT LOCATION OF ROBOT R31 | ASSEMBLE COMPONENT a4 | ASSEMBLE COMPONENT a4 | ASSEMBLE COMPONENT b4 | ASSEMBLE COMPONENT b4 | ASSEMBLE COMPONENT c4 |

| | OPERATING STATE | OPERATING ENVIRONMENT | FUNCTION |
|---|---|---|---|
| CONVEYER C10 | CONVEYANCE SPEED X1<br>STOPPING TIME Y2 AT LOCATIONS OF ROBOTS R11 AND R12<br>STOPPING TIME Y2 AT LOCATIONS OF ROBOTS R21 AND R22<br>STOPPING TIME Y3 AT LOCATION OF ROBOT R31 | NORMAL ENVIRONMENT | CONVEYANCE SPEED IS CHANGEABLE IN A RANGE FROM 0 TO X1<br>CONTENT DESCRIBED IN SPECIFICATION. IN ADDITION |
| ROBOT R11 | ASSEMBLE COMPONENT a1 | NORMAL ENVIRONMENT | MOVABLE RANGE OF 360° IN HORIZONTAL DIRECTION<br>MOVABLE RANGE FROM h1 TO h2 (m) IN VERTICAL DIRECTION<br>MOVABLE RANGE OF HAND PORTION: j1 TO j2 IN FRONT-BACK DIRECTION, j3 TO j4 IN LEFT-RIGHT DIRECTION<br>PICKABLE COMPONENT: a1, a2, a3, AND a4<br>CONTENTS DESCRIBED IN SPECIFICATION. IN ADDITION |
| ROBOT R12 | ASSEMBLE COMPONENT a1 | NORMAL ENVIRONMENT | MOVABLE RANGE OF 360° IN HORIZONTAL DIRECTION<br>MOVABLE RANGE FROM h1 TO h2 (m) IN VERTICAL DIRECTION<br>MOVABLE RANGE OF HAND PORTION: j1 TO j2 IN FRONT-BACK DIRECTION, j3 TO j4 IN LEFT-RIGHT DIRECTION<br>PICKABLE COMPONENT: a1, a2, a3, AND a4<br>CONTENTS DESCRIBED IN SPECIFICATION. IN ADDITION |
| ROBOT R21 | ASSEMBLE COMPONENT b1 | NORMAL ENVIRONMENT | MOVABLE RANGE OF 360° IN HORIZONTAL DIRECTION<br>MOVABLE RANGE FROM h1 TO h2 (m) IN VERTICAL DIRECTION<br>MOVABLE RANGE OF HAND PORTION: j1 TO j2 IN FRONT-BACK DIRECTION, j3 TO j4 IN LEFT-RIGHT DIRECTION<br>PICKABLE COMPONENT: b1, b2, b3, AND b4<br>CONTENT DESCRIBED IN SPECIFICATION. IN ADDITION |
| ROBOT R22 | ASSEMBLE COMPONENT b1 | NORMAL ENVIRONMENT | MOVABLE RANGE OF 360° IN HORIZONTAL DIRECTION<br>MOVABLE RANGE FROM h1 TO h2 (m) IN VERTICAL DIRECTION<br>MOVABLE RANGE OF HAND PORTION: j1 TO j2 IN FRONT-BACK DIRECTION, j3 TO j4 IN LEFT-RIGHT DIRECTION<br>PICKABLE COMPONENT: b1, b2, b3, AND b4<br>CONTENT DESCRIBED IN SPECIFICATION. IN ADDITION |
| ROBOT R31 | ASSEMBLE COMPONENT c1 | NORMAL ENVIRONMENT | MOVABLE RANGE OF 360° IN HORIZONTAL DIRECTION<br>MOVABLE RANGE FROM h1 TO h2 (m) IN VERTICAL DIRECTION<br>MOVABLE RANGE OF HAND PORTION: j1 TO j2 IN FRONT-BACK DIRECTION, j3 TO j4 IN LEFT-RIGHT DIRECTION<br>PICKABLE COMPONENT: b1, b2, b3, AND b4<br>CONTENT DESCRIBED IN SPECIFICATION. IN ADDITION |

| APPARATUS | OPERATING CONDITION (ROLE) |
|---|---|
| RW1 | • LEADER<br>• MONITORING CAMERA (RECOGNITION OF INTRUDER THROUGH DOORS 31 AND 32, MONITORING, REPORTING, AND EXCLUDING SUSPICIOUS PERSON<br>• COLLECT INFORMATION OBTAINED FROM APPARATUSES AND NOTIFY HOST APPARATUS |
| RW2,3 | PERFORM CELL PRODUCTION IN COOPERATION, CREATE COMPONENT A |
| RW4 | PERFORM CELL PRODUCTION SEPARATELY, CREATE COMPONENT A |
| RW5 | ASSEMBLE COMPONENT B CREATED BY 3D PRINTER P1 |
| RW6 | ASSEMBLE COMPONENT C CREATED BY 3D PRINTER P2 |
| RW7 | • PERFORM PACKING OF FINISHED PRODUCT A<br>• MOVES DEFECTIVE PRODUCT |
| RW8,9 | CHARGING |
| RD1~6 | CONVEY COMPONENTS AND PRODUCTS WHILE MOVING IN THE ORDER OF "CELL PRODUCTION → 3D PRINTERS P1,P2 → INSPECTION APPARATUS → PACKING → CELL PRODUCTION → ..." |
| RD7 | CHARGING |
| RD8 | CONVEY PRODUCT a (FINISHED PRODUCT) WHOSE PACKING IS COMPLETED TO OUTSIDE |
| P1 | CREATE COMPONENT b |
| P2 | CREATE COMPONENT c |
| INSPECTION APPARATUS 21 | INSPECT PRODUCT a |
| EACH APPARATUS | NOTIFY LEADER (RW1) OF STATE OF OWN SUBSYSTEM AT PREDETERMINED INTERVALS |

| APPARATUS | ROLE |
|---|---|
| RW4<br>RW8 | - RW8 MOVES TO CELL PRODUCTION C2<br>- RW8, AFTER MOVEMENT, PERFORMS CELL PRODUCTION IN COOPERATION. CREATE COMPONENT A. |

FIG. 27A

| APPARATUS | ROLE |
|---|---|
| RW5 | - ASSEMBLE COMPONENT B CREATED BY 3D PRINTER P1<br>- MOVE TO 3D PRINTER P2 AFTER ASSEMBLING COMPONENT b<br>- ASSEMBLE COMPONENT c CREATED BY 3D PRINTER P2<br>- MOVE TO 3D PRINTER P1 AFTER ASSEMBLING COMPONENT c |
| RW6 | MOVE TO CHARGING PLACE TO CHARGE |

| APPARATUS | ROLE |
|---|---|
| RW4 | MOVE TO CHARGING PLACE TO CHARGE |
| RW5 | ASSEMBLE COMPONENTS b AND c CREATED BY 3D PRINTER P1 |
| RW6 | STOP (TEMPORARY HALT) |
| RD 1~4 | CONVEY COMPONENTS AND PRODUCTS WHILE MOVING IN THE ORDER OF "CELL PRODUCTION PLACE C1 → 3D PRINTER PLACE C1 → INSPECTION APPARATUS → PACKING → CELL PRODUCTION (1) →..." |
| RD5,6 | MOVE TO CHARGING PLACE TO CHARGE |
| P1 | - CREATE COMPONENT b<br>- CREATE COMPONENT c AFTER CREATING COMPONENT b |
| P2 | STOP |

FIG. 30A

| APPARATUS | ROLE |
|---|---|
| RW1 | MOVE TO CHARGING PLACE TO CHARGE AFTER NOTIFYING APPARATUSES OF LEADER CHANGE |
| RW2, 10 | PERFORM CELL PRODUCTION SEPARATELY. CREATE COMPONENT a2. |
| RW3, 4 | PERFORM CELL PRODUCTION SEPARATELY. CREATE COMPONENT a3 ATTACH COMPONENT a3 TO COMPONENT a2 |
| RW5 | ASSEMBLE COMPONENT b2 CREATED BY 3D PRINTER P1 |
| RW6 | ASSEMBLE COMPONENT c2 CREATED BY 3D PRINTER P2 |
| RW7 | - PERFORM PACKING OF FINISHED PRODUCT β<br>- MOVE DEFECTIVE PRODUCT |
| RW8 | - TAKE OVER LEADER<br>- MONITORING CAMERA (RECOGNITION OF INTRUDER THROUGH DOORS 31 AND 32, MONITORING, REPORTING, AND EXCLUDING SUSPICIOUS PERSON)<br>- COLLECT INFORMATION OBTAINED FROM APPARATUSES AND NOTIFY THE HOST APPARATUS |
| RD8 | CONVEY PRODUCT β (FINISHED PRODUCT) WHOSE PACKING IS COMPLETED TO OUTSIDE |
| P1 | CREATE COMPONENT b2 |
| P2 | CREATE COMPONENT c2 |
| INSPECTION APPARATUS 51 | INSPECT PRODUCT β |
| EACH APPARATUS | NOTIFY LEADER (RW8) OF STATE OF OWN SUBSYSTEM AT PREDETERMINED INTERVALS |

NETWORK SYSTEM, FUNCTION SETTING METHOD, AND FUNCTION SETTING PROGRAM

CROSS REFERENCE TO RELATED APPLICATIONS

This application is a continuation application of International Application No. PCT/JP2017/003731, filed on Feb. 2, 2017, which claims priority based on the Article 8 of Patent Cooperation Treaty from prior Japanese Patent Application No. 2016-048624, filed on Mar. 11, 2016, the entire contents of which are incorporated herein by reference.

TECHNICAL FIELD

The disclosure relates to a network system, a function setting method, and a function setting program for setting functions of a plurality of subsystems that are connected via a network in order to implement a predetermined objective.

BACKGROUND ART

In recent years, a configuration has been proposed in which a plurality of apparatuses are connected via a network or the like, and the plurality of apparatuses are made to collaborate.

For example, in Patent Document 1, an information processing apparatus is disclosed with which, when a new device is connected to a network, a television being the center, the function of the device is transmitted to the television, and functions of devices on the network can be displayed on the television. When a user selects a function on the display screen, information is transmitted from the television to the device that performs the selected function, and the device executes processing.

Also, in Patent Document 2, for example, a monitoring camera system is disclosed in which a plurality of cameras are made to cooperate, and a camera to be operated and operating conditions of the camera are pre-set for each intrusion detection sensor that detects intrusion.

Also, in Patent Document 3, for example, a system is disclosed in which a plurality of terminals and a management unit are connected via a communication network, and this system is used as a security measure, for example. In the system shown in Patent Document 3, even if a terminal that can fully execute a countermeasure to handle a situation does not exist, combining a plurality of terminals allows execution of processing for handling the situation.

However, the above-described conventional apparatuses and systems include the following issues.

That is, with the information processing apparatus disclosed in the above-described Patent Document 1, although cooperation such that the functions of other devices are displayed on the television is performed, each apparatus can only execute individual processing (also referred to as an objective). Therefore, processing that is to be performed by a plurality of devices in cooperation cannot be executed.

Also, with the system disclosed in Patent Document 2, although predetermined processing can be executed using a plurality of devices, a case where a camera has failed, a camera is accessed without authorization externally, or the like cannot be dealt with. Also, with the system disclosed in Patent Document 3 as well, there are cases where an objective cannot be implemented, such as a case where a terminal has failed or the like. As described above, with the systems in Patent Documents 2 and 3, there are cases where the objective cannot be achieved due to being unable to adapt depending on the external and internal state of the system.

RELATED ART DOCUMENT

Patent Document

Patent Document 1: JP 2009-146384A
Patent Document 2: JP 2002-150441A
Patent Document 3: JP 3972704B
Patent Document 4: JP 2015-166962A

SUMMARY OF THE INVENTION

One or more aspects may provide a network system, a function setting method, and a function setting program that are highly adaptable to situations internal/external to the system.

Means for Solving the Problems

A network system of a first aspect is a network system in which a plurality of subsystems are connected via a network, and includes an own subsystem recognition unit, an acquisition unit, an objective acceptance unit, a shared storage unit, a structure setting unit, a determination unit, and a notification unit. The own subsystem recognition unit is provided in each of the subsystems and holds a state and function of the own subsystem. The acquisition unit acquires states and functions of all of the plurality of subsystems or all of the subsystems excluding the own subsystem. The objective acceptance unit accepts a setting of a target state. The shared storage unit stores knowledge regarding a combination structure of functions of the respective subsystems necessary for realizing the target state. The structure setting unit automatically sets a combination structure of functions of the respective subsystems, including determining whether or not the function of each of the subsystems is to be activated, based on the target state, states and functions of the subsystems, and the knowledge regarding the combination structure. The determination unit determines functions to be executed by the respective subsystems based on the combination structure automatically set by the structure setting unit. The notification unit that notifies the subsystems of the determined respective functions of the subsystems.

Here, since the own subsystem recognition unit holds the state and function of the own subsystem, each subsystem can detect an operating condition of the own subsystem, presence or absence of a failure, an external intrusion, and the like, and can hold the information. Also, the combination structure of functions of the respective subsystems is automatically set based on the states and functions of all of the subsystems.

Therefore, even in a case where a certain subsystem has failed or a certain subsystem has been subjected to unauthorized external access, the objective can be achieved by the system as a whole, and adaptability to the conditions external and internal to the system can be improved.

Note that the subsystems include sensors, a device incorporating such sensors, a camera (also referred to as an image sensor), a conveyor, a relay device, robots (such as hand robot, conveyance robot, multifunctional robot), and the like, for example. The sensors include various types of sensors that measure physical amounts such as an acceleration sensor, a voltage sensor, a current sensor, a temperature sensor, a humidity sensor, an illuminance sensor, a weight sensor, a human sensor, a contact sensor, and a pressure sensor, for example.

Also, the target state includes monitoring in a predetermined space, assembling a predetermined product, an assembly speed of a product, ensuring communication of information between predetermined positions, ensuring communication of information between apparatuses until a point in time at which maintenance is performed, or the like.

Also, the function of own subsystem indicates, when the subsystem has a plurality of functions, the plurality of functions. In the case of a camera, for example, the function of own subsystem includes a shooting function, a zoom function, a swing function, or the like.

Also, the state of own subsystem includes an operating state of the subsystem and the surrounding operating environment, for example. The operating state includes operation content being executed, for example. The surrounding operating environment includes an external element (such as temperature, humidity, brightness, limitation of the movable range due to an obstacle, and noise state) that affects the operations of the subsystem, for example.

A network system according to a second aspect is the network system according to a first aspect, and includes a management system that manages the plurality of subsystems. The acquisition unit is provided in the management system. The acquisition unit acquires states and functions of the plurality of subsystems from the own subsystem recognition units of the respective subsystems.

Accordingly, the management system can acquire states and functions of all of the plurality of subsystems that are connected to the network.

A network system according to a third aspect is the network system according to a first aspect, and includes a management system that manages the plurality of subsystems. The acquisition unit is provided in the management system. The subsystems are each provided with an other subsystem recognition unit that recognizes states and functions of all of the subsystems excluding the own subsystem. The acquisition unit acquires states and functions of all of the subsystems of the plurality of subsystems from the own subsystem recognition unit and the other subsystem recognition unit of any of the subsystems.

Accordingly, even in a case where any of the subsystems have failed and cannot transmit the state of the own subsystem to the management system, because the other subsystems can recognize failure information, the management system can acquire the states and functions of all of the plurality of subsystems connected to the network.

A network system according to a fourth aspect is the network system according to a first aspect, and the acquisition unit is provided in any of the subsystems. The acquisition unit recognizes and acquires states and functions of all of the subsystems excluding the own subsystem.

Here, the acquisition unit is configured as the other subsystem recognition unit that recognizes the states and functions of the other subsystems.

Accordingly, because a subsystem can acquire the states and functions of the other subsystems, the subsystem can acquire the states and functions of all of the plurality of subsystems connected to the network.

A network system according to a fifth aspect is the network system according to a first aspect, and when a newly set target state is accepted by the objective acceptance unit, the structure setting unit automatically sets a new combination structure based on the new target state. The determination unit determines new functions to be executed by the respective subsystems based on the new combination structure. The notification unit notifies the subsystems of the respective new functions.

Upon a new target state being accepted in this way, a new combination structure is set, and new functions to be executed by the respective subsystems are determined. Then, the subsystems are respectively notified of the determined new functions.

Accordingly, even in a case where a new target state is set, because the subsystems are respectively notified of the new functions, the new target state can be implemented.

Note that the new target state being set includes a case where the product to be assembled is changed, a case where a speed (period) until the assembly of a product is completed is changed, a case where the place to which a product or a component is conveyed is changed, or the like.

A network system according to a sixth aspect is the network system according to a first aspect, and when the own subsystem recognition unit recognizes a change in the state of the own subsystem that affects a role that the subsystem is currently executing in order to achieve the set objective, the structure setting unit automatically sets a new combination structure based on new states of the plurality of subsystems. The determination unit determines new functions to be executed by the respective subsystems based on the new combination structure. The notification unit notifies the subsystems of the respective new functions.

Accordingly, even in a case where it is difficult to implement the target state due to a change in the state of an own predetermined subsystem, as a result of automatically setting a new combination structure, the target state can be implemented.

Note that the change in the state of own subsystem includes a decrease in the charge amount, a decrease in the material used for creating a component, an increase in the surrounding noise, or the like, for example.

A network system according to a seventh aspect is the network system according to a first aspect, and the subsystem stores a deactivation condition for stopping operations of the own subsystem as the function of the own subsystem. When the condition for stopping any of the subsystems is satisfied, the structure setting unit automatically sets a new combination structure based on new states of the plurality of subsystems. The determination unit determines new functions to be executed by the respective subsystems based on the new combination structure. The notification unit notifies the subsystems of the respective new functions.

Accordingly, in the case where a predetermined subsystem has been subjected to external unauthorized access, or the subsystem has failed, or the like, the function of the subsystem is stopped, a new combination structure of the subsystems excluding the subsystem is automatically set, and as a result, the target state can be implemented.

Note that the condition for stopping operations includes a condition in which the charge amount decreases to a predetermined amount at which charging is required or less, external unauthorized access, a failure, a decrease in the material used for creating a component by a given amount or more, or the like.

Also, the deactivated state is a state in which activation is negated.

A network system according to an eighth aspect is the network system according to a first aspect, and when a new subsystem is added to the network, the structure setting unit automatically sets a new combination structure based on new states of the plurality of subsystems. The determination unit determines new functions to be executed by the respective subsystems based on the new combination structure. The notification unit notifies the subsystems of the respective new functions.

Accordingly, when a new subsystem is added, a new combination structure of subsystems considering the new subsystem is automatically set, and the target state can be implemented. Accordingly, the newly added subsystem can be efficiently used.

A network system according to a ninth aspect is the network system according to a first aspect, and the shared storage unit stores knowledge regarding the combination structure as a plurality of options.

Accordingly, the structure setting unit selects a piece of knowledge regarding the combination structure, and can automatically set the combination structure of functions of the respective subsystems.

A network system according to a tenth aspect is the network system according to a ninth aspect, and further includes a knowledge creation unit. The knowledge creation unit provides knowledge regarding the combination structure from the target state and a state and function of each of the subsystems using machine learning.

Accordingly, even if a user does not provide a combination structure of functions of the subsystems, the system itself provides the knowledge regarding the combination structure by using machine learning, and as a result, the adaptability to situations internal and external to the system can be improved.

Note that the machine learning includes deep learning by AI (Artificial Intelligence), for example.

A network system according to an eleventh aspect is the network system according to a tenth aspect, and when the knowledge regarding the combination structure of functions of the subsystems necessary for realizing the accepted target state is not stored in the shared storage unit, the structure setting unit provides the knowledge regarding the combination structure of functions of the subsystems by using machine learning, and automatically set the combination structure.

Accordingly, even if the knowledge regarding a combination structure of functions of subsystems for realizing a target state is not provided by a user, the system itself provides the knowledge regarding the combination structure by using machine learning, and as a result, the adaptability to situations internal and external to the system can be improved.

Note that the machine learning includes deep learning by AI (Artificial Intelligence), for example.

A network system according to a twelfth aspect is the network system according to a fourth aspect, and any of the subsystems is provided with the objective acceptance unit, the structure setting unit, the determination unit, and the notification unit. Any of the subsystems notifies the other subsystems of functions of the respective other subsystems.

Accordingly, the functions to be executed by the other respective subsystems determined by any of the plurality of subsystems can be notified to the other subsystems, and as a result, the target state can be implemented by the system as a whole.

A network system according to a thirteenth aspect is the network system according to a fourth aspect, and the plurality of subsystems connected to the network are each provided with the objective acceptance unit. The subsystem that has accepted a setting of the target state notifies the other subsystems of the accepted target state.

Accordingly, even in a case where one of the plurality of subsystems is provided with the objective acceptance unit, the accepted target state can be notified to the other subsystems.

A network system according to a fourteenth aspect is the network system according to a thirteenth aspect, and the plurality of subsystems are each further provided with the acquisition unit and the structure setting unit. The network system further includes a function coordination unit that is provided in a predetermined one of the subsystems, and coordinates functions to be executed by the respective subsystems. The structure setting unit of each of the subsystems determines the function of the own subsystem from the automatically set combination structure. The subsystems other than the predetermined subsystem each notify the predetermined subsystem of the determined function of the own subsystem. The function coordination unit of the predetermined subsystem coordinates functions of the respective subsystems including the own subsystem based on the combination structure automatically set by the own subsystem and the functions of the other subsystems that have been notified.

Accordingly, the subsystem that includes the function coordination unit, which serves as the leader, can coordinate functions to be executed by the other subsystems.

A network system according to a fifteenth aspect is the network system according to a fourteenth aspect, and all of the plurality of subsystems connected to the network or some of the subsystems are each provided with the function coordination unit. The subsystem, out of the plurality of subsystems, that performs the coordination is changed based on the accepted target state and a current state and function of each of the plurality of subsystems.

Accordingly, one of the plurality of subsystems can adjust the combination structure of functions of all of the subsystems. Also, in the case where the subsystem that adjusts the combination structure stops operating due to a decrease in the charge amount, a failure, external unauthorized access, or the like, another subsystem can adjust the combination structure of all of the subsystems.

A network system according to a sixteenth aspect is the network system according to a fourth aspect, and the plurality of subsystems are each provided with the objective acceptance unit, the acquisition unit, the structure setting unit, the determination unit, and the notification unit. The subsystem, out of the plurality of subsystems, that is to automatically set the combination structure is changed based on the accepted target state and a current state and function of each of the plurality of subsystems.

Accordingly, one of the plurality of subsystems can set the combination structure of functions of all of the subsystems. Also, in the case where the subsystem that adjusts the combination structure stops operating due to a decrease in the charge amount, a failure, external unauthorized access, or the like, another subsystem can adjust the combination structure of all of the subsystems.

A function setting method according to a seventeenth aspect is a function setting method for setting functions of a plurality of subsystems in order to implement a predetermined target state using a network system in which the plurality of subsystems are connected via a network. The function setting method includes a self-recognition step, an acquisition step, an objective acceptance step, a structure setting step, a determination step, and a notification step. In the self-recognition step, each of the subsystems holds a state and a function of the own subsystem. In the acquisition step, a state and function of each of all the subsystems connected to the network or each of all of the subsystems connected to the network excluding the own subsystem is acquired. In the objective acceptance step, a setting of the target state is accepted. In the structure setting step, a combination structure of functions of the respective subsystems, including determining whether or not the function of each of the subsystems is to be activated, is automatically set based on the target state, states and functions of the subsystems, and knowledge regarding a combination structure of functions of the respective subsystems necessary for realizing the target state. In the determination step, functions to be executed by the respective subsystems are determined based on the combination structure automatically set in the structure setting step. In the notification step, the subsystems are notified of the functions of the respective subsystems.

Here, because the state and function of the own subsystem can be held in the self-recognition step, each subsystem can detect the operating situation of the own subsystem, presence or absence of a failure, external intrusion, or the like, and can hold this information. Also, the combination structure of functions of the subsystems is automatically set based on the states and functions of all of the subsystems.

Therefore, even in a case where a certain subsystem has failed or a certain subsystem has been subjected to unauthorized external access, the objective can be achieved by the system as a whole, and adaptability to the conditions external and internal to the system can be improved.

Note that the subsystems include sensors, a device incorporating such sensors, a camera, a conveyor, a relay device, robots (such as hand robot, conveyance robot, multifunctional robot), and the like, for example. The sensors include various types of sensors that measure physical amounts such as an acceleration sensor, a voltage sensor, a current sensor, a temperature sensor, a humidity sensor, an illuminance sensor, a weight sensor, a human sensor, a contact sensor, and a pressure sensor, for example.

Also, the target state includes monitoring in a predetermined space, assembling a predetermined product, an assembly speed of a product, ensuring communication between predetermined positions, ensuring information communication between apparatuses until a point in time at which maintenance is performed, or the like.

Also, the function of own subsystem indicates, when the subsystem has a plurality of functions, the plurality of functions. In the case of a camera, for example, the function of own subsystem includes a shooting function, a zoom function, a swing function, or the like.

Also, the state of own subsystem includes an operating state of the subsystem and the surrounding operating environment, for example. The operating state includes an operation content being executed, for example. The surrounding operating environment includes an external element (such as temperature, humidity, brightness, limitation of the movable range due to an obstacle, or noise state) that affects the operations of the subsystem, for example.

A function setting program according to an eighteenth aspect is a function setting program for causing a computer to execute a function setting method, the function setting method being for setting functions of subsystems in order to implement a predetermined target state using a network system in which the subsystems are connected by a network and including a self-recognition step, an acquisition step, an objective acceptance step, a structure setting step, a determination step, and a notification step. In the self-recognition step, each of the subsystems holds a state and a function of the own subsystem. In the acquisition step, a state and function of each of all of the subsystems connected to the network or each of all of the subsystems connected to the network excluding the own subsystem is acquired. In the objective acceptance step, a setting of the target state is accepted. In the structure setting step, a combination structure of functions of the respective subsystems, including determining whether or not the function of each of the subsystems is to be activated, is automatically set based on the target state, states and functions of the subsystems, and knowledge regarding a combination structure of functions of the respective subsystems necessary for realizing the target state. In the determination step, functions to be executed by the respective subsystems are determined based on the combination structure automatically set in the structure setting step. In the notification step, the subsystems are notified of the functions of the respective subsystems.

Here, because the state and function of the own subsystem can be held in the self-recognition step, each subsystem can detect the operating information of the own subsystem, presence or absence of a failure, external intrusion, or the like, and can hold this information. Also, the combination structure of functions of the subsystems is automatically set based on the states and functions of all of the subsystems.

Therefore, even in a case where a certain subsystem has failed or a certain subsystem has been subjected to unauthorized external access, the objective can be achieved by the system as a whole, and adaptability to conditions external and internal to the system can be improved.

Note that the subsystems include sensors, a device incorporating such sensors, a camera, a conveyor, a relay device, robots (such as hand robot, conveyance robot, multifunctional robot), and the like, for example. The sensors include various types of sensors that measure physical amounts such as an acceleration sensor, a voltage sensor, a current sensor, a temperature sensor, a humidity sensor, an illuminance sensor, a weight sensor, a human sensor, a contact sensor, and a pressure sensor, for example.

Also, the target state includes monitoring in a predetermined space, assembling a predetermined product, an assembly speed of a product, ensuring communication between predetermined positions, ensuring information communication between apparatuses until a point in time at which maintenance is performed, or the like.

Also, the function of own subsystem indicates, when the subsystem has a plurality of functions, the plurality of functions. In the case of a camera, for example, the function of own subsystem includes a shooting function, a zoom function, a swing function, or the like.

Also, the state of own subsystem includes an operating state of the subsystem and the surrounding operating environment, for example. The operating state includes an operation content being executed, for example. The surrounding operating environment includes an external element (temperature, humidity, brightness, limitation of the movable range due to an obstacle, or noise state) that affects the operation of the subsystem, or the like, for example.

Effects of the Invention

According to one or more aspects, a network system, a function setting method, and a function setting program that is highly adaptable to the situation internal/external to the system can be provided.

BRIEF DESCRIPTION OF THE DRAWINGS

FIG. 6 is a diagram illustrating an example of information in a subsystem information database of a network system, such as in FIG. 5.

FIG. 7 is a diagram illustrating an example of combination structures in a combination structure knowledge database of a network system, such as in FIG. 5.

FIG. 8 is a diagram illustrating an example of information in a subsystem information database that is changed from a state, such as in FIG. 6.

FIG. 9 is a diagram illustrating an example of information in a subsystem information database that is changed from a state, such as in FIG. 8.

FIG. 13 is a diagram illustrating an example of combination structures in a combination structure knowledge database of a network system, such as in FIG. 11.

FIG. 14 is a diagram illustrating an example of information in a subsystem information database of a network system, such as in FIG. 11.

FIG. 25 is a diagram illustrating an example of information (operating state) in a subsystem information database of a network system, such as in FIG. 24.

FIG. 26A is a diagram illustrating a portion of a subsystem information database indicating operating states of subsystems after a combination structure has been changed in a network system, such as in FIG. 25.

FIG. 27A is a diagram illustrating a portion of a subsystem information database indicating operating states of subsystems after a combination structure has been changed in a network system, such as in FIG. 25.

FIG. 29A is a diagram illustrating a portion of a subsystem information database indicating operating states of subsystems after a combination structure has been changed in a network system in FIG. 25.

FIG. 30A is a diagram illustrating a portion of a subsystem information database indicating operating states of subsystems after a combination structure has been changed in a network system, such as in FIG. 25.

EMBODIMENTS OF THE INVENTION

Hereinafter, a network system, a function setting method, and a function setting program according to embodiments will be described based on the drawings.

Embodiment 1

A network system N1 in Embodiment 1 will be described as follows.

Configuration

Outline of Network System N1

Figure 1:
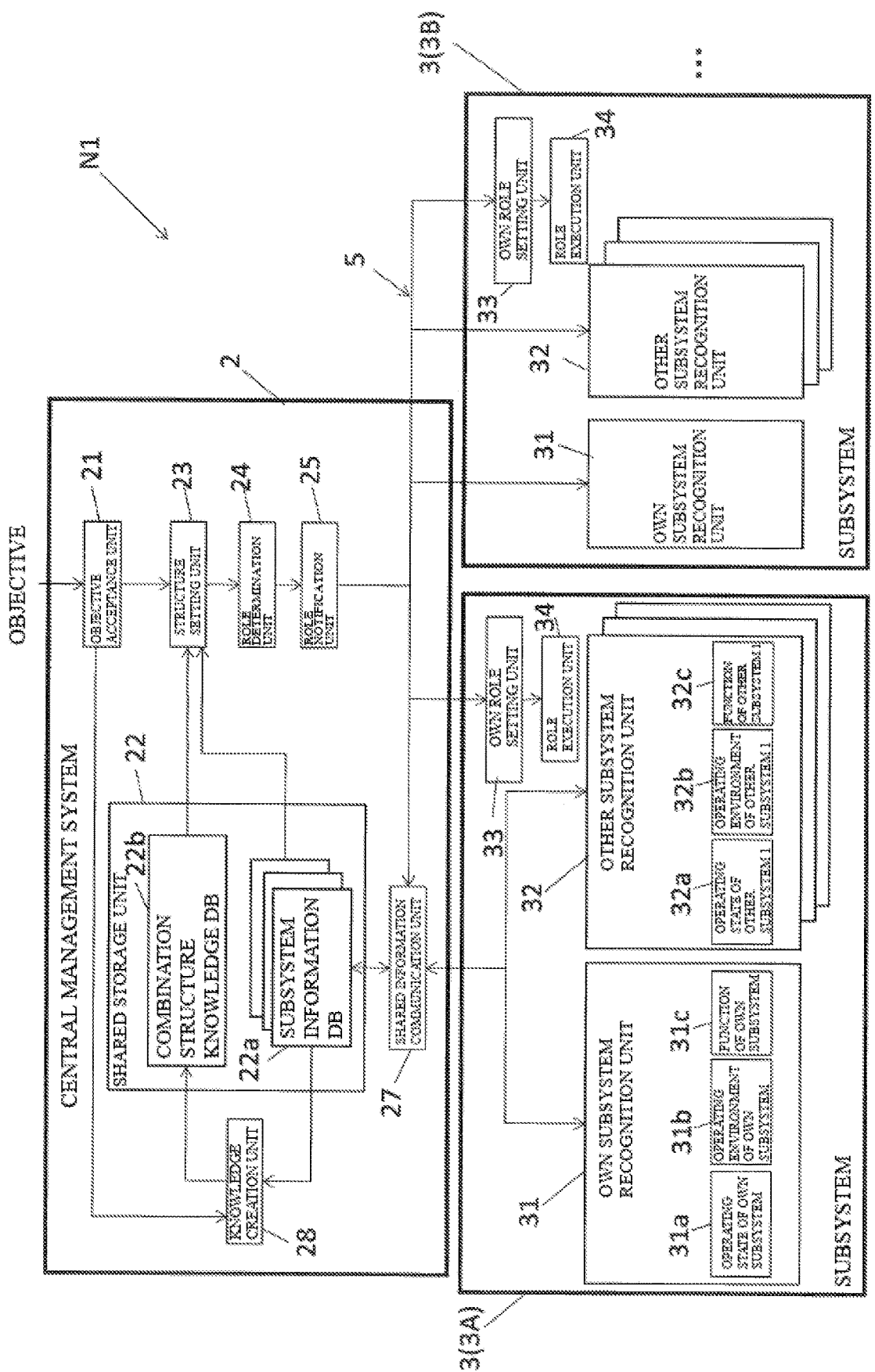
FIG. 1 is a diagram illustrating a configuration of a network system in Embodiment 1.

FIG. 1 is a block diagram illustrating a configuration of a network system N1 in Embodiment 1.

The network system N1 of an embodiment is a network system that implements a predetermined objective, and includes a central management system 2 (an example of a management system) and a plurality of subsystems 3, as shown in FIG. 1. The central management system 2 and the plurality of subsystems 3 are connected to each other via a network 5. The network 5 may be a wired network, a wireless network, a combination of wired/wireless networks, or a network through the Internet. Although two subsystems 3A and 3B are illustrated in FIG. 1, the number of subsystems is not limited to two. Note that, when the subsystems 3 are to be differentiated, reference signs are appended such as subsystems 3A and 3B.

The central management system 2, upon accepting an objective, determines the functions (roles) of the plurality of subsystems 3 so as to be able to achieve the target state, and notifies the subsystems 3 of the respective functions.

Here, the target state includes monitoring in a predetermined space (later-described Working examples 1 and 4), assembling a predetermined product (later-described Working examples 2 and 4), achieving an assembly speed of a product (later-described Working example 2), ensuring communication between predetermined positions (later-described Working example 3), ensuring information communication between predetermined positions until a maintenance time (later-described Working example 3), or the like, for example.

Also, the subsystems 3 include a sensor shown in Working example 1, a camera, a conveyor, and a carrier machine shown in Working examples 1 and 2, a relay device shown in Working example 3, and a robot (such as a hand robot, a conveyance robot, or a multifunctional robot) shown in Working examples 2 and 4, for example. The sensors include various types of sensors that measure physical amounts, such as an acceleration sensor, a voltage sensor, a current sensor, a temperature sensor, a humidity sensor, an illuminance sensor, a weight sensor, a human sensor, a contact sensor, and a pressure sensor, for example.

Subsystem 3

Each subsystem 3 includes an own subsystem recognition unit 31, an other subsystem recognition unit 32 (an example of an acquisition unit), an own role setting unit 33, and a role execution unit 34.

The own subsystem recognition unit 31 holds or recognizes and holds the state and function of the own subsystem. The own state and function includes an own subsystem operating state $31a$ being executed, an own subsystem operating environment $31b$, and an own subsystem function $31c$, for example.

The own subsystem operating state $31a$ includes operation content being executed or the like, and the operation content being executed may include, in the case of the subsystem 3 being a monitoring camera, information regarding whether or not shooting is being performed, the camera is turning, zooming is being performed, recording is being performed, information such as a stop value, or the like. Also, in the case of the subsystem 3 being a multifunctional robot, the operation content being executed may include information regarding which component is being assembled, whether or not a component is being conveyed, or the like.

The own subsystem operating environment $31b$ includes the surrounding operating environment or the like, and the surrounding operating environment includes an external element that influences the operations of the own subsystem. An external element includes information regarding temperature, humidity, restriction of a movable range by an obstacle, a noise state, or the like. For example, in the case of the subsystem 3 being a camera, the external element may include information regarding whether or not an image capturing range is illuminated by lights or the like.

The own subsystem function $31c$ includes information regarding an operation that the own subsystem can perform to the maximum or the like. The operation that the own subsystem can perform to the maximum includes, in the case of the subsystem 3 being a camera, information regarding a turnable range, a shootable distance in telephotographing, or the like, for example. Also, in the case of the subsystem 3 being a conveyance robot, the operation that the own subsystem can perform to the maximum may include information regarding a conveyable maximum speed or a conveyable maximum weight, for example. Also, in the case of the subsystem 3 being a robot that assembles components, the operation that the own subsystem can perform to the maximum may include information regarding the assembly speed of components, types of components that can be assembled, or the like.

The other subsystem recognition unit 32 recognizes the states and functions of the plurality of other subsystems 3 connected through the network 5. That is, the other subsystem recognition unit 32 recognizes the state and function of each of the subsystems 3 connected via the network 5. For example, the other subsystem recognition unit 32 of the subsystem 3A recognizes an operating state $32a$ of an other subsystem 1, an operating environment $32b$ of the other subsystem 1, and a function $32c$ of the other subsystem 1 as the operating state of the subsystem 3B.

The operating state $32a$ of the other subsystem 1 includes operation content being executed or the like, and the operation content being executed may include, in the case of the subsystem 3B being a monitoring camera, information regarding whether or not shooting is being performed, whether or not the camera is turning, whether or not zooming is being performed, or whether or not recording is being performed, information such as a stop value, or the like. Also, in the case of the subsystem 3B being a multifunctional robot, the operation content being executed may include information regarding which component is being assembled, whether or not a component is being conveyed, or the like.

The operating environment $32b$ of the other subsystem 1 includes a surrounding operating environment or the like, and the surrounding operating environment includes an external element that influences the operations of another subsystem. An external element includes information regarding temperature, humidity, restriction of a movable range by an obstacle, a noise state, or the like. For example, in the case of the subsystem 3B being a camera, the external element may include information regarding whether or not an image capturing range is illuminated by lights or the like.

The function $32c$ of the other subsystem 1 includes information regarding an operation that the other subsystem can perform to the maximum or the like. The operation that the other subsystem can perform to the maximum includes, in the case of the subsystem 3B being a camera, information regarding a turnable range, a shootable distance in telephotographing, or the like, for example. Also, in the case of the subsystem 3B being a conveyance robot, the operation that the own subsystem can perform to the maximum may include information regarding a conveyable maximum speed or a conveyable maximum weight, for example. Also, in the case of the subsystem 3B being a robot that assembles components, the operation that the own subsystem can perform to the maximum may include information regarding an assembly speed of components, types of components that can be assembled, or the like.

The own role setting unit 33 sets the role (also referred to as a function) of the own subsystem based on the role of the subsystem 3 that has been determined and notified by the central management system 2. For example, in the case of the subsystem currently executing a predetermined operation, the own role setting unit 33 compares the operation and the notified function, and updates the function (role) if they are different.

The role execution unit 34 executes the function of the subsystem 3 set by the own role setting unit 33.

Note that the other subsystem recognition unit 32 of the subsystem 3B recognizes the operating state, the operating environment, and the function of the subsystem 3A, as one of the other subsystems 3.

Also, the plurality of subsystems 3 may be constituted by a plurality of different types of apparatuses, or may be constituted by a plurality of the same type of apparatus. That is, the subsystem 3A and the subsystem 3B may be the same type of apparatus, or may be different types of apparatuses.

Central Management System 2

The central management system 2 includes an objective acceptance unit 21, a shared storage unit 22, a structure setting unit 23, a role determination unit 24 (an example of a determination unit), a role notification unit 25 (an example of a notification unit), a shared information communication unit 27 (an example of an acquisition unit), and a knowledge creation unit 28, as shown in FIG. 1.

The objective acceptance unit 21 accepts a setting of the target state set by a user. For example, when the user inputs an objective that is to produce a product α in a predetermined production line, to an operation panel or the like, the objective acceptance unit 21 accepts the setting of the target state.

The shared information communication unit 27 communicates with a plurality of subsystems 3, and receives an own subsystem operating state 31*a*, an own subsystem operating environment 31*b*, and an own subsystem function 31*c* that are recognized by the own subsystem recognition unit 31*s* of each of the plurality of subsystems 3. Note that operating states, operating environments, and functions of all of the subsystems may be received from one subsystem 3. For example, the shared information communication unit 27 may receive an operating state 31*a*, an operating environment 31*b*, and a function 31*c* of a subsystem 3A from the own subsystem recognition unit 31 of the subsystem 3A, and may also receive an operating state 32*a*, an operating environment 32*b*, and a function 32*c* of an other subsystem 3 (3B, for example) from the other subsystem recognition unit 32 of the subsystem 3A.

The shared storage unit 22 includes a subsystem information DB (database) 22*a*, and a function combination structure knowledge DB (database) 22*b*. The subsystem information DB 22*a* is a database that stores information regarding the states and functions of all of the subsystems 3 connected to the network 5, that has been received via the shared information communication unit 27. When a subsystem 3 has a plurality of functions, the plurality of functions are stored in the subsystem information DB 22*a*.

The combination structure knowledge DB 22*b* is a database that stores a plurality of combination structures of functions of the subsystems 3 necessary for realizing a target state. Combination structures of necessary functions (hereinafter also referred to as a "combination structure") of the subsystem 3 for the respective target states are stored in the combination structure knowledge DB 22*b*.

The knowledge creation unit 28 creates combination structures of functions of the subsystems 3 necessary for realizing a target state from operating states, operating environments, and functions of the subsystems 3 stored in the subsystem information DB 22*a* and the target state accepted by the objective acceptance unit 21.

Note that the knowledge creation unit 28 may create, with respect to a plurality of target states, in advance, combination structures of functions of the subsystems 3 necessary for realizing each target state, and store the created combination structures in the combination structure knowledge DB 22*b*. Also, the knowledge creation unit 28 may create, every time the objective acceptance unit 21 accepts an objective, the combination structure necessary for realizing the target state, and store and accumulate the created combination structure in the combination structure knowledge DB 22*b*.

Also, the knowledge creation unit 28 includes AI (Artificial Intelligence), and may create the combination structure necessary for realizing the target state using deep learning, which is an example of machine learning. The deep learning is described in Patent Document 4 (JP 2015-166962A) or the like, for example.

The structure setting unit 23 automatically sets the combination structure of the functions of the respective subsystems 3 based on the target state accepted by the objective acceptance unit 21, the state and function of each of the subsystems 3, and the combination structures stored in the combination structure knowledge DB 22*b*. Here, the automatically set combination structure of functions includes information regarding whether or not each subsystem 3 is to be activated. The information regarding whether or not each subsystem 3 is to be activated includes information regarding whether or not each subsystem 3 is to be operated. That is, the subsystem 3 that is not included in the automatically set combination structure of functions is not required to operate, and therefore will not operate (is in a state of not being activated, which is also referred to as being in a deactivated state).

The role determination unit 24 determines the functions (roles) that are to be executed by the respective subsystems 3 based on the combination structure that has been automatically set by the structure setting unit 23. For example, the role determination unit 24 determines the functions to be executed by the respective subsystems such as, in the case of both the subsystem 3A and subsystem 3B being multifunctional robots, causing the subsystem 3A to produce a component, and causing the subsystem 3B to convey a material or a component. Here, the function to be executed by a subsystem 3 can also be referred to as a role of the subsystem 3. Also, in the case where a subsystem 3 has a plurality of functions, the function to be executed may be all of the plurality of functions or may be at least one of the functions thereof.

The role notification unit 25 notifies the self-role setting units 33 of the respective subsystems 3 of the functions (roles) to be executed by the respective subsystems 3 that have been determined by the role determination unit 24.

Operations

Next, operations of the network system N1 of Embodiment 1 will be described, and an example of the function setting method will also be described.

Operations of Notifying Subsystems of Functions

Figure 2:
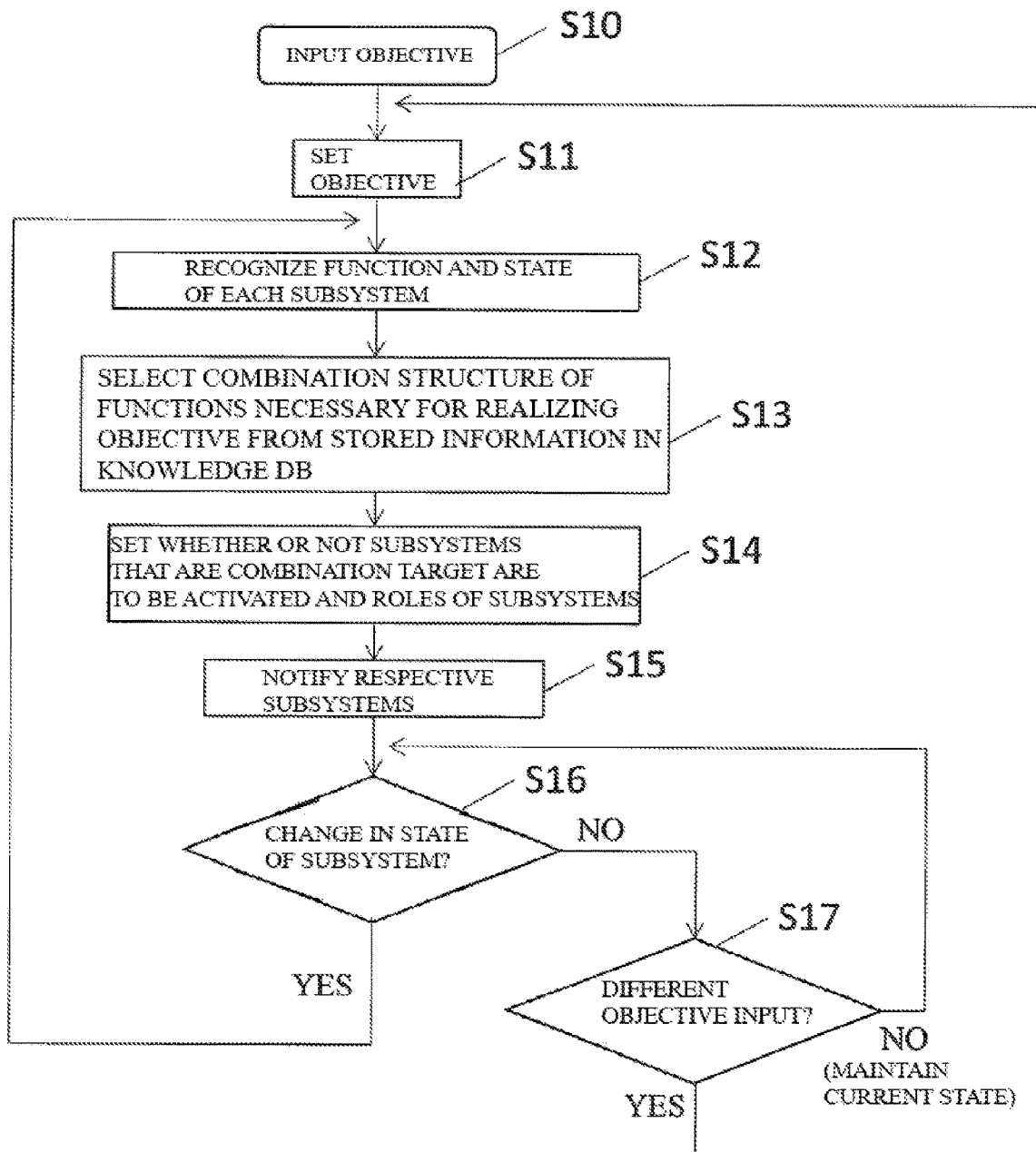
FIG. 2 is a flow diagram illustrating operations of a network system, such as in FIG. 1.

FIG. 2 is a flow diagram illustrating operations of notifying the subsystems 3 of the respective functions (roles) from the central management system 2.

First, upon a user inputting an objective setting using an unshown terminal or the like, in step S10, the objective acceptance unit 21 accepts a target state setting, in step S11. The step S11 is an example of an objective acceptance step.

Next, in step S12, the shared information communication unit 27 receives the state (including the operating state and the operating environment) and the function of each of the subsystems 3 as a result of receiving the own subsystem operating state 31*a*, own subsystem operating environment 31*b*, and own subsystem function 31*c* of each of the subsystems 3. The received state and function of each of the subsystems 3 are stored in the subsystem information DB 22*a*. Note that, as described above, the shared information communication unit 27 may acquire, from one subsystem 3, information regarding the state and function of the subsystem 3 and the functions and pieces of information of the other respective subsystems 3. The step S12 corresponds to an example of a self-recognition step and an acquisition step.

Next, in step S13, the structure setting unit 23 selects a combination structure associated with the accepted target state from the combination structures, which are associated with the respective target states, that have been created, in advance, by the knowledge creation unit 28 and stored in the combination structure knowledge DB 22*b*, considering the state and function of each of the subsystems 3. On the other hand, in the case where the combination structure associated with the accepted target state does not exist in the combination structure knowledge DB 22*b*, the knowledge creation unit 28 creates a new combination structure based on the state and function of each of the subsystems 3 and the accepted target state, using deep learning, for example. Also, the structure setting unit 23 selects the newly created combination structure. Step S13 corresponds to an example of a structure setting step.

Next, in step S14, the role determination unit 24 sets whether or not each of the subsystems 3 that are the targets of combination will be activated and the function (role) of each of the subsystems 3 based on the combination structure selected by the structure setting unit 23. Here, whether or not a subsystem 3 will be activated means whether or not operations of all of or a portion of the functions of the subsystem 3 will be executed or stopped. The step S14 corresponds to an example of a determination step.

Next, in step S15, the notification unit 15 notifies the subsystems 3 of the respective functions (roles). The step S15 corresponds to an example of a notification step. Note that, in step S16, in the case where the state of any of the subsystems 3 has changed and the current target state cannot be achieved, the shared information communication unit 27 receives information, in step S12, from the own subsystem recognition unit 31 of the subsystem 3 whose state has changed. Then, steps S12 to S15 are again executed. That is, a new combination structure is selected, functions of the respective subsystems 3 are determined based on the new combination structure, and the subsystems 3 are notified of their respective functions.

Also, in step S17, in the case where a different target state is input by the user, the objective acceptance unit 21 sets a new target state in step S11. Then, steps S12 to S15 are executed, functions of the respective subsystems 3 are determined based on the new combination structure, and the subsystems 3 are notified of the respective functions.

Control Execution Operation in Each Subsystem

The control execution operation in each of the subsystems 3 after the subsystems 3 are notified of the respective functions (roles) in step S15 will be described.

Figure 3:
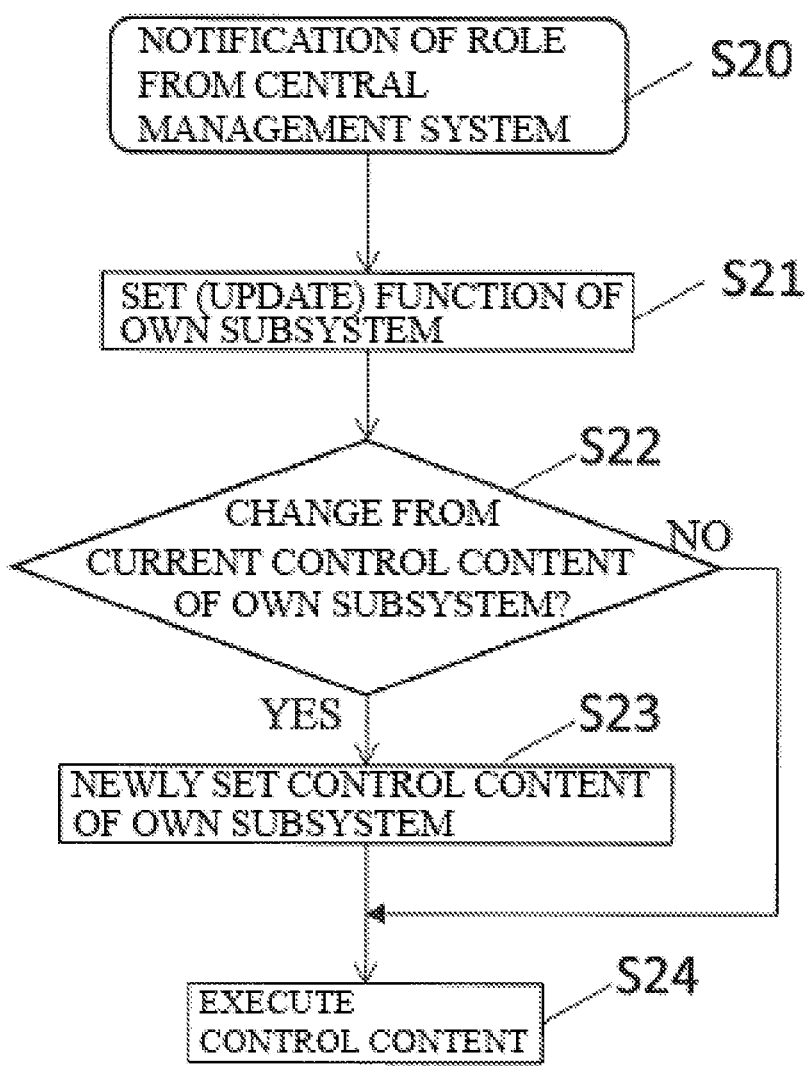
FIG. 3 is a flow diagram illustrating operations of a network system, such as in FIG. 1.

FIG. 3 is a flow diagram illustrating operations for each subsystem 3 to execute its own control. Upon each subsystem 3 receiving notification of the function (role) from the central management system 2 in step S20, the own role setting unit 33 sets (updates) the function (role) to be executed by the own subsystem in step S21.

Next, in step S22, the own role setting unit 33 determines whether or not the control content in the updated own function (role) has changed from the current own control content. If there is a change, the own role setting unit 33 newly sets the own control content based on the newly set own function, in step S23.

In step S24, the role execution unit 34 executes the set own function (role).

Operations when Change in Own State is Detected

The operations when a change in the own state of each subsystem 3 is detected, in step S16, will be described.

Figure 4:
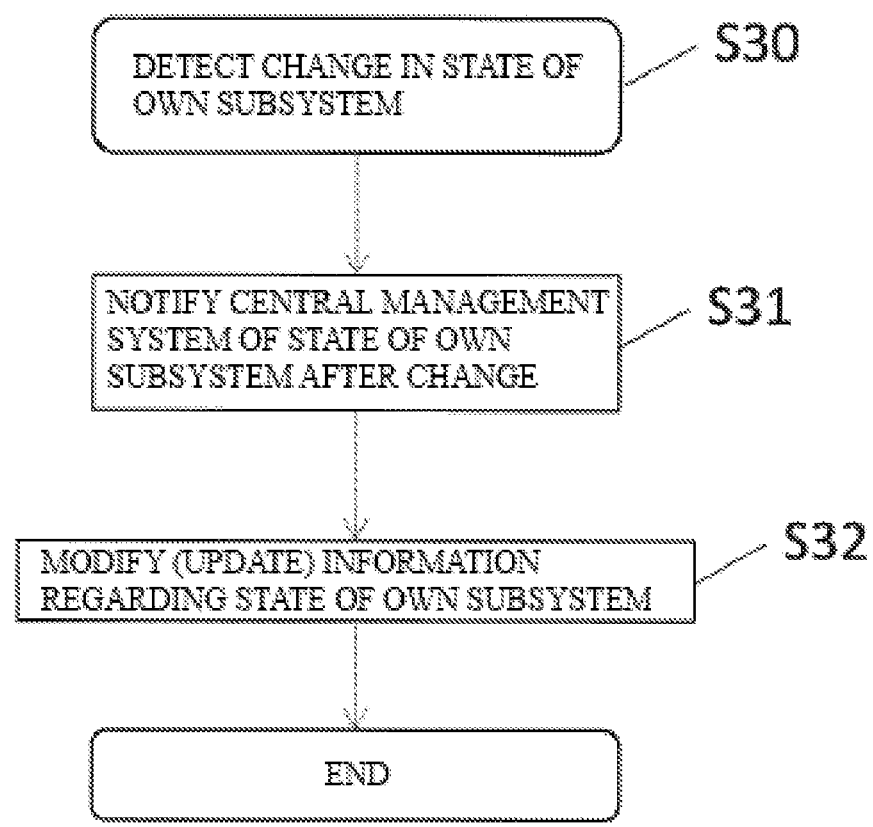
FIG. 4 is a flow diagram illustrating operations of a network system, such as in FIG. 1.

FIG. 4 is a flow diagram illustrating operations when the subsystem 3 has detected a change in the state of an own subsystem.

Upon the own subsystem recognition unit 31 of the subsystem 3 detecting a change in the own state, in step S30, the own subsystem recognition unit 31 notifies the central management system 2 of the changed state of the own subsystem, in step S31.

Next, the own subsystem recognition unit 31 modifies or updates the information regarding the state of the own subsystem, in step S32.

Note that the change in the state of the own subsystem may include a charge amount having decreased to a predetermined amount at which charging is required or less, having detected external unauthorized access, having detected a failure in the own subsystem, the material used for producing a component having decreased to a predetermined amount or less, or the like, for example.

According to the above-described operations, when the target state is set, the state of a subsystem 3 has changed, or the like, a combination structure of functions of the subsystems 3 that can implement a target objective is automatically set. Also, the functions of the respective subsystems 3 are determined based on the combination structure, and the subsystems 3 are notified of their respective functions. Accordingly, the set target state can be implemented by the network system N1.

Next, Embodiment 1 will be described more specifically using Working examples 1 and 2.

Working Example 1

A network system N1 of Working example 1 is a sensor network in which security against a malicious person is taken into consideration. The network system N1 of Working example 1 includes a plurality of door opening/closing sensors and a plurality of image sensors as subsystems 3.

Outline of Network System N1 in Working Example 1

Figure 5:
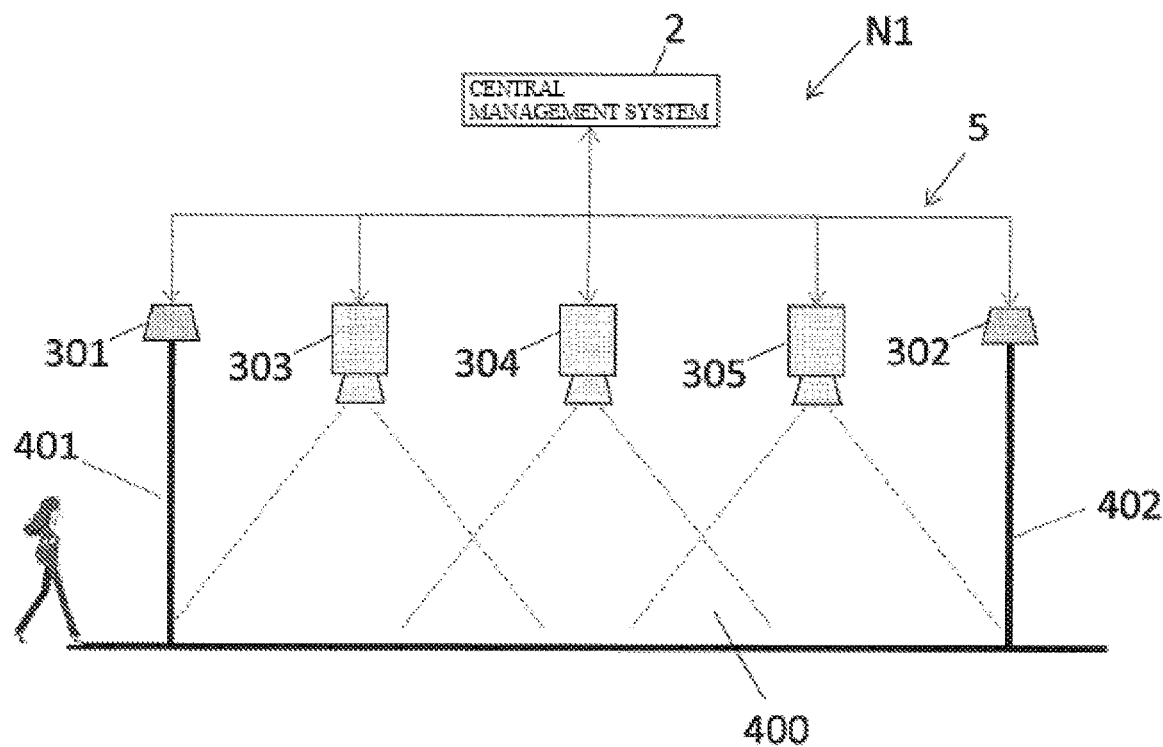
FIG. 5 is a diagram illustrating a configuration of a network system in Working example 1.

FIG. 5 is a diagram illustrating a configuration of the network system N1 of Working example 1. The network system N1 of Working example 1 includes door opening/closing sensors (first opening/closing sensor 301, second opening/closing sensor 302), and cameras (first camera 303, second camera 304, third camera 305), which are image sensors, as the above-described subsystems 3.

The first opening/closing sensor 301 detects opening/closing of a door 401 at an entrance of a predetermined space 400 (a room, for example). The second opening/closing sensor 302 detects opening/closing of a door 402 at an exit of the predetermined space 400. The first camera 303, the second camera 304, and the third camera 305 are arranged inside the predetermined space 400 in a ceiling.

The opening/closing sensors (first opening/closing sensor 301, second opening/closing sensor 302) and the image sensors (first camera 303, second camera 304, third camera 305) that constitute the network system N1 can mutually transmit and receive data. Also, the opening/closing sensors 301 and 302 and the cameras 303, 304, and 305 are each able to determine whether or not itself has been physically accessed. For example, as a result of the own subsystem recognition units 31 each including an acceleration sensor or the like, when each subsystem is touched, the subsystem can keep a log of the touch. Also, the own subsystem recognition units 31 each include a monitoring function for monitoring a connection state of a connector of a corresponding one of the opening/closing sensors 301 and 302 and the cameras 303, 304, and 305. Accordingly, when a cable or the like is connected to a subsystem, the subsystem can leave a log of the connection.

Continuous monitoring of a person from when the person has entered the predetermined space 400 until the person leaves the predetermined space 400 is set as the objective of the network system N1 in Working example 1.

Normal Operation

First, normal operations will be described.

Currently, the first camera 303, the second camera 304, and the third camera 305 are assumed to be stopped before the normal operations start, and the first opening/closing sensor 301 and the second opening/closing sensor 302 are also assumed to be stopped, for example.

FIG. 6 is a diagram illustrating an example of the subsystem information DB 22a in a state in which all of the sensors are stopped. The subsystem information DB 22a in FIG. 6 shows a state, as an example, in which the first opening/closing sensor 301 and the second opening/closing sensor 302 stop detecting opening/closing of the doors 401 and 402. Also, the operating environment such as temperature, humidity, and a noise status of each of the first opening/closing sensor 301 and the second opening/closing sensor 302 is in a normal range. Also, the first opening/closing sensor 301 and the second opening/closing sensor 302 each include a function of detecting opening/closing of a door, as a function. Also, the operating state of each of the first camera 303, the second camera 304, and the third camera 305 is a state in which shooting is stopped, and is a fixed state, and the operating environment is in a normal range. Also, the first camera 303, the second camera 304, and the third camera 305 each include a shooting function, a swing function, and a function of being fixed at a predetermined position, as functions. Note that functions stored in the subsystem information DB 22a include a plurality of functions that can be performed by the subsystems 3.

Also, combination structures created by the knowledge creation unit 28 in advance are stored in the combination structure knowledge DB 22b. FIG. 7 is a diagram illustrating an example of the combination structure knowledge DB 22b. A plurality of combination structures for implementing a target state "monitoring a person that has entered the predetermined space 40 from entering the predetermined space 40 until exiting therefrom" are shown in FIG. 7.

Upon the objective acceptance unit 21 accepting the above-described objective (step S11), the shared information communication unit 27 accepts the state and function recognized by each of the subsystems 3 (step S12).

The structure setting unit 23 selects a combination structure (1), for example, as the combination structure necessary for realizing the objective (step S13). Also, the role determination unit 24 determines the functions of the first opening/closing sensor 301, the second opening/closing sensor 302, the first camera 303, the second camera 304, and the third camera 305, which are subsystems 3 (step S14). The role notification unit 25 notifies the first opening/closing sensor 301, the second opening/closing sensor 302, the first camera 303, the second camera 304, and the third camera 305 of the respective functions (step S15). The first opening/closing sensor 301, the second opening/closing sensor 302, the first camera 303, the second camera 304, and the third camera 305 execute the respective functions using the respective role execution units 34. That is, the first camera 303, the second camera 304, and the third camera 305 each enter a state in which shooting is possible in a fixed state, the first opening/closing sensor 301 enters a state in which whether or not the door 401 is open or closed can be detected, and the second opening/closing sensor 302 enters a state in which whether or not the door 402 is open or closed can be detected.

Accordingly, when opening of the door 401 has been detected by the first opening/closing sensor 301, the first camera 303 tracks a person while shooting the person. Subsequently, the second camera 304 tracks the person while shooting the person. Subsequently, the third camera 305 tracks the person while shooting the person. Then, when the second opening/closing sensor 302 has detected that the door 402 has been opened, the person has exited, and the door 402 is closed, shooting by the cameras is ended.

In this way, with the shooting functions of the first camera 303, the second camera 304, and the third camera 305, and the opening/closing detection functions of the first opening/closing sensor 301 and the second opening/closing sensor 302, the target state in which a person is continuously monitored from when the person has entered the predetermined space 400 until when the person has exited therefrom is achieved.

Note that FIG. 8 is a diagram illustrating an example of the subsystem information DB 22a in a normal operation shown in FIG. 5. In the subsystem information DB 22a in FIG. 8, the first opening/closing sensor 301 and the second opening/closing sensor 302 are in a state in which opening/closing of the doors 401 and 402 can be detected, for example. Also, the operating environment such as the temperature, humidity, and noise status of each of the first opening/closing sensor 301 and the second opening/closing sensor 302 is in a normal range. Also, the first camera 303, the second camera 304, and the third camera 305 are each in a state in which shooting is possible, and in a fixed state, as the operating state, and the operating environment thereof is in a normal range.

Change in State of Subsystem 3

A case where the state of a subsystem 3 has changed in Working example 1 will be described. Note that the objective of the network system N1 in Working example 1 is assumed to be the same.

When the first opening/closing sensor 301 and the second camera 304 have respectively detected external unauthorized physical access thereto, based on the above-described operation flow in FIG. 4, the first opening/closing sensor 301 and the second camera 304 each transmit information regarding a change in the state, that is, the fact that unauthorized access has been made, to the shared information communication unit 27 (step S31).

Then, in step S12, the shared information communication unit 27 recognizes the information regarding the unauthorized access to the first opening/closing sensor 301 and the second camera 304, and the information is stored in the subsystem information DB 22a.

FIG. 9 is a diagram illustrating an example of the subsystem information DB 22a in a case where unauthorized access to the first opening/closing sensor 301 and the second camera 304 has been detected.

When unauthorized access to the first opening/closing sensor 301 and the second camera 304 has been detected, in this way, the structure setting unit 23 selects a combination structure, from the combination structure knowledge DB 22b, with which the target state can be realized while deactivating the first opening/closing sensor 301 and the second camera 304 (step S13). Here, the deactivation of the first opening/closing sensor 301 and the second camera 304 means stopping the operations or not using the output results therefrom. On the other hand, in the case where a combination structure with which the target state can be realized while deactivating the first opening/closing sensor 301 and the second camera 304 does not exist in the combination structure knowledge DB 22b, the knowledge creation unit 28 creates a combination structure with which the objective can be realized. Note that the deactivated state is a state in which activation is negated.

Here, a combination structure (3) with which the target state can be realized while deactivating the first opening/closing sensor 301 and the second camera 304 exists in the combination structure knowledge DB 22b in FIG. 7. Therefore, the structure setting unit 23 selects this combination structure (3). The first camera 303 has a function of being turnable (swingable) and being able to shoot an object in a range from X1 to X2 at maximum, and the third camera 305 has a function of being turnable (swingable) and being able to shoot an object in a range from Z1 to Z2 at maximum.

Therefore, the combination structure (3) is a combination for realizing the target state using the swing function of the first camera 303 and the swing function of the third camera 305 instead of using the functions of the first opening/closing sensor 301 and the second camera 304.

That is, the structure setting unit 23 negates the activation of the first opening/closing sensor 301 and the second camera 304, sets a shooting function and a swing function as the roles of the first camera 303 and the third camera 305, and sets an opening/closing detection function as the role of the second opening/closing sensor 302 (step S14). Accordingly, the target state in which a person is continuously monitored from when the person has entered the predetermined space 400 until when the person has exited therefrom is achieved.

Also, the first opening/closing sensor 301, the second opening/closing sensor 302, the first camera 303, the second camera 304, and the third camera 305 are notified of the respective roles (step S15).

Thereafter, the first opening/closing sensor 301, the second opening/closing sensor 302, the first camera 303, the second camera 304, and the third camera 305 execute the respective roles (step S24).

Operations After Change Will be Described.

Figure 10A:
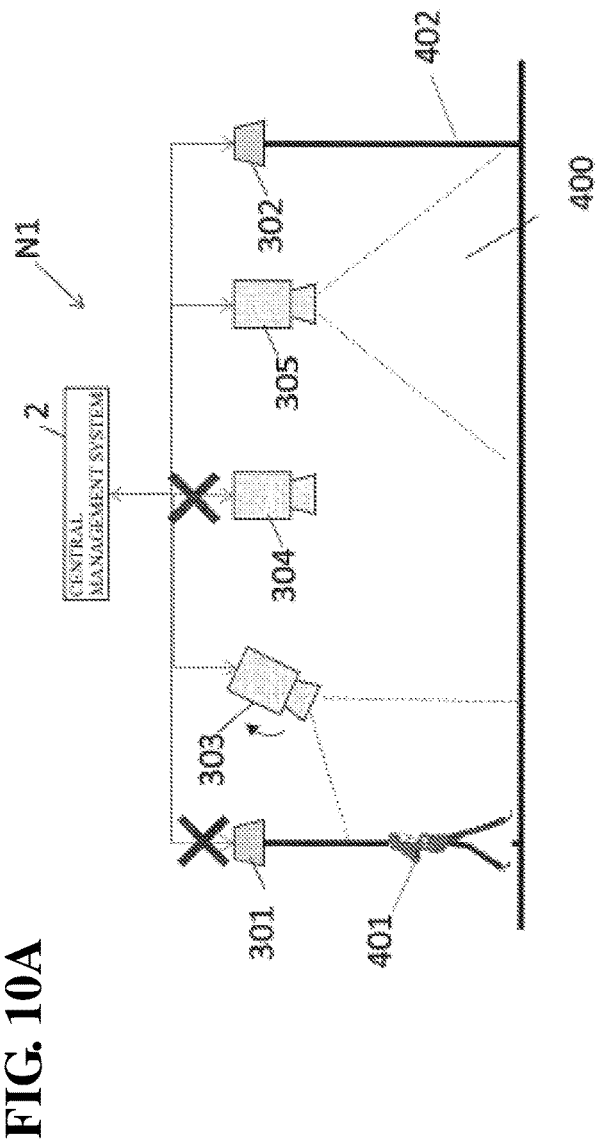
FIGS. 10A and 10B are diagrams illustrating operations of a network system that is changed from a state, such as in FIG. 5.

The first camera 303 swings, and the first camera 303 continuously shoots the door 401. As shown in FIG. 10A, upon the first camera 303 detecting a person entering through the door 401, the first camera 303 starts swinging so as to track the person. Also, the third camera 305 starts shooting, and the third camera 305 swings toward an area that is being shot by the first camera 303. The first camera 303 continuously swings so as to track the person until the person enters the shooting range of the third camera 305.

Figure 10B:
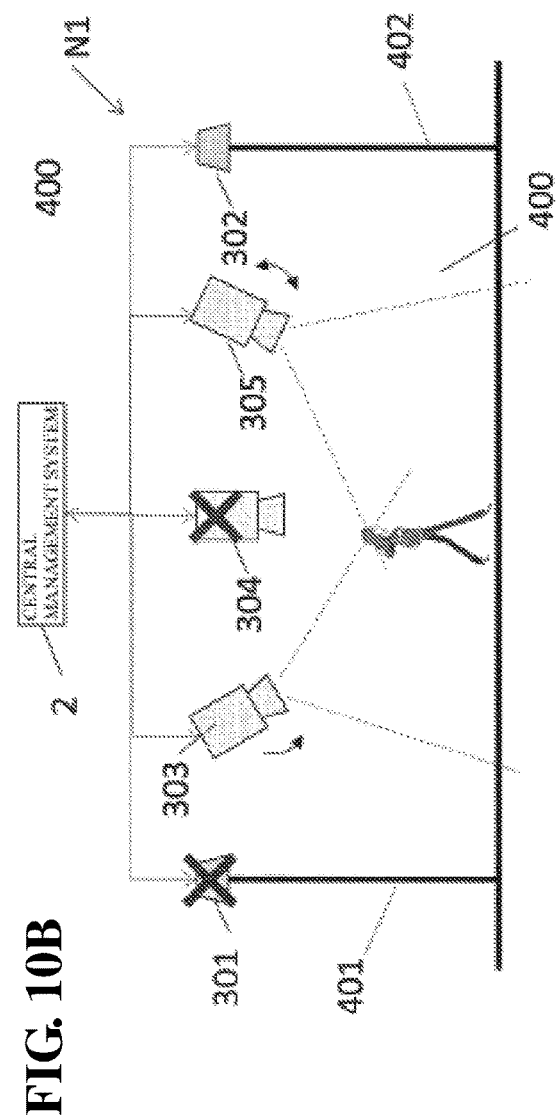

As shown in FIG. 10B, upon the person entering the shooting range of the third camera 305, the third camera 305 starts tracking the person, and the third camera 305 swings so as to track the person. Upon the third camera 305 starting tracking of the person, the first camera 303 swings toward a door 401 so as to shoot the door 401.

Then, when the door 402 has been opened, the person has exited, and the door 402 is closed, the third camera 305 ends shooting.

As described above, during normal operation, the sensors (opening/closing sensors and image sensors) that constitute the network system N1 cooperate to achieve the target (objective). Also, when one sensor is physically accessed, considering that the access was made by a malicious person, the behavior of the sensor is changed so as to be stopped, for example.

In the case where one of the sensors has changed its behavior or stopped, the remaining sensors cooperate so as to achieve the target (objective). That is, as a result of changing the operation content from the current state, the target can be achieved.

Note that, in the combination structure (2) shown in FIG. 7, the door 401 is monitored using the swing function of the first camera 303 instead of using the first opening/closing sensor 301. Also, in a combination structure (4) shown in FIG. 7, the door 402 is monitored using a swing function of the third camera 305 instead of using the second opening/closing sensor 302.

Working Example 2

Figure 11:
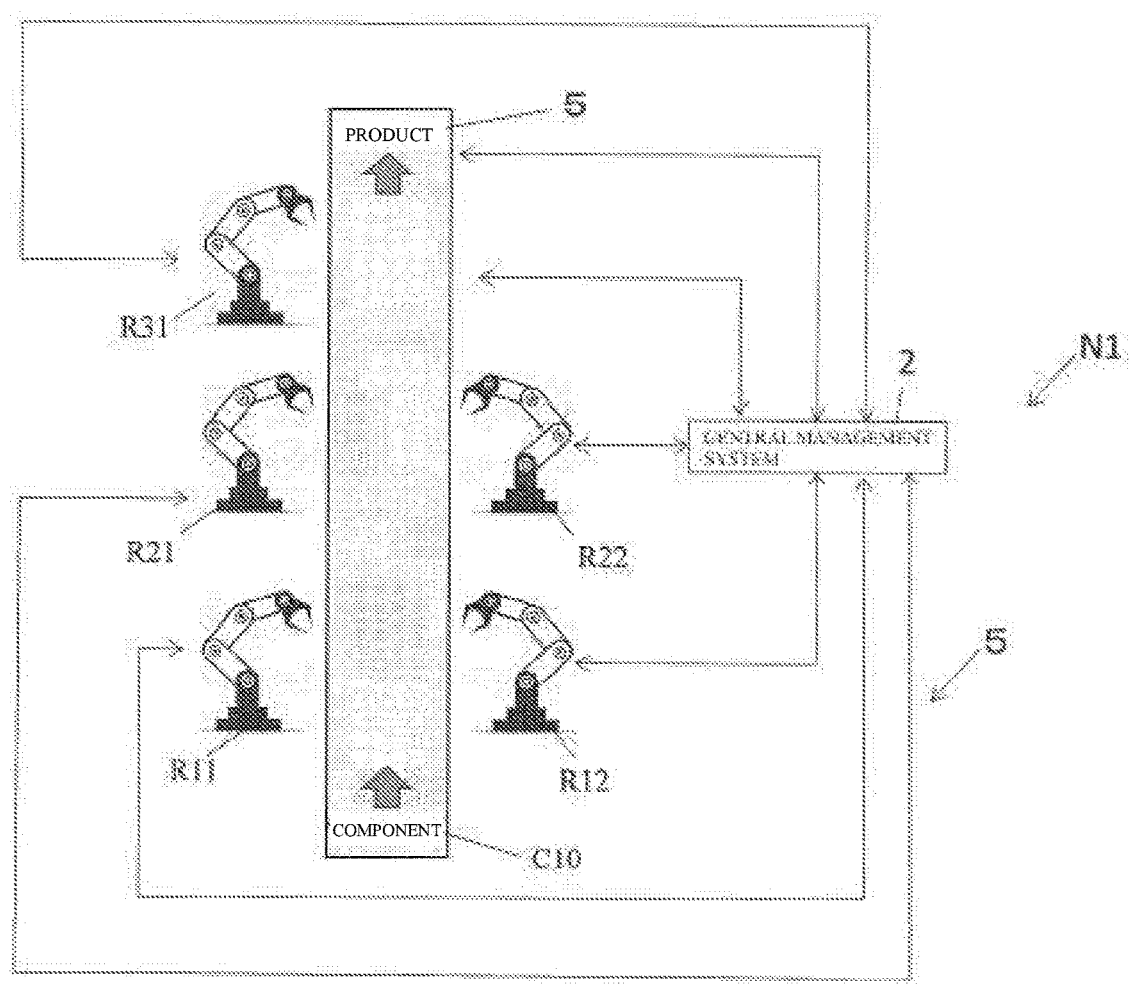
FIG. 11 is a diagram illustrating a configuration of a network system in Working example 2.

A network system N1 of Working example 2 is an assembly line that can produce different components. FIG. 11 is a diagram illustrating a configuration of the network system N1 of Working example 2. As shown in FIG. 11, the network system N1 of Working example 2 includes a conveyer C10 and robots R11, R12, R21, R22, and R31, as subsystems 3. The conveyer C10 and the robots R11, R12, R21, R22, and R31 are connected to a central management system 2 via a network 5. C10 is a conveyor, a conveyance robot, or the like. The robots R11, R12, R21, R22, and R31 are hand robots that pick components, perform assembly, and the like to produce a product.

The network system N1 in Working example 2 can assemble different products (finished products), and assemble different products when assembly is performed (each time assembly is performed, for example) by combining the functions of the conveyer C10 and the robots R11, R12, R21, R22, and R31.

The objective of the network system N1 in Working example 2 is to assemble a predetermined product. The respective functions of the subsystems 3 are set as follows. The conveyer C10 has a function of changing the conveyance speed in a range from 0 to X1. Each of the robots R11, R12, R21, R22, and R31 has a movable range of 360° in a horizontal direction, and a movable range from h1 to h2 ($m$) in a vertical direction. Furthermore, the movable range of a hand portion and the components that can be picked are specified, in advance, as the functions thereof. Also, the conveyer C10 and the robots R11, R12, R21, R22, and R31 also have functions whose content is as described in the specifications of the respective apparatuses.

Also, the subsystems 3, namely the conveyer C10, and the robots R11, R12, R21, R22, and R31, each can determine a failure in the own subsystem. A failure in the own subsystem can be determined from an own subsystem operating state 31$a$, an own subsystem operating environment 31$b$, or the like recognized by an own subsystem recognition unit 31.

Also, in the case where a failure is determined in one subsystem 3, a structure setting unit 23 selects a combination structure in which the apparatus of the subsystem 3 will not be used. Also, in order to realize the objective without using one of the subsystems 3, a combination structure with which the remaining subsystems 3 cooperate to achieve the objective is stored in the combination structure knowledge DB 22$b$. Also, in the case where a selectable combination structure with respect to the target state does not exist in the combination structure knowledge DB 22$b$, the knowledge creation unit 28 creates a combination structure with which the objective can be realized.

Figure 12A:
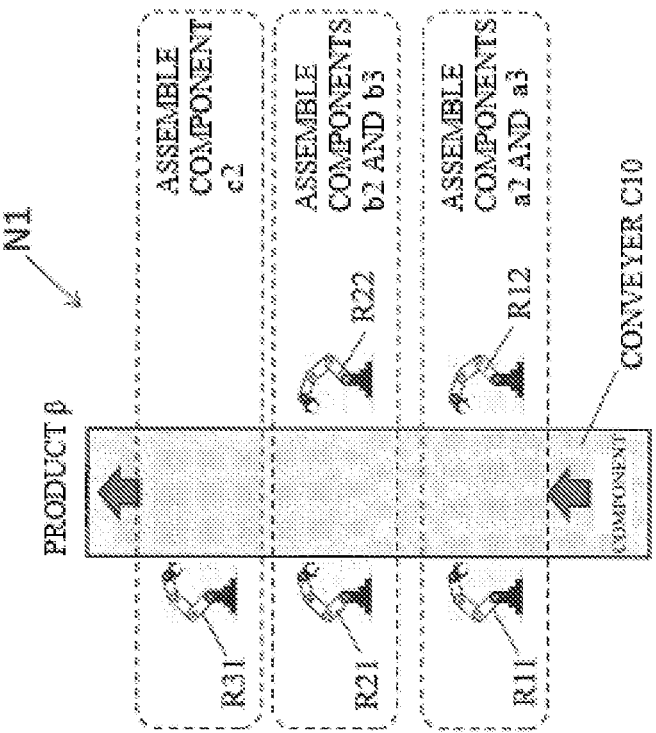
FIGS. 12A and 12B are diagrams illustrating operations when an objective of a network system, such as in FIG. 11, has changed.

An objective of assembling a product α using a network system configured in this way is assumed to be set. FIG. 12A is a diagram illustrating a state in which a product α is assembled by the network system N1. Also, FIG. 13 is a diagram illustrating an example of the combination structure knowledge DB 22$b$ in Working example 2. FIG. 14 is a diagram illustrating the subsystem information DB 22$a$ in a state in which the product α is assembled.

A combination structure for each objective is stored in the combination structure knowledge DB 22$b$, as shown in FIG. 13. Specifically, functions (roles) of the subsystems 3 are set for the assembly of each of products α, ß, and γ. The combination structure for each objective may be created, in advance, by the knowledge creation unit 28 using deep learning, or may be created by a user in advance. When the product α is assembled, the structure setting unit 23 selects a combination structure (1) in FIG. 13, and the functions (roles) are to be executed in the respective subsystems.

In a state shown in FIG. 12A, it is determined that the conveyer C10 is to operate under the conditions of a conveyance speed X1, a stopping time Y1 at the location of robots R11 and R12, a stopping time Y2 at the location of robots R21 and R22, and a stopping time Y3 at the location of a robot R31, as shown in FIG. 14. Also, it is determined that the robots R11 and R12 are to attach a component a1 to a casing. Also, it is determined that the robots R21 and R22 are to attach a component b1 to the casing. Also, it is determined that the robot R31 is to attach a component c1 to the casing.

These functions (roles) are determined by the role determination unit 24 based on a combination structure selected by the structure setting unit 23, and are notified to the conveyer C10 and the robots R11, R12, R21, R22, and R31 by the role notification unit 25.

As a result of the conveyer C10 and the robots R11, R12, R21, R22, and R31 performing the determined operations, the product α is assembled.

Change of Objective

Next, a case where the objective has been changed will be described.

Upon a user inputting a target state of assembling a product ß, for example, the objective acceptance unit 21 accepts the target state (step S11).

Next, in step S12, each of the conveyer C10 and the robots R11, R12, R21, R22, and R31 recognizes the function and state, and the shared information communication unit 27 acquires these functions and pieces of information.

The structure setting unit 23, similarly to Working example 1, selects a combination structure with which the product ß can be assembled, from the combination structure knowledge DB 22b (step S13). Here, if a combination structure with which the product ß can be assembled does not exist, the knowledge creation unit 28 creates a combination structure with which the product ß can be assembled based on the operating state, the operating environment, and the function of each of the subsystems 3 stored in the subsystem information DB. Also, in step S14, the role determination unit 24 determines the functions of the conveyer C10 and the robots R11, R12, R21, R22, and R31 based on the combination structure selected by the structure setting unit 23. Next, in step S15, these functions are respectively notified to the conveyer C10 and the robots R11, R12, R21, R22, and R31 by the role notification unit 25.

Figure 12B:
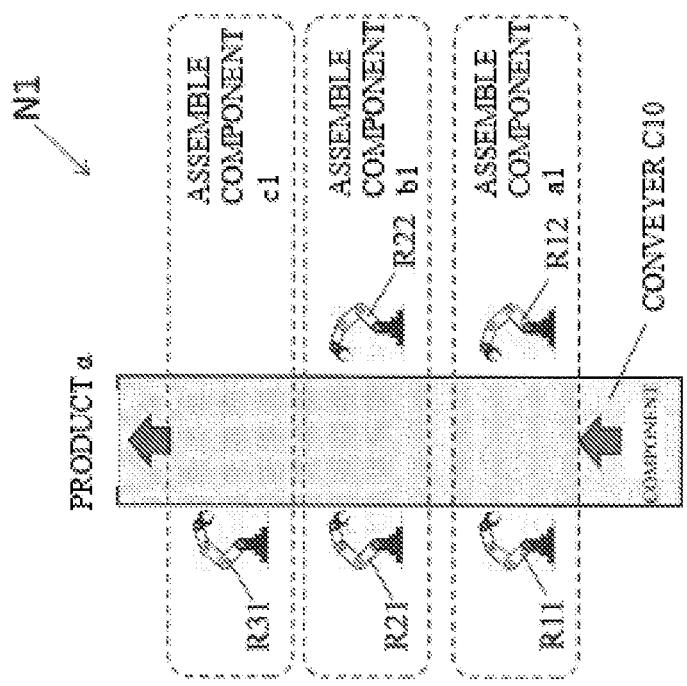

FIG. 12B is a diagram illustrating a state in which the product ß is assembled by the network system N1. In FIG. 12B, the parameters of the function (also referred to as a role or an operation content) of the conveyer C10 are determined as being a conveyance speed X1, a stopping time Y4 at the location of the robots R11 and R12, a stopping time Y5 at the location of the robots R21 and R22, and a stopping time Y6 at the location of a robot R31. Also, it is determined that the function (role, operation content) of the robots R11 and R12 is to attach components a2 and a3 to a casing. Also, it is determined that the function (role, operation content) of the robots R21 and R22 is to attach components b2 and b3 to the casing. Also, it is determined that the function (role, operation content) of the robot R31 is to attach a component c2 to the casing.

As a result of the conveyer C10 and the robots R11, R12, R21, R22, and R31 performing respective functions determined as described above, the product ß is assembled.

As described above, according to the network system N1 of Working example 2, even in a case where the target state is changed from assembly of the product α to assembly of product ß, the objective can be realized.

Case where State of Subsystem has Changed

Next, a case where the state of a subsystem 3 has changed will be described.

Here, the assembly of the component b1, at this time, is assumed to be performed by the robot R21 and the robot R22 working in collaboration. Also, the robots are assumed to further have the following functions.

It is assumed that the robot R11 can replace the robot R21 or R31 with respect to individual work, the robot R12 can replace the robot R22 with respect to individual work, and the robot R31 can replace the robot R11 or the robot R21 with respect to individual work. Also, it is assumed that the collaborative work performed by the robot R11 and the robot R12 can be replaced by collaborative work performed by the robot R21 and the robot R22, and the collaborative work performed by the robot R21 and the robot R22 can be replaced by collaborative work performed by the robot R11 and the robot R12.

In such a configuration of the network system N1, a case is assumed where, while the product α is being assembled, as described in FIG. 12A, the robot R22 recognizes a failure in the own robot.

In step S16, when the robot R22 recognizes a failure in the own robot, the central management system 2 is notified of this fact, and the central management system 2 recognizes the state of the robot R22 (step S12). Note that if the robot R22 cannot report the failure in the own robot due to a malfunction, the central management system 2 can receive information regarding the failure in the robot R22 from an other subsystem recognition unit 32 of another robot R.

Next, the structure setting unit 23 selects a combination structure from the combination structure knowledge DB 22b with respect to the functions for achieving the objective of assembling the product α in a state in which the robot R22 is stopped (step S13). If such a combination structure does not exist, the knowledge creation unit 28 creates a combination structure with which the product α can be assembled in a state in which the robot R22 is deactivated based on the functions and the states (operating states and operating environments) of the conveyer C10 and the robots R11, R12, R21, R22, and R31. Then, the role determination unit 24 determines the functions of the conveyer C10 and the robots R11, R12, R21, R22, and R31 based on the selected combination structure (step S14). Also, the determined functions are notified to the conveyer C10 and the robots R11, R12, R21, R22, and R31, respectively (step S15).

Figure 15:
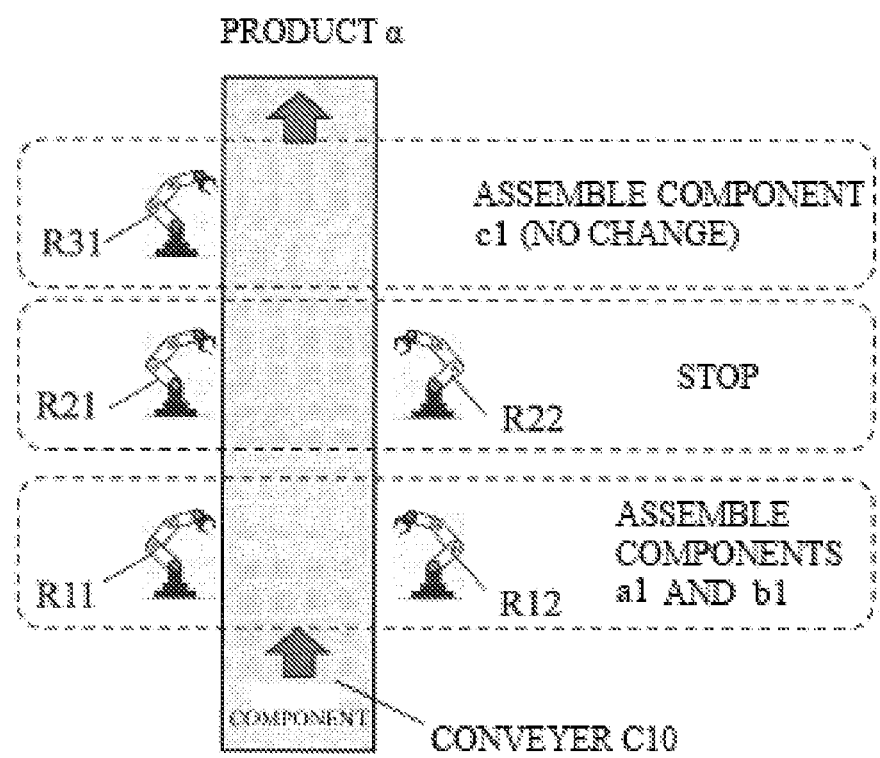
FIG. 15 is a diagram illustrating operations when a state of a subsystem has changed in a network system, such as in FIG. 11.

FIG. 15 is a diagram illustrating an example of the operation contents (determined functions) of the respective subsystems 3 in the case of assembling the product α without using the robot R22.

In the example shown in FIG. 15, the conveyance speed of the conveyer C10 is X1, the stopping time of the conveyer C10 at the robots R11 and R12 is set to Y7, the stopping time thereof at the robots R21 and R22 is zero, and the stopping time thereof at the robot R31 is set to Y3. Also, the robots R11 and R12 assemble the components a1 and b1. The robots R21 and R22 stop. The robot R31 attaches the component c1 to the casing.

Figure 16A:
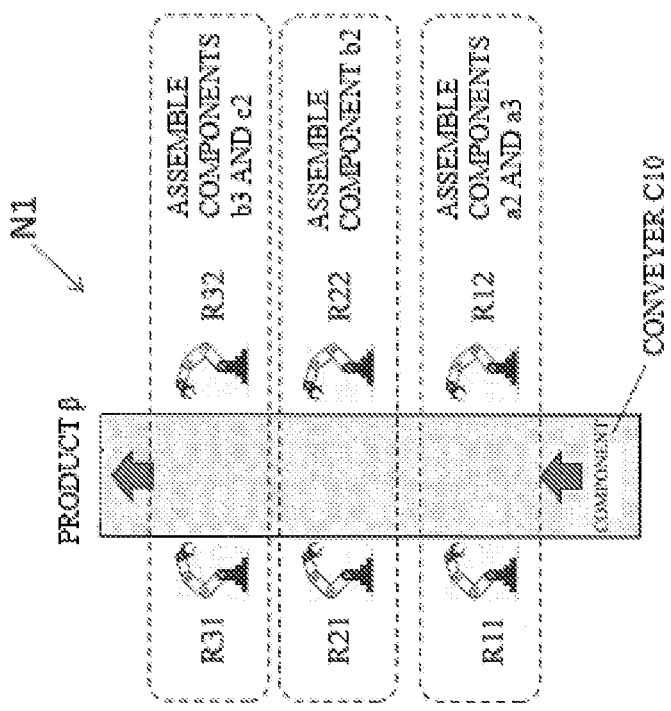
FIGS. 16A and 16B are diagrams illustrating operations when a new subsystem has been added to a network system, such as in FIG. 11.

Accordingly, the product α can be assembled without using the robot R21. Case where a new subsystem is added As shown in FIG. 16A, a case where a new robot R32 is added to the network system N1 while the product ß is being assembled will be described.

The operation contents of the respective subsystems 3 (conveyer C10 and the robots R11, R12, R21, R22, and R31) for executing an objective of assembling the product ß are set as follows. The parameters of the function (role, operation content) of the conveyer C10 are determined as being a conveyance speed X1, a stopping time Y4 at the location of the robots R11 and R12, a stopping time Y5 at the location of the robots R21 and R22, and a stopping time Y6 at the location of a robot R31. Also, it is determined that the function (role, operation content) of the robots R11 and R12 is to attach the components a2 and a3 to the casing. Also, it is determined that the function (role, operation content) of the robots R21 and R22 is to attach the components b2 and b3 to the casing. Also, it is determined that the function (role, operation content) of the robot R31 is to attach the component c2 to the casing.

When a new robot R32 is added in this state, the fact that the robot R32 has been added is recognized by the own subsystem recognition unit 31 of the robot R32, or the other subsystem recognition unit 32 of another robot R, and the central management system 2 is notified of this fact, in step S16. Then, the central management system 2 recognizes the state of the robot R32 (step S12).

Next, the structure setting unit 23 selects a combination structure with which the objective of assembling the product ß using the robot R32 as well (step S13) is achieved. If such a combination structure does not exist in the combination structure knowledge DB 22b, the knowledge creation unit 28 creates a combination structure with which the objective of assembling the product ß can be implemented while incorporating the robot R32. The role determination unit 24 determines the functions of the conveyer C10 and the robots R11, R12, R21, R22, R31, and R32 based on the combination structure, in step S14. Also, in step S15, the determined functions are notified to the conveyer C10 and the robots R11, R12, R21, R22, R31, and R32, respectively.

Figure 16B:
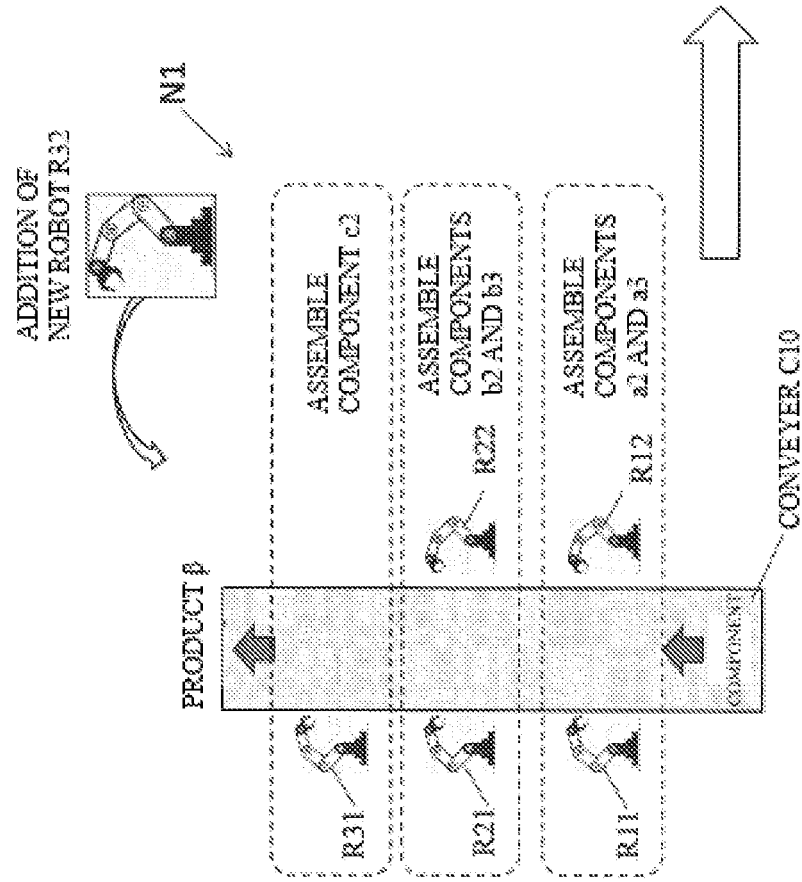

For example, as shown in FIG. 16B, the functions (roles, operation contents) of the respective subsystems 3 (conveyer C10 and the robots R11, R12, R21, R22, R31, and R32) are determined. The parameters of the function (role, operation content) of the conveyer C10 are determined as being a conveyance speed X1, a stopping time Y4 at the location of the robots R11 and R12, a stopping time Y8 at the location of the robots R21 and R22, and a stopping time Y9 at the location of the robots R31 and R32. Also, it is determined that the function (role, operation content) of the robots R11 and R12 is to attach the components a2 and a3 to the casing. Also, it is determined that the function (role, operation content) of the robots R21 and R22 is to attach the component b2 to the casing. Also, it is determined that the function (role, operation content) of the robots R31 and R32 is to attach the components b3 and c2 to the casing.

As a result of changing the functions (also referred to as roles) of the devices, even in a case where a subsystem 3 is introduced, the network system N1 can achieve the target state.

Embodiment 2

Next, a network system N2 in Embodiment 2 will be described. In the network system N2 of Embodiment 2, the function of setting the roles of each of the subsystems 3 is provided in one of the subsystems 3. The network system N2 in Embodiment 2 does not include the central management system 2, compared with the network system N1 in Embodiment 1. Embodiment 2 will be described, mainly regarding differences from Embodiment 1. Note that, in Embodiment 2, the same reference signs are given to constituent elements that are the same as those in Embodiment 1.

Configuration

Figure 17:
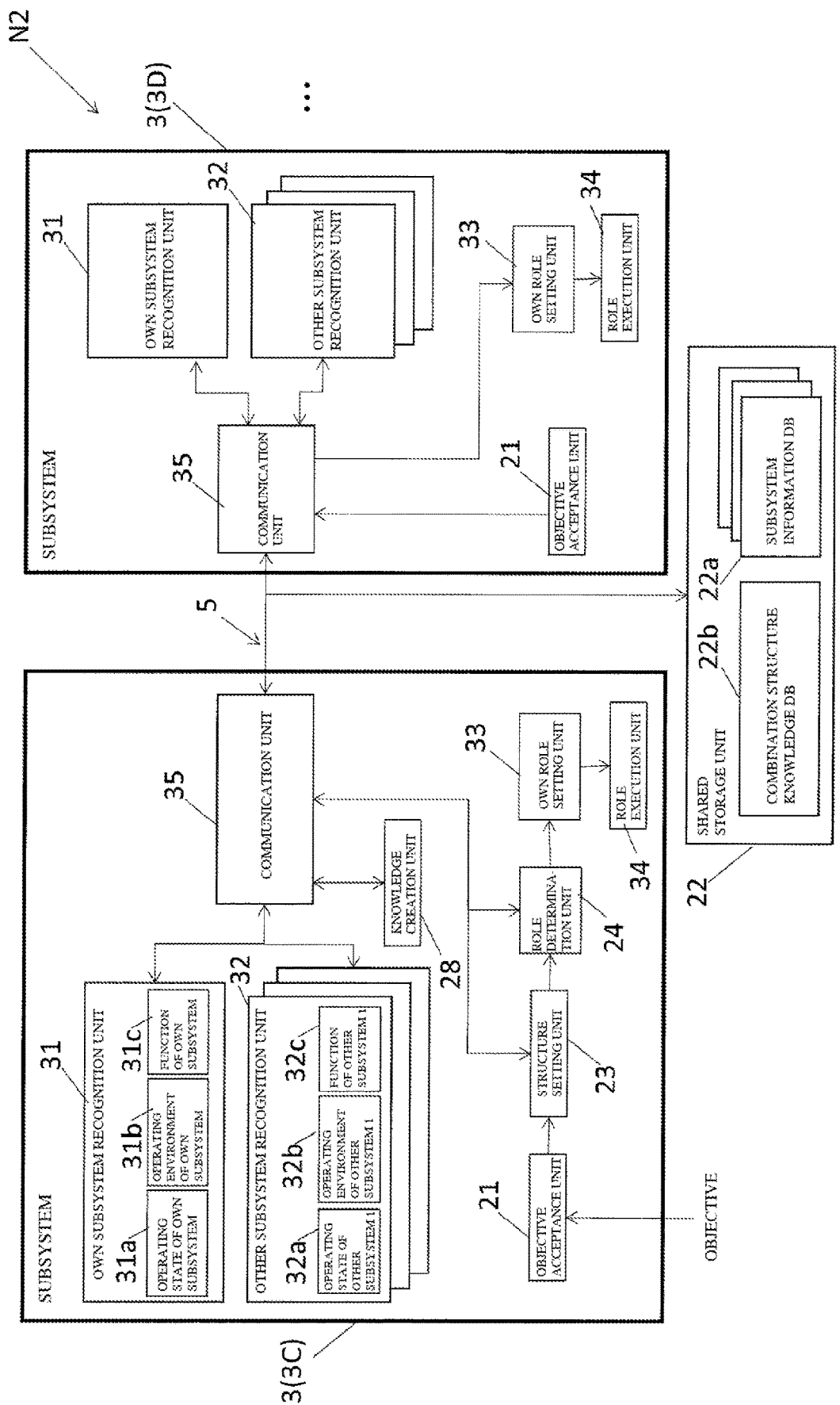
FIG. 17 is a diagram illustrating a configuration of a network system in Embodiment 2.

FIG. 17 is a block diagram illustrating a configuration of the network system N2 of Embodiment 2. As shown in FIG. 17, the network system N2 includes a plurality of subsystems 3 (3C and 3D) and a shared storage unit 22. The subsystems 3 (3C and 3D) each include an objective acceptance unit 21, an own subsystem recognition unit 31, an other subsystem recognition unit 32, an own role setting unit 33, a role execution unit 34, and a communication unit 35. Although the objective acceptance unit 21 is provided in the central management system 2 in Embodiment 1, the objective acceptance unit 21 is provided in each of the subsystems 3 in Embodiment 2. The subsystems 3 are connected to a network 5 via the respective communication units 35.

The shared storage unit 22 is connected to the network 5, and is provided as an apparatus separate from the subsystems 3 in FIG. 17.

The shared storage unit 22 is provided with a subsystem information DB 22a and a combination structure knowledge DB 22b, similarly to Embodiment 1. An own subsystem operating state 31a, an own subsystem operating environment 31b, and an own subsystem function 31c that are recognized by the own subsystem recognition unit 31 are transmitted to the subsystem information DB 22a from the communication unit 35, in each of the plurality of subsystems 3. Note that the subsystem information DB 22a may receive the operating states, operating environments, and functions, of all of the subsystems, that are obtained by the own subsystem recognition unit 31 and the other subsystem recognition unit 32 of one subsystem 3.

Also, one subsystem 3 of the plurality of subsystems 3 connected to the network system N2 includes a structure setting unit 23 and a role determination unit 24. In Embodiment 2, the subsystem 3C includes the structure setting unit 23 and the role determination unit 24. That is, in Embodiment 2, in place of the central management system 2 in Embodiment 1, the subsystem 3C selects a combination structure, and determines functions (also referred to as roles or operation content) of all of the subsystems 3 including the own subsystem 3C.

Also, in the network system N2 in Embodiment 2, because each subsystem 3 includes the objective acceptance unit 21, when a target state is input to one of the subsystems 3, the information regarding the target state can be mutually communicated via the network 5.

Operations

Next, the operations of the network system N2 of Embodiment 2 will be described, and an example of the function setting method will be described as well.

Figure 18:
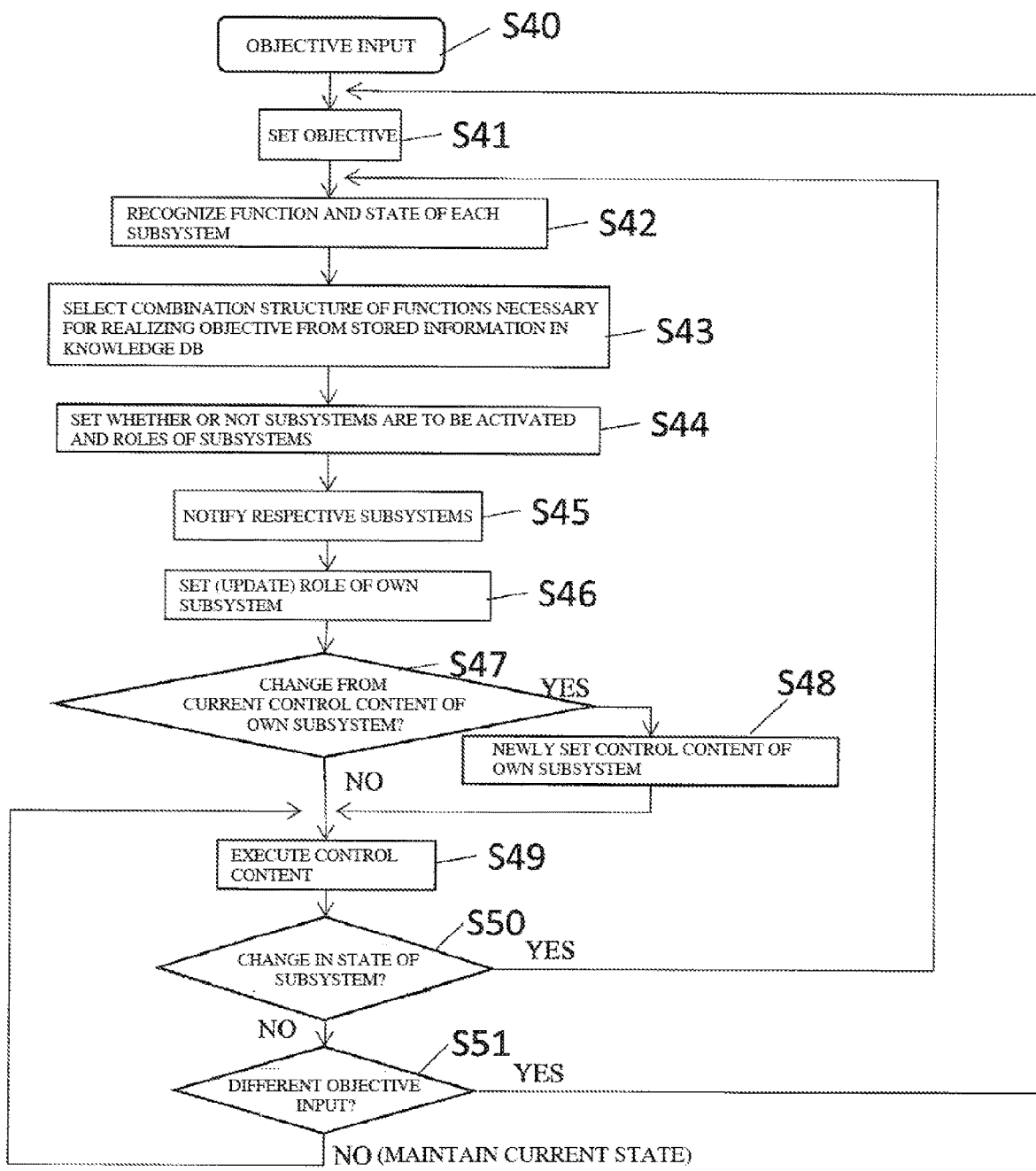
FIG. 18 is a flow diagram illustrating operations of a network system, such as in FIG. 17.

FIG. 18 is a flow diagram illustrating operations of the network system N2 of Embodiment 2.

Upon a target state setting being input by a user using an unshown terminal or the like, in step S40, the target state setting is accepted by the objective acceptance unit 21 of one of the subsystem 3, in step S41. Here, if a subsystem 3 (subsystem 3D, in FIG. 17) that does not include the structure setting unit 23 has accepted the target setting, the target setting is communicated to a subsystem 3 that includes the structure setting unit 23 via the communication unit 35 and the network 5. Accordingly, the subsystem 3C including the structure setting unit 23 receives the target state that has been accepted. Step S41 corresponds to an example of an objective acceptance step.

Next, in step S42, the subsystem 3C including the structure setting unit 23 recognizes the function and state of each of the subsystems 3 using the own subsystem recognition unit 31 and the other subsystem recognition unit 32. Step S42 corresponds to an example of a self-recognition step and an acquisition step.

Next, in step S43, the structure setting unit 23 of the subsystem 3C selects a combination structure of functions necessary for realizing the accepted target state from the combination structure knowledge DB 22b. That is, the structure setting unit 23 selects the combination structure associated with the accepted target state from combination structures associated with respective target states stored in the combination structure knowledge DB 22b. The combination structures associated with the respective target states are created, in advance, by the knowledge creation unit 28 using machine learning such as deep learning, for example. On the other hand, in the case where the combination structure associated with the accepted target state does not exist in the combination structure knowledge DB 22b, the knowledge creation unit 28 creates a combination structure based on the target state and the operating state, operating environment, and function of each of the subsystems 3. Also, the structure setting unit 23 selects the newly created combination structure. Step S43 corresponds to an example of a structure setting step.

Next, in step S44, the role determination unit 24 sets whether or not each of the subsystems 3 that are the targets of combination will be activated and the function (role) of each of the subsystems 3 based on the combination structure selected by the structure setting unit 23. Here, whether or not a subsystem 3 will be activated means whether or not operations of all of or at least one of the functions of the subsystem 3 will be executed or stopped. The step S44 corresponds to an example of a determination step.

Next, in step S45, the subsystem 3C notifies the other subsystems 3 (3D etc.) of the respective functions (roles) via the communication unit 35. Step S45 corresponds to an example of a notification step.

Next, in step S46, the own role setting unit 33 sets (updates) the own function (role).

Next, in step S47, the own role setting unit 33 determines whether or not the control content in the updated own function has changed from the current own control content. If there is a change, the own role setting unit 33 newly sets the own control content based on the newly set own function (role), in step S48.

Also, in step S49, each subsystem 3 executes the own control content set by the role execution unit 34.

Note that, in the case where the state of any of the subsystems 3 has changed and the current target state cannot be implemented, in step S50, the subsystem 3C receives information, in step S42, from the own subsystem recognition unit 31 of the subsystem 3 whose state has changed, and executes steps S42 to S45 again. That is, a new combination structure is selected, the functions of the respective subsystems 3 are determined based on the new combination structure, and the subsystems 3 are notified of the respective functions.

Also, if a different target state has been input by the user, in step S51, a new objective is set by the objective acceptance unit 21 of one of the subsystems 3, in step S41. Then, steps S42 to S45 are executed, functions of the subsystems 3 are determined based on the new combination structure, and the subsystems 3 are notified of the respective functions.

Note that a working example in Embodiment 2 may have a configuration in which any one of the plurality of subsystems 3 (first opening/closing sensor 301, second opening/closing sensor 302, first camera 303, second camera 304, third camera 305) in Working example 1 is the subsystem 3C that includes the structure setting unit 23 and the role determination unit 24, as shown in FIG. 17, for example. Also, the working example may have a configuration in which any one of the plurality of subsystems 3 (conveyer C10 and the robots R11, R12, R21, R22, and R31) in Working example 2 is the subsystem 3C that includes the structure setting unit 23 and the role determination unit 24, as shown in FIG. 17, for example.

Embodiment 3

Next, a network system N3 in Embodiment 3 will be described.

Configuration

Figure 19:
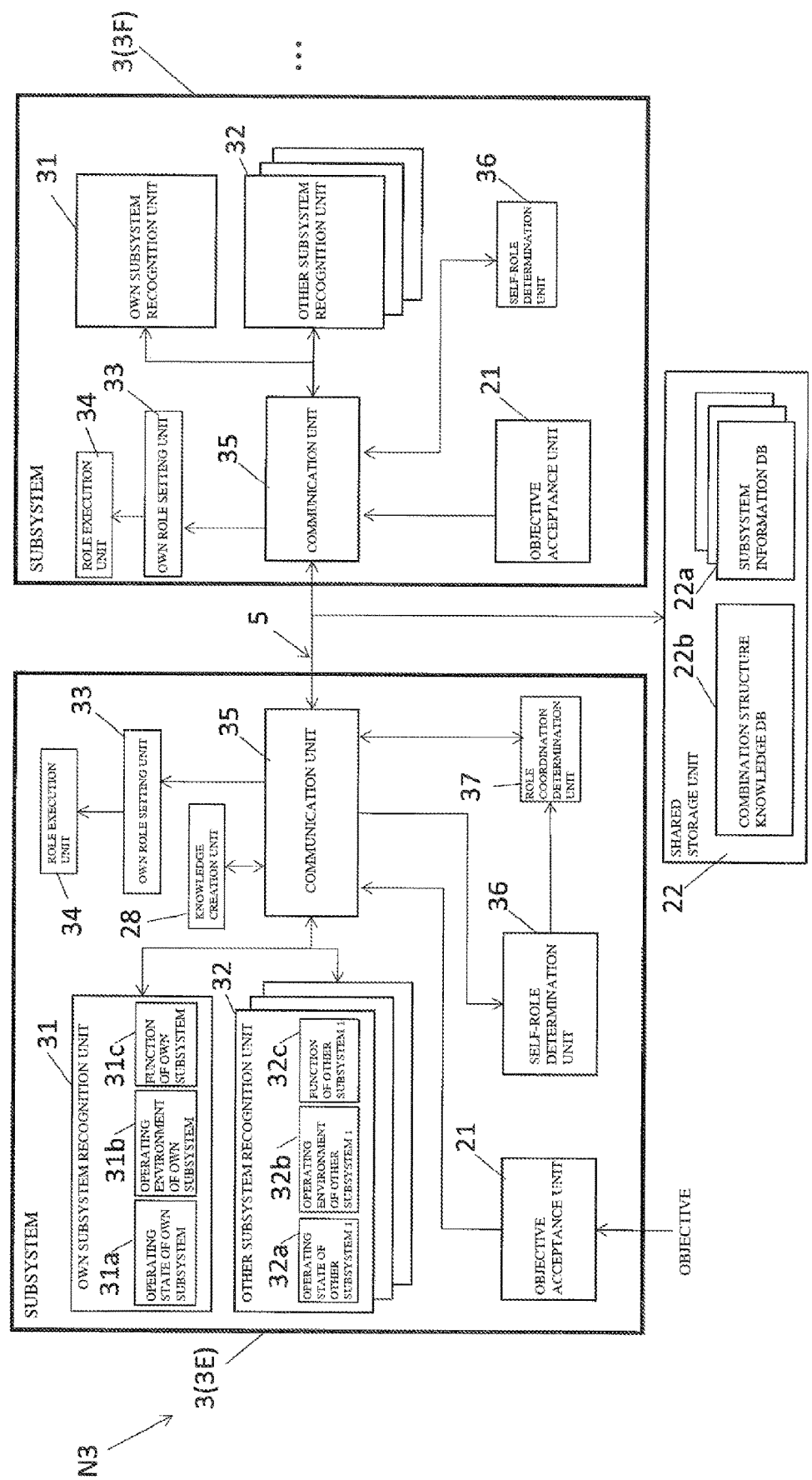
FIG. 19 is a diagram illustrating a configuration of a network system in Embodiment 3.

FIG. 19 is a block diagram illustrating a configuration of the network system N3 of Embodiment 3.

In the network system N3 of Embodiment 3, different from the network system N2 of Embodiment 2, each subsystem 3 determines the own role, and one subsystem 3 that includes a role coordination determination unit 37 coordinates the roles of the respective subsystems 3. Embodiment 3 will be described mainly regarding differences from Embodiment 2. Note that, in Embodiment 3, the same reference signs are given to constituent elements that are the same as those in Embodiment 2.

The network system N3 of Embodiment 3 includes a plurality of subsystems 3 (3E and 3F) and a shared storage unit 22. Each subsystem 3 includes an objective acceptance unit 21, an own subsystem recognition unit 31, an other subsystem recognition unit 32, an own role setting unit 33, a role execution unit 34, a communication unit 35, a self-role determination unit 36 (an example of a structure setting unit). Also, some of the plurality of subsystems 3 that are connected to a network 5 (subsystem 3E, for example) are each provided with a knowledge creation unit 28 and a role coordination determination unit 37 (an example of a function determination unit).

The knowledge creation unit 28 creates a combination structure of functions of the subsystems 3 necessary for realizing a target state from operating states, operating environments, and functions of the subsystems 3 stored in the subsystem information DB 22a and the target state accepted by the objective acceptance unit 21.

The self-role determination unit 36 included in each subsystem 3 selects, based on the target state accepted by one of the subsystems 3, a combination structure with which the target state can be realized from a combination structure knowledge DB 22b, and determines an own role. Also, each subsystem 3 transmits the role to a subsystem 3 that is set as a leader that coordinates the roles. For example, in the case where the subsystem 3E is set as a leader, the own roles determined by the respective subsystems 3 are transmitted to the subsystem 3E from the other subsystems 3.

The role coordination determination unit 37 coordinates the roles of a plurality of subsystems 3 including the own subsystem 3 and determines the roles of the respective subsystems 3 based on the roles that have been transmitted from the other subsystems 3 (3F, for example). Note that, in the case where a plurality of subsystems 3 include the role coordination determination unit 37, the subsystem 3 that performs coordination with respect to the objective of this time is determined each time. Then, only the determined subsystem 3 performs, as a leader, coordination using the role coordination determination unit 37, and the other subsystems follow the leader. Also, in the case where only one subsystem 3 includes the role coordination determination unit 37, the subsystem 3 always performs coordination using the role coordination determination unit 37.

Operations

Next, the operations of the network system N3 of Embodiment 3 will be described, and an example of the function setting method will be described as well.

Figure 20:
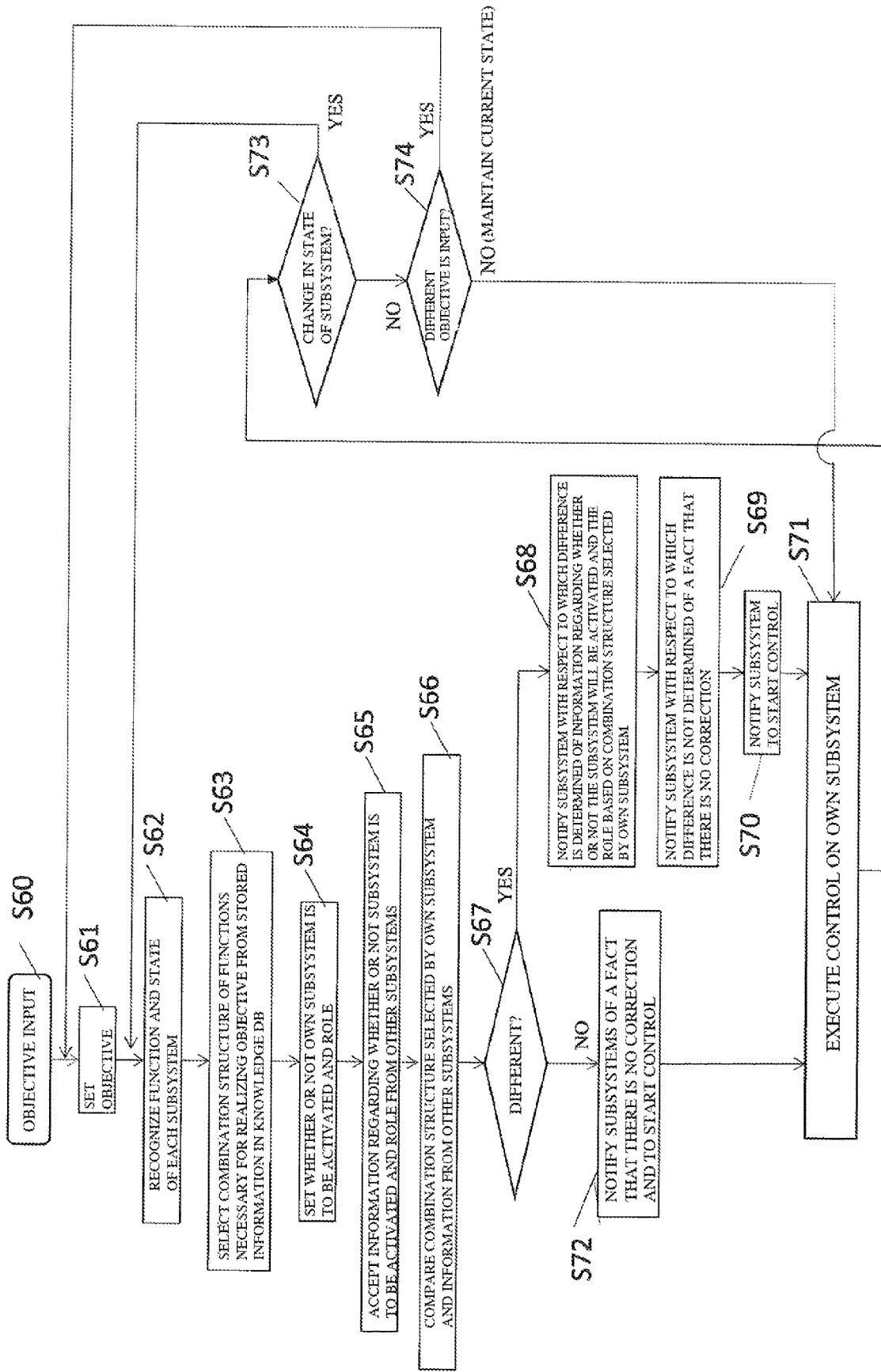
FIG. 20 is a flow diagram illustrating operations of a network system, such as in FIG. 19.

FIG. 20 is a flow diagram illustrating operations of the network system N3 of Embodiment 3. Upon a target state setting being input by a user using an unshown terminal or the like, in step S60, the target state setting is accepted by the objective acceptance unit 21 of one of the subsystems 3, in step S61. Here, the target state accepted by the one of the subsystems 3 is communicated to all of the other subsystems 3 via the communication unit 35 and the network 5. Step S61 corresponds to an example of an objective acceptance step.

Next, in step S62, each subsystem 3 comprehends the functions and states of all of the subsystems 3 that are connected to the network system N3 using the own subsystem recognition unit 31 and the other subsystem recognition unit 32. Step S62 corresponds to an example of a self-recognition step and an acquisition step.

Next, in step S63, the self-role determination unit 36 in each subsystem 3 selects a combination structure of functions necessary for realizing the target state from combination information stored in the combination structure knowledge DB 22b. Step S63 corresponds to an example of a structure setting step.

Note that, if a combination structure that can realize the accepted target state does not exist, the subsystem 3 that is provided with the knowledge creation unit 28 and the role coordination determination unit 37 creates a combination structure using the knowledge creation unit 28. On the other hand, each subsystem 3 that does not include the knowledge creation unit 28 selects information indicating "no appropriate choice is present".

Next, in step S64, each subsystem 3 determines whether or not the subsystem 3 will be activated and the role based on the selected or created and selected combination structure.

Next, in step S65, the subsystem 3 that performs coordination accepts, from each of the other subsystems 3, information regarding whether or not the subsystem 3 will be activated and the role thereof. Here, the subsystem 3E is assumed to be the subsystem 3 that performs coordination.

Next, in step S66, the role coordination determination unit 37 of the subsystem 3E compares the combination structure selected by the own subsystem with information from each of the other subsystems 3. Then, the role coordination determination unit 37, upon determining that there is a difference therebetween, in step S67, notifies the subsystem 3 with respect to which a difference is determined of the information regarding whether or not the subsystem 3 will be activated and the role thereof based on the combination structure selected by the subsystem 3E, in step S68. Steps S66 and S67 correspond to an example of a determination step.

Also, the role coordination determination unit 37 notifies the subsystem 3 with respect to which a difference is not determined of a fact that there is no correction, in step S69. In the subsystem 3 with respect to which a difference was determined, the own role setting unit 33 updates the own role based on the notified information. On the other hand, in the subsystem 3 with respect to which a difference was not determined, the own role setting unit 33 updates the own role based on the role determined by the own subsystem 3. Note that, if there is no change from the previous role, updating may not be performed.

Next, in step S70, the subsystem 3E notifies the other subsystems 3 (3F, for example) to start control via the communication unit 35. Upon receiving the notification, the other subsystems 3 other than the subsystem 3E execute, based on the updated roles, the respective roles using the respective role execution units 34.

Thereafter, in step S71, the subsystem 3E updates the own role using the own role setting unit 33, and executes the own role using the role execution unit 34.

Note that, if no difference was determined by the role coordination determination unit 37, in step S67, the role coordination determination unit 37 notifies each of the subsystems 3 of the fact that there is no correction and to start control, in step S72. Next, the control advances to step S71, and control on its own (subsystem 3E) is executed. Steps S68, S69, and S72 correspond to an example of a notification step.

Also, in the case where the state of any of the subsystems 3 has changed and the current target state cannot be implemented, in step S73, each subsystem 3 receives information from the other subsystem recognition unit 32, in step S62, and steps S62 to S72 are again executed. That is, each subsystem 3 selects a new combination structure, and each subsystem 3 determines the own function based on the new combination structure. Then, the subsystem 3E coordinates the functions of the other subsystems 3.

Also, if a different target state has been input by the user, in step S74, a new objective is set by the objective acceptance unit 21 of one of the subsystems 3, in step S61. Then, steps S62 to S72 are executed, functions of the subsystems 3 are determined based on the new combination structure, and the subsystems 3 execute the respective functions.

Embodiment 4

In a network system N4 of Embodiment 4, different from the network system N3 of Embodiment 3, all subsystems 3 that are connected to a network 5 are each provided with a knowledge creation unit 28 and a role coordination determination unit 37.

Figure 21:
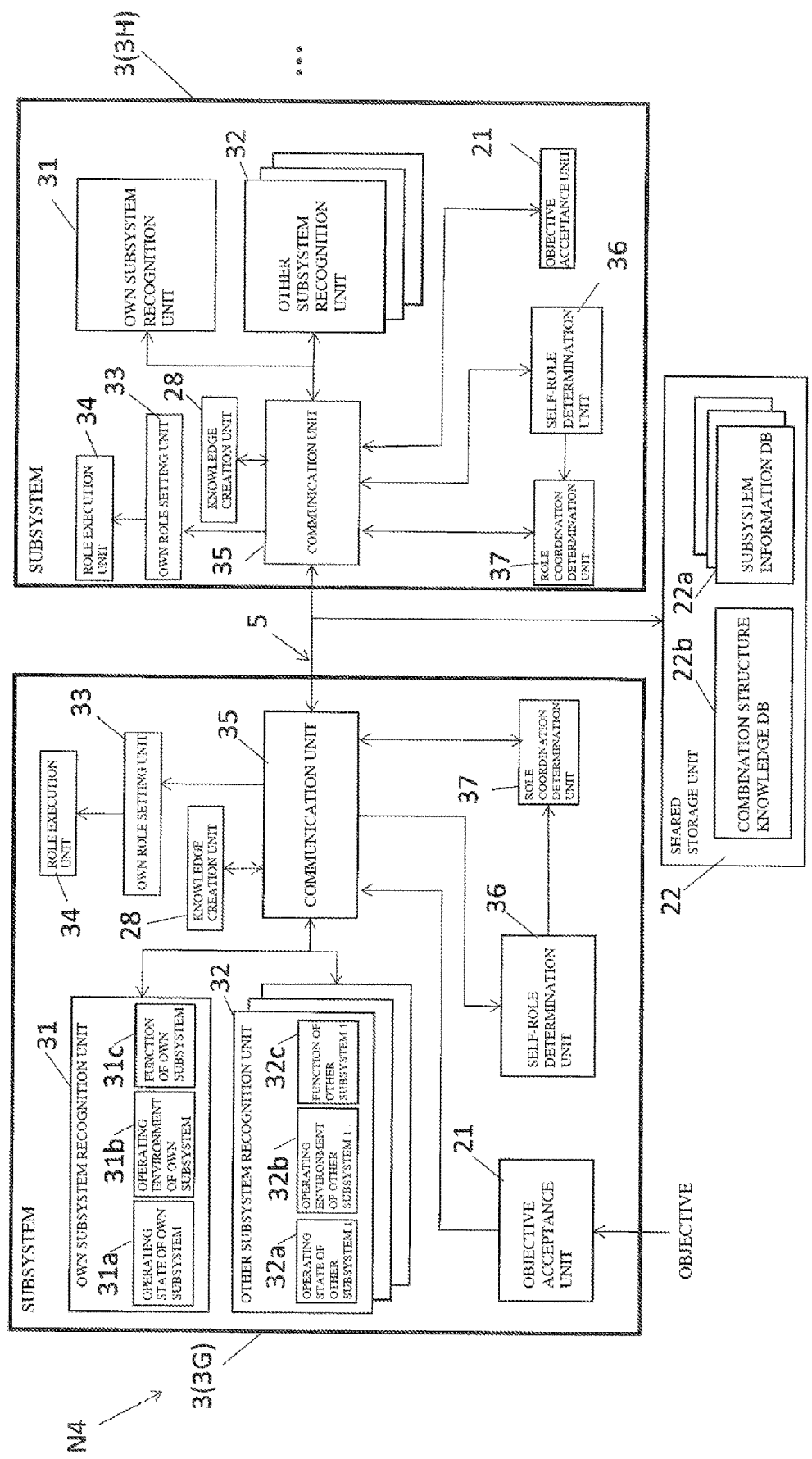
FIG. 21 is a diagram illustrating a configuration of a network system in Embodiment 4.

FIG. 21 is a block diagram illustrating a configuration of the network system N4 in Embodiment 4. As shown in FIG. 21, in the network system N4 of Embodiment 4, all of the subsystems 3 (subsystems 3G and 3H, in FIG. 21) are each provided with the knowledge creation unit 28 and the role coordination determination unit 37.

As described in Embodiment 3 as well, because the plurality of subsystems 3 respectively include the role coordination determination units 37, upon the target state being set, a subsystem 3 that is to be a leader for performing coordination of the entire system is determined. Then, the determined subsystem 3 coordinates the roles of the other subsystems 3 using the role coordination determination unit 37. The subsystem 3 that is the leader may be changed for each objective, or may not be changed. Also, the subsystem 3 that is the leader may be changed based on the states of the subsystems 3.

Because all of the subsystems 3 are each provided with the knowledge creation unit 28 and the role coordination determination unit 37 in this way, even in a case where one subsystem 3 has failed or stopped, another subsystem 3 can function in place of the failed or stopped subsystem 3, and as a result, the target state can be stably realized.

Note that, because the operations of the network system N4 are the same as the operations in the flow diagram shown in FIG. 20, the description thereof will be omitted.

Working Example 3

Next, the network system N4 of Embodiment 4 will be described in detail using Working example 3.

Figure 22:
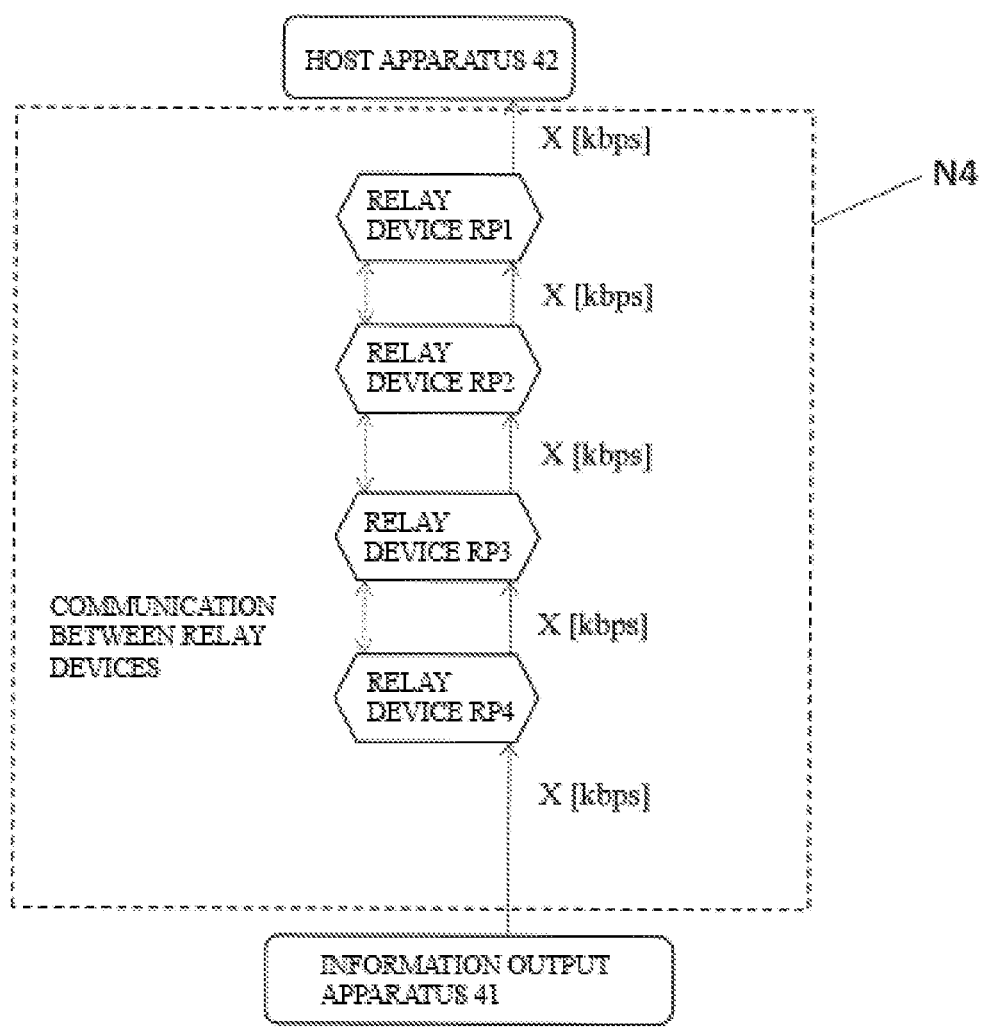
FIG. 22 is a diagram illustrating a configuration of a network system in Working example 3.

The network system N4 of Working example 3 is a multihop communication network in which communication areas are mutually complemented considering the state of a power supply. FIG. 22 is a diagram illustrating a configuration of the network system N4 of Working example 3.

A relay device RP1, a relay device RP2, a relay device RP3, and a relay device RP4 are provided as subsystems 3 of the network system N4 of Working example 3. The relay device RP1, relay device RP2, relay device RP3, and relay device RP4 are provided between an information output apparatus 41 such as a sensor and a host apparatus 42 that ultimately acquires information. That is, information sent from the information output apparatus 41 is transmitted to the host apparatus 42 via all of or at least one of the relay device RP1, the relay device RP2, the relay device RP3, and the relay device RP4.

Also, the following content can be given as the target states, for example.

Battery operating time of the network system N4 as a whole is maximized, as Example 1.
Continuously operates until a specific timing such as a scheduled maintenance date and time, as Example 2.
Battery consumptions in all of the respective relay devices are controlled to be uniform, as Example 3.
Specifically important specific data is transmitted in a given period of time, as Example 4.

Also, the relay devices RP1, RP2, RP3, and RP4 are assumed to have the following functions.

The relay devices RP1, RP2, RP3, and RP4 each have a function of comprehending an own remaining battery amount and a function of comprehending information that affects battery consumption. The information that affects battery consumption is temperature, the degree of concentration in communication, or the like, for example, and is included in the above described own subsystem operating environment 31b.

The relay devices RP1, RP2, RP3, and RP4 can mutually communicate, and each can change communication settings according to an objective.

The relay devices RP1, RP2, RP3, and RP4 can each increase the radio wave output so as to reduce a relay operation by one stage. Also, as a result of reducing the output, the range of interference can be reduced.

The relay devices RP1, RP2, RP3, and RP4 can each perform long distance communication while reducing the battery consumption by decreasing the transmission rate.

The relay devices RP1, RP2, RP3, and RP4 can avoid collision in communication by shifting communication timings.

The relay devices RP1, RP2, RP3, and RP4 can each perform long distance communication and can avoid collision in communication by adjusting the directivity of a transmitting antenna.

It is assumed that the above-described Example 2 is set as the objective in such a configuration. That is, the information output apparatus 41 continuously transmitting to the host apparatus 42 until a scheduled maintenance date and time is set as the objective.

Also, the following contents are assumed to be specified as the operation contents.

The transmission rate of each of the relay devices is set to X (kbps), and each of the relay devices stops functioning when the remaining battery amount decreases to 5% or less.

At first, the relay device RP1 is assumed to perform control on the entire system as the leader, and determines the combination structure of functions of the other relay devices RP. When the remaining battery amount of the relay device RP1 is decreased to 15% or less, the coordination and determination function (leader function) is shifted to another relay device.

The relay devices RP1 to RP4 each report the own remaining battery amount to the relay device RP1 at a period T1.

In FIG. 22, the information output from the information output apparatus 41 is sequentially transferred to the relay device RP4, the relay device RP3, the relay device RP2, and the relay device RP1 in this order, and is transmitted to the host apparatus 42. While transmitting information in this way, the remaining battery amount in each of the relay devices RP1, RP2, RP3, and RP4 decreases.

Figure 23:
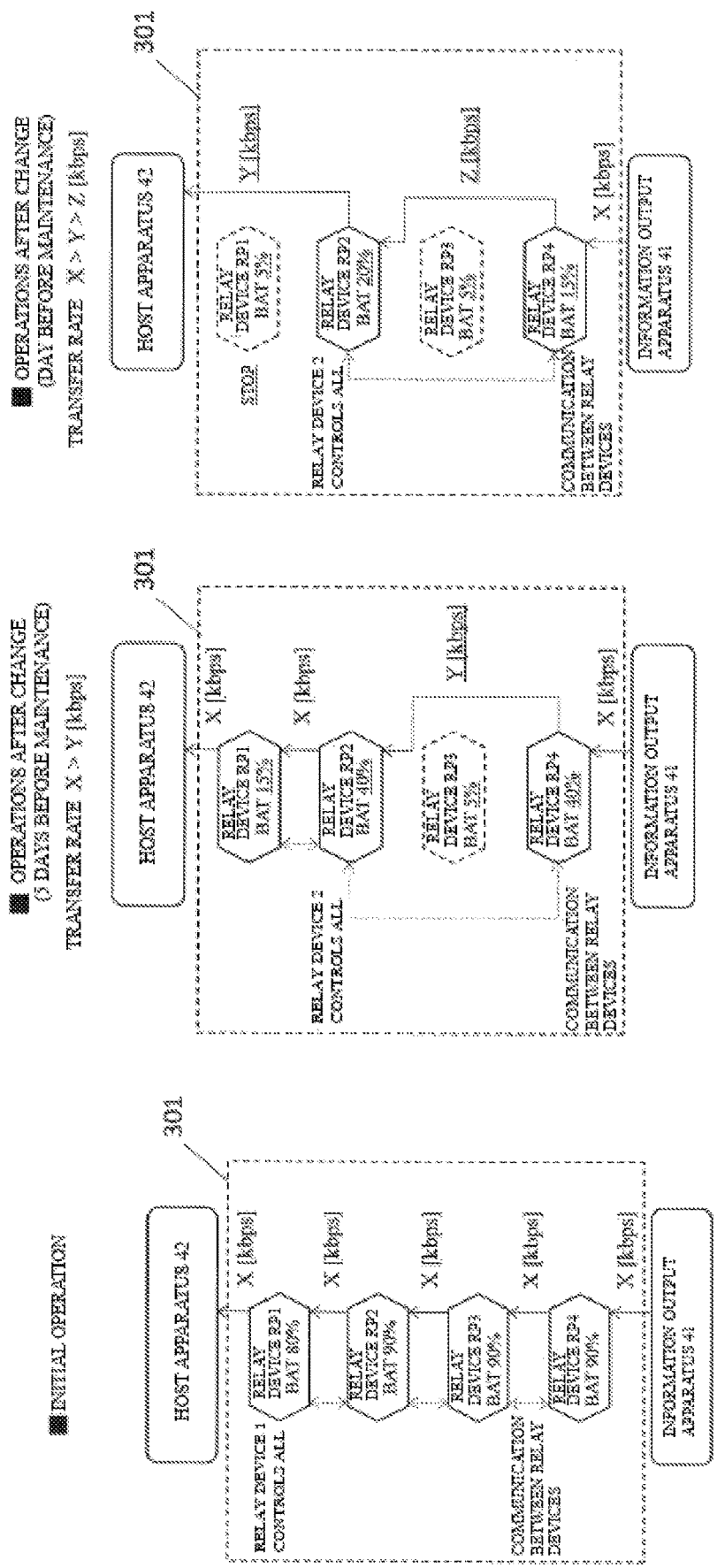
FIGS. 23A, 23B, and 23C are diagrams illustrating operations when a state of a subsystem has changed in a network system, such as in FIG. 22.

FIG. 23A shows an initial operating state, FIG. 23B shows operations five days before maintenance, and FIG. 23C shows operations the day before maintenance.

For example, it is assumed that, in a state in which the relay device RP1 coordinates the functions of the other relay devices RP2, RP3, and RP4, the remaining battery amount of the relay device RP1 has decreased from 80% to 15%, and the remaining battery amount of the relay device RP3 has decreased to 5%.

In the case where the state of the subsystem 3 has changed in this way (step S73), the relay device having the function of coordinating the relay devices shifts from the relay device RP1 to the relay device RP2, and the relay device RP3 stops operating.

In this case, the relay devices RP1, RP2, RP3, and RP4 each recognize the own subsystem operating state 31a, the own subsystem operating environment 31b, and the own subsystem function 31c by using the respective own subsystem recognition units 31, and each recognize the operating state 32a, the operating environment 32b, and the function 32c of each of the other relay devices by using the respective other subsystem recognition units 32 (step S62).

Since the relay device RP3 stops operating, the self-role determination unit 36 of each of the relay devices RP1, RP2, and RP4 selects a combination structure, from the combination structure knowledge DB 22b, with which the objective can be realized without using the relay device RP3 (step S63), and determines the own role (step S64). Note that the relay device RP2 that coordinates the entirety of the network system N4 determines the roles of the other relay devices RP1, RP3, and RP4, along with the own role. Also, the other relay device RP1 and relay device RP4 transmit the respectively determined own roles to the relay device RP2 (step S65).

The relay device RP2 compares the role of the relay device RP1 determined by the relay device RP2 using the role coordination determination unit 37 and the own role determined by the relay device RP1 (step S66), and if they are different (step S67), the relay device RP2 notifies the relay device RP1 of the role determined by the relay device RP2 for execution (step S68, in FIG. 20). On the other hand, if the role of the relay device RP1 determined by the relay device RP2 and the role of the relay device RP1 determined by the relay device RP1 are the same, the relay device RP2 notifies the relay device RP1 of the fact that there is no change (steps S69 and S72). Also, the relay device RP2 performs similar control on the relay device RP4.

Accordingly, as shown in FIG. 23B, the relay device RP4 transmits information received from the information output apparatus 41 at a rate of X (kbps) to the relay device RP2 at a rate of Y (kbps) while skipping the relay device RP3. Note that the transmission rate Y has a smaller value than X. The relay device RP2 transmits information received from the relay device RP4 to the relay device RP1 at a rate of X (kbps). The relay device RP1 transmits the information received from the relay device RP2 to the host apparatus 42 at a rate of X (kbps).

The relay device (subsystem 3) that coordinates the entirety of the system is changed, and the combination structure is changed, as described above, and as a result, information can be communicated from the information output apparatus 41 to the host apparatus 42.

Next, when the remaining battery amount in each of the relay devices has further decreased from the state in FIG. 23B, and the remaining battery amount of the relay device RP1 has decreased to 5%, as shown in FIG. 23C, the state of the subsystem 3 is determined to have changed (step S73), and as a result, steps S62 to S72 are executed. Then, as shown in FIG. 23C, the information output from the information output apparatus 41 is received by the relay device RP4 at a transmission rate of X (kbps). The relay device RP4 transmits the received information to the relay device RP2 at a rate of Z (kbps), while skipping the relay device RP3. Note that the transmission rates satisfy X>Y>Z. Then, the relay device RP2 transmits the information received from the relay device RP4 to the host apparatus 42 at a rate of Y (kbps), while skipping the relay device RP1.

As described above, in the network system N4 of Working example 3, control is performed such that the objective of transmitting information from the information output apparatus 41 to the host apparatus 42 until the time maintenance is to be performed can be achieved by changing the combination structure.

Note that the network system N1 as described in Embodiment 1 may be applied to a system in which a plurality of relay devices are provided as Working example 3. That is, a central management system that manages the relay devices RP1, RP2, RP3, and RP4 is provided, and the functions of the respective relay devices may be determined by the central management system.

Also, the network system N2 or N3 as described in Embodiment 2 or 3 may be applied to a system in which a plurality of relay devices are provided as Working example 3. In this case, the remaining battery amount in at least the subsystem 3 that is the leader for determining or coordinating the roles of the other subsystems 3 needs to be adjusted such that at least the function of determining or coordinating can be exhibited.

Working Example 4

Next, a case where the state of a subsystem 3 has changed (addition of a subsystem 3, separation of a subsystem 3), a case where the state of a subsystem 3 has changed due to a change of objective, or the like will be described using a network system of Working example 4.

The network system of Working example 4 may use any of the network systems N1, N2, N3, and N4 described in Embodiments 1 to 4. A description will be given using the network system N4, as an example.

That is, in Working example 4, each subsystem 3 includes the knowledge creation unit 28 and the role coordination determination unit 37.

A product assembly factory using a plurality of robots is assumed as the network system N4 of Working example 4. The robots perform assembly of products at a factory, monitoring of the factory, relaying (hopping) of information of the other robots and a sensor, and the like.

Figure 24:
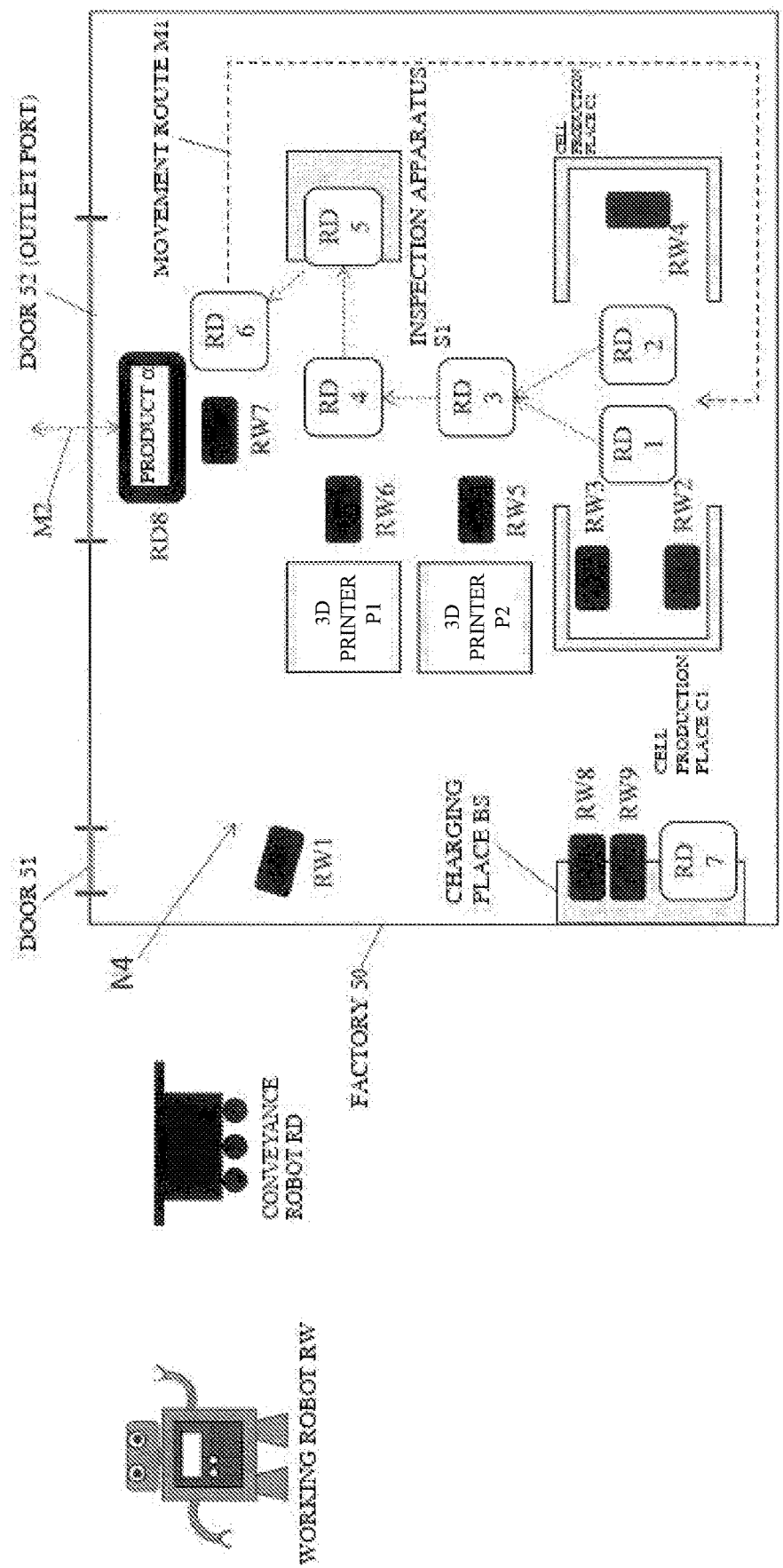
FIG. 24 is a diagram illustrating a configuration of a network system in Working example 4.

FIG. 24 is a diagram illustrating a configuration of the network system N4 of Working example 4, and is an image diagram of a workshop of a factory 50 viewed from above.

The network system N4 includes, as subsystems 3, conveyance robots RD1 to RD7 dedicated to perform conveyance of components and products, working robots RW1 to RW9 that perform other work, 3D printers P1 and P2, and an inspection apparatus S1.

Next, functions of the conveyance robots RD1 to RD7 and the working robots RW1 to RW9 will be described. The function, here, may also be referred to as role sharing.

Each working robot RW1 to RW9 can perform any kind of work.

Conveyance robots RD1 to RD7 only perform conveyance. The robots RD1 to RD7 and RW1 to RW9 are each given roles, and perform their respective roles.

One robot performs the role of a leader, and the leader coordinates the roles of the robots.

The leader can communicate with the robots, production apparatuses, the inspection apparatus, and recognizes the other robots and apparatuses by using the other subsystem recognition unit 32.

The leader comprehends current charge amounts (other subsystem operating state 32a) of the respective robots by using the other subsystem recognition unit 32, and causes the robots to operate according to the roles determined depending on the charge amounts and the flow of efficient work shifting.

The power consumption of each of the working robots RW1 to RW9 differs depending on the work being executed. The power consumption of the conveyance robots RD1 to RD7 is almost the same.

Each robot receives notification of role shift from the leader when the charge amount of the robot has decreased to a given amount or less, and goes to a charging place BS to charge.

A robot at the charging place BS will assume work, based on the role assignment from the leader, such as replacing a robot, performing collaborative work with a robot, or performing new work.

Each robot or apparatus can mutually communicate with other robots or apparatuses in a communicable range. Also, each robot or apparatus can perform hopping (relay) of information of the other robots or apparatuses to another robot.

Initial State

The network system N4 of Working example 4 is assumed to be executing the following target states at the same time, as the initial state.

Objective (1): production and packing of a product α and conveyance of the product α to an external predetermined position (delivery date: T1, target production volume: X)

Objective (2): monitoring, reporting, and excluding an intruder (suspicious person)

Objective (3): reporting the state and production amount of each of the apparatuses in the factory to a host apparatus at predetermined intervals FIG. 25 is a diagram showing operating states of the robots RW1 to RW9 and the robots RD1 to RD7 stored in the subsystem information DB 22a shown in FIG. 21. These pieces of information regarding the subsystems are also referred to as pieces of information obtained by the respective subsystems 3 using the own subsystem recognition unit 31 and the other subsystem recognition unit 32 of the subsystem 3.

As shown in FIG. 25, the robot RW1 is the leader that coordinates the roles for the entire system. The robot RW1 performs recognition of an intruder through doors 51 and 52 of the factory 50, monitoring, reporting, and exclusion of a suspicious person. Furthermore, the robot RW1 collects pieces of information obtained from the apparatuses, and notifies the host apparatus of the collected information.

The robots RW2 and RW3 perform cell production (refer to cell production place C1) in cooperation, and create a component a.

The robot RW4 performs cell production (refer to cell production place C2) separately, and creates a component a.

The robot RW5 assembles a component b created by the 3D printer P1.

The robot RW6 assembles a component c created by the 3D printer P2.

The robot RW7 performs packing of a finished product α, and moves a defective product.

The robots RW8 and RW9 are charging.

The robots RD1 to RD6 each convey components and products while moving in the order of "cell production place C1 or C2→3D printers P1 and P2→inspection apparatus S1→packing→cell production place C1 or C2→ . . . ". A dotted line M1 in the diagram indicates the conveyance route.

The robot RD7 is charging.

The robot RD8 conveys a product α (finished product) whose packing is completed to the outside (refer to a dotted line M2 in the diagram).

The 3D printer P1 creates a component b.

The 3D printer P2 creates a component c.

The inspection apparatus S1 inspects a product α.

All of the apparatuses each notify the leader (robot RW1) of the state of the apparatus at predetermined intervals.

State Change of Subsystem 3 (Addition of Subsystem)

Next, as an example of the addition of a subsystem 3, a case where the charging of the robot RW8 is completed while in the initial state will be described. Note that the target state has not been changed.

The subsystems 3 (robots RD1 to RD7, robots RW1 to RW9, 3D printers P1 and P2, inspection apparatus 51) in the network system N4 each recognize that charging of the robot RW8 is complete (refer to step S62 in FIG. 20). Then, in step S63, each subsystem 3 selects a combination structure, from the combination structure knowledge DB 22b, with which the objective can be realized using the robot RW8 as well, and determines whether or not the own subsystem 3 will be activated and the role thereof, in step S64. Note that, in the case where a selectable combination structure does not exist, the knowledge creation unit 28 creates a new combination structure. Then, the subsystems 3 (robots RD1 to RD7, robots RW2 to RW9, 3D printers P1 and P2, inspection apparatus S1) other than the robot RW1, which is the leader, each transmit their own role to the robot RW1. Also, the robot RW1, which is the leader, determines the roles of the other subsystems 3 along with the own role.

The robot RW1 compares the role of another subsystem 3 determined by the robot RW1 with the role of the other subsystem 3 determined by the other subsystem 3 using the role coordination determination unit 37 (step S66). Then, if it is determined that they are different, in step S67, the other subsystem 3 is notified of the own role determined by the robot RW1, which is the leader, and the other subsystem 3 executes the role (step S68, in FIG. 20). On the other hand, if the role of another subsystem 3 determined by the robot RW1, which is the leader, is the same, the other subsystem 3 is notified of the fact that there is no change (steps S69 and S72).

In this way, as a result of performing coordination, the functions of the respective subsystems 3 can be set based on the new combination structure.

Figure 26B:
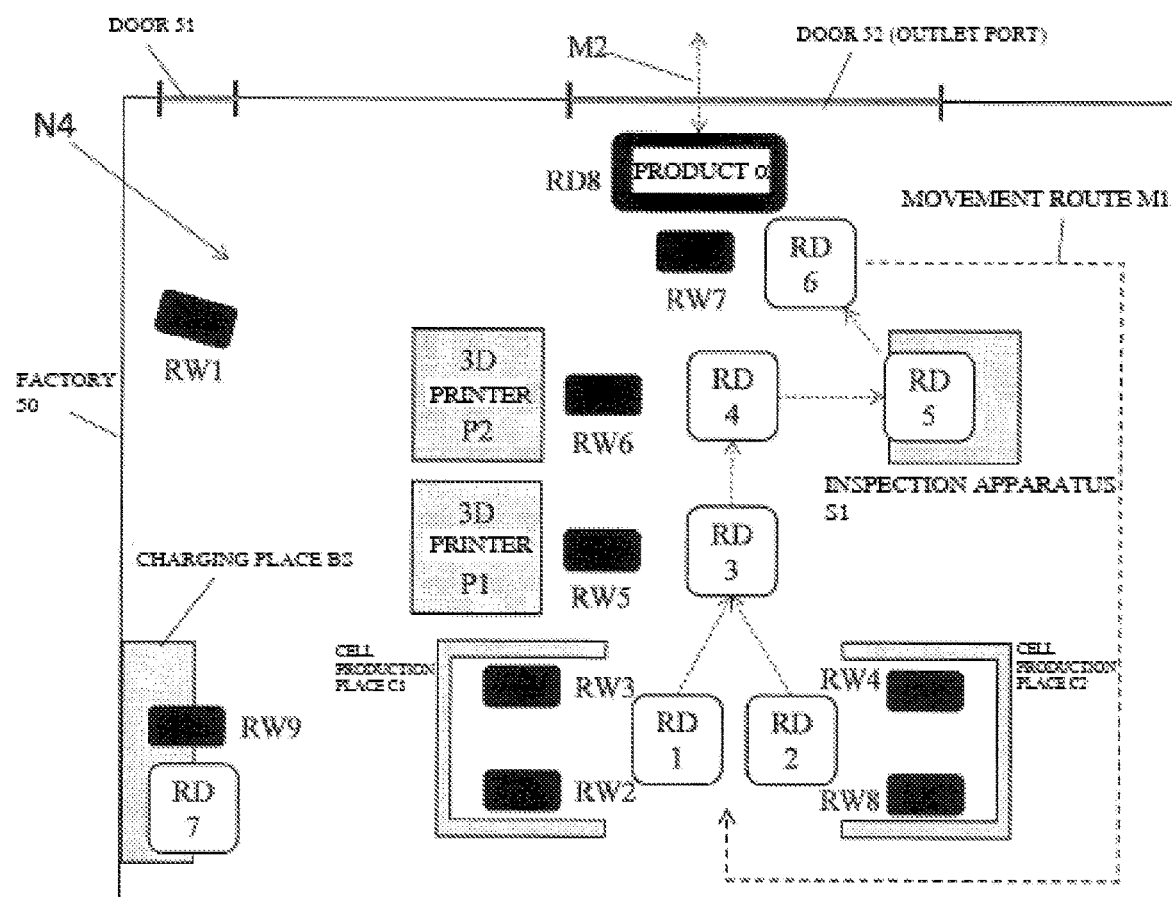
FIG. 26B is a diagram illustrating a state of a network system that executes a role, such as in FIG. 26A.

FIG. 26A is a diagram illustrating a portion of the subsystem information DB 22a showing the operating states of subsystems 3 after the combination structure has been changed. FIG. 26B is an image diagram, viewed from above, showing the state of the factory 50 after the combination structure has been changed.

As shown in FIGS. 26A and 26B, the robot RW8 moves to the cell production place C2. Then, after the robot RW8 has moved, the robot RW4 and the robot RW8 perform cell production in cooperation, and create a component a.

State Change of Subsystem 3 (Separation of Subsystem)

Next, as an example of the separation of a subsystem 3, a case where the charge amount of the robot RW6 has decreased from the initial state and charging is necessary will be described. Note that the target state has not been changed.

Each of the subsystems 3 (robots RD1 to RD7, robots RW1 to RW9, 3D printers P1 and P2, inspection apparatus 51) in the network system N4 recognizes that the robot RW6 needs to be charged due to the reduction in the charge amount (refer to step S62 in FIG. 20).

Then, in step S63, the self-role determination unit 36 of each subsystem 3 selects a combination structure, from the combination structure knowledge DB 22b, with which the objective can be realized in a state in which the robot RW6 is removed from assembling products. Then, in step S64, the self-role determination unit 36 of each subsystem 3 determines whether or not the subsystem 3 will be activated and the role thereof. Note that, in the case where a selectable combination structure does not exist, the knowledge creation unit 28 creates knowledge regarding a new combination structure.

The above operations are similar to those in the above-described case (addition of subsystem 3).

In this way, as a result of performing coordination, the functions of the respective subsystems 3 are set based on the new combination structure.

Figure 27B:
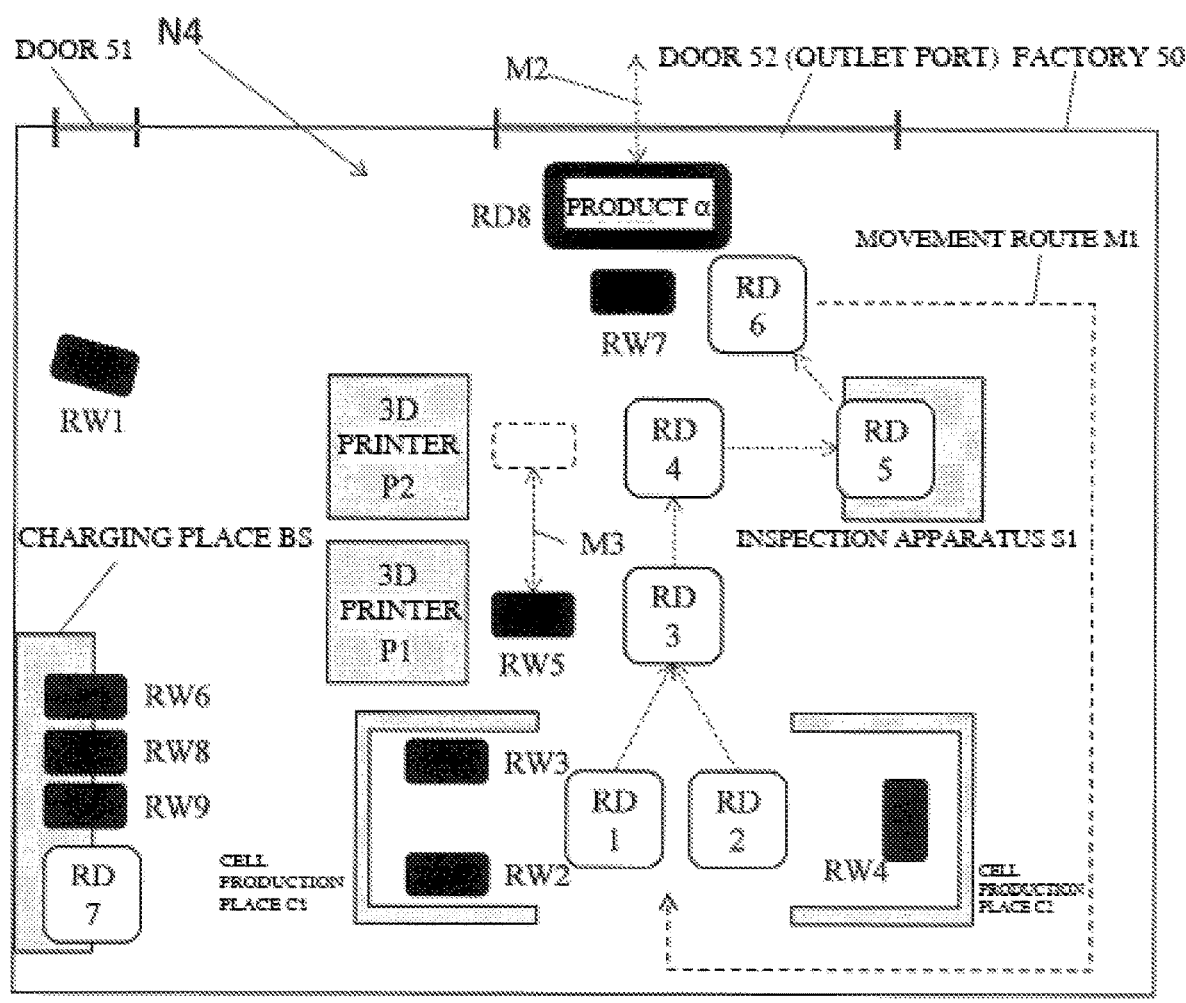
FIG. 27B is a diagram illustrating a state of a network system that executes a role, such as in FIG. 26A.

FIG. 27A is a portion of the subsystem information DB 22a that shows the operating states of the subsystems 3 after the combination structure has been changed. FIG. 27B is an image diagram of the state of the factory 50, viewed above, after the combination structure has been changed.

As shown in FIGS. 27A and 27B, the robot RW6 moves to the charging place BS. Also, the robot RW5 assembles a component b created by the 3D printer P1, and assembles a component c created by the 3D printer P2.

Specifically, the robot RW5 assembles a component b created by the 3D printer P1, and thereafter, moves to the location of the 3D printer P2 (refer to dotted line M3). Then, the robot RW5, after assembling a component c created by the 3D printer P2, moves to the location of the 3D printer P1 (refer to dotted line M3).

In this way, even in a case where the robot RW6 has been removed from work, the product α can be produced.

State Change of Subsystem 3 (Reduction of Charge Amount)

Next, a case where, after the robot RW6 has moved to the charging place BS as described above, the charge amount of the robot RW5 has decreased will be described. Note that it is assumed that the target state has not changed.

A case is assumed where the charge amount of the robot RW5 has decreased to a predetermined value, and although charging is not necessary at this moment, the power consumption is large because the components b and c are assembled by one robot as described above, and the entire production will be affected if work continues in this manner.

The subsystems 3 (robots RD1 to RD7, robots RW1 to RW9, 3D printers P1 and P2, inspection apparatus 51) in the network system N4 each recognizes that the charge amount of the robot RW5 has decreased to the predetermined value (refer to step S62 in FIG. 20).

Then, in step S63, each subsystem 3 selects a combination structure, from the combination structure knowledge DB 22b, with which the objective can be realized in a state in which the power consumption of the robot RW5 is suppressed, and determines whether or not the subsystem 3 will be activated and the role thereof, in step S64. Note that, in the case where a selectable combination structure does not exist, the knowledge creation unit 28 creates knowledge regarding a new combination structure.

The above operations are similar to those in the above-described case (addition of subsystem 3).

In this way, as a result of performing coordination, the functions of the respective subsystems 3 are set based on the new combination structure.

Figure 28A:
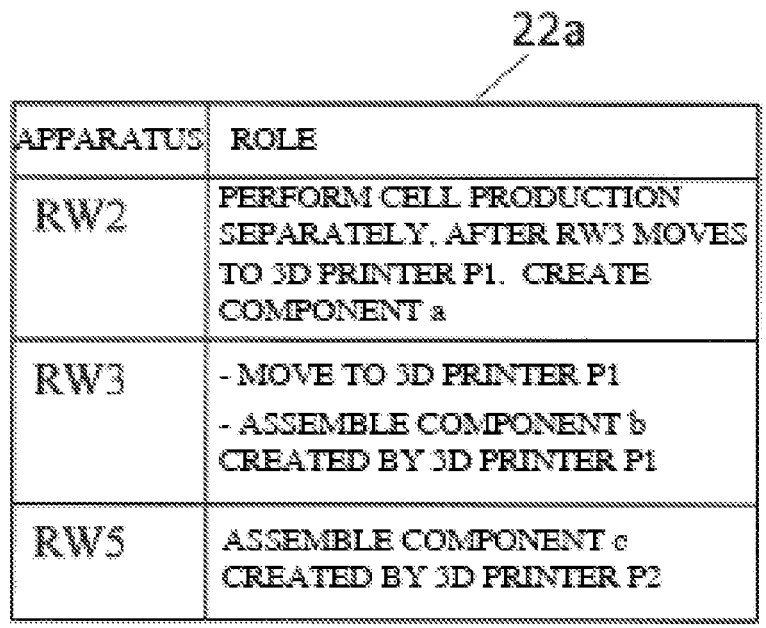
FIG. 28A is a diagram illustrating a portion of a subsystem information database indicating operating states of subsystems after a combination structure has been changed in a network system, such as in FIG. 25.
Figure 28B:
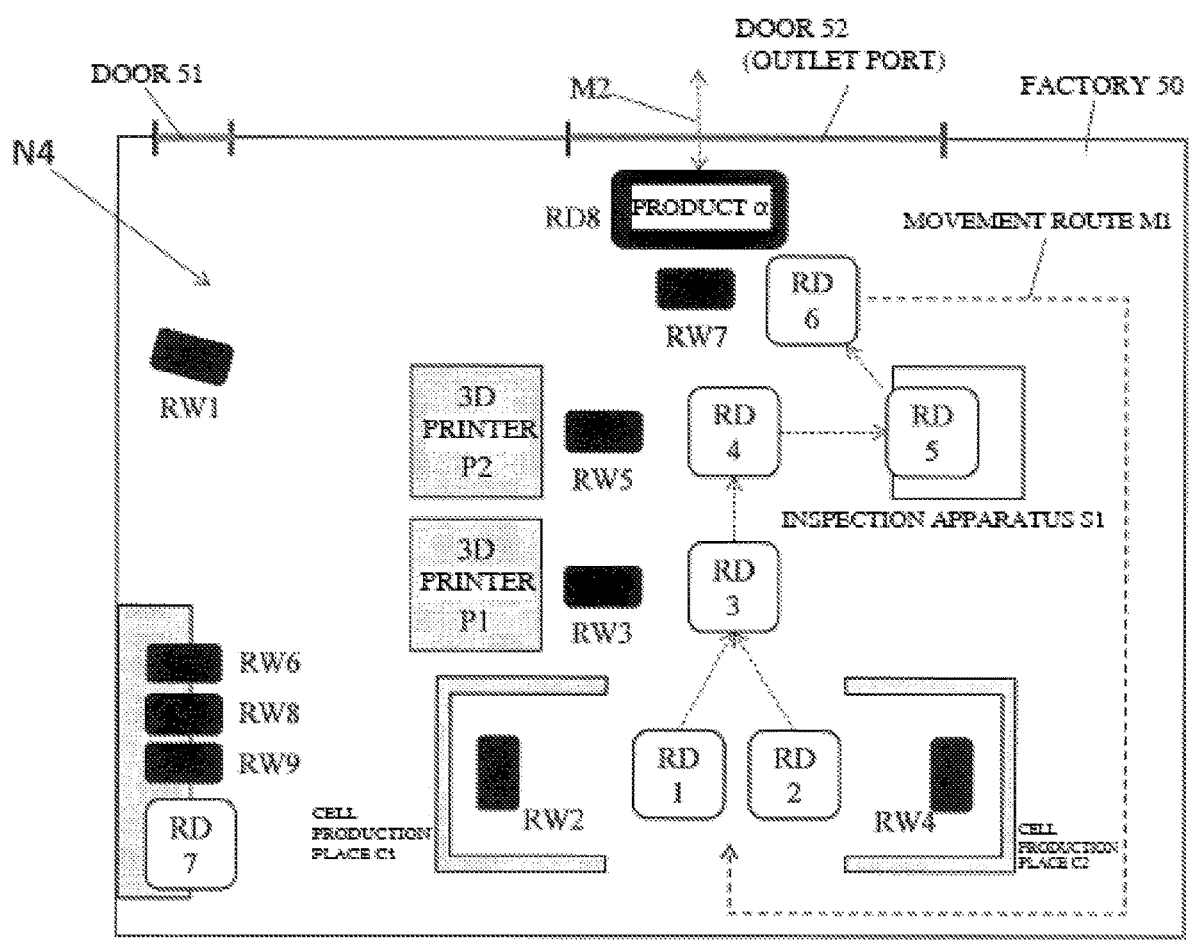
FIG. 28B is a diagram illustrating a state of a network system that executes a role, such as in FIG. 26A.

FIG. 28A is a portion of the subsystem information DB 22a that shows the operating states of subsystems 3 after the combination structure has been changed. FIG. 28B is an image diagram of the state of the factory 50, viewed from above, after the combination structure has been changed.

As shown in FIGS. 28A and 28B, the robot RW2 separately performs, after the robot RW3 has moved to the 3D printer P1, cell production, and creates a component a. The robot RW3 moves to the location of the 3D printer P1, and assembles a component b created by the 3D printer P1. The robot RW5 stays at the location of the 3D printer P2, and assembles a component c created by the 3D printer P2.

In this way, the role of assembling a component b created by the 3D printer P1 is taken by the robot RW3, and as a result, the robot RW5 need not move between the 3D printer P1 and the 3D printer P2, and the product α can be produced in a state in which power consumption is suppressed.

Addition of Objective and State Change of Subsystem 3

Next, a case where an objective is added during the initial state (step S74) will be described.

As the state change of a subsystem 3 from the initial state, a case is assumed where the 3D printer P2 will stop after a predetermined time due to a shortage of material (step S73).

Furthermore, a case is assumed where an objective (4) of continuously producing the product α until tomorrow's maintenance time is added to the objectives in the initial state.

Specifically, the robot RW1, which is the leader, has been notified from the 3D printer P2 of the fact that the material has decreased to a given amount or less, and the 3D printer P2 is to stop after a predetermined amount of time, and has notified the host apparatus (administrator) of this fact. It is assumed that, thereafter, the administrator has added the above-described objective.

In such a case, one of the subsystems 3 out of the robots RD1 to RD7, the robots RW1 to RW9, the 3D printers P1 and P2, and the inspection apparatus S1 accepts the new target state, and furthermore, recognizes the shortage of material in the 3D printer P2 (refer to step S62 in FIG. 20).

Then, in step S63, each subsystem 3 selects, from the combination structure knowledge DB 22b, a combination structure with which the new target state can be realized in addition to the target state in the initial state in a state in which the 3D printer P2 does not operate. Then, in step S64, each subsystem 3 determines whether or not the subsystem 3 will be activated and the role thereof. Note that, in the case where a selectable combination structure does not exist, the knowledge creation unit 28 creates knowledge regarding a new combination structure.

The above operations are similar to those in the above-described case (addition of subsystem 3).

In this way, as a result of performing coordination, the functions of the respective subsystems 3 are set based on the new combination structure.

Figure 29B:
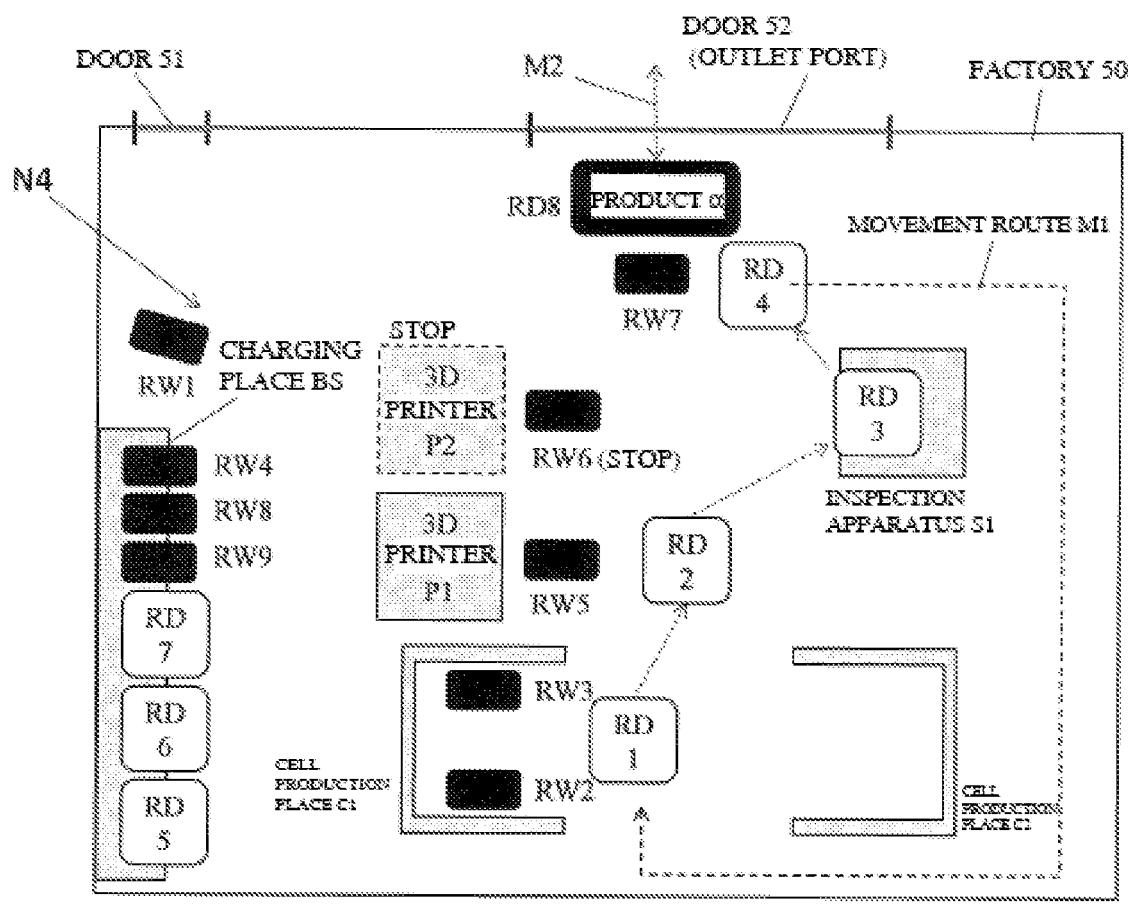
FIG. 29B is a diagram illustrating a state of a network system that executes a role, such as in FIG. 26A.

FIG. 29A is a portion of the subsystem information DB 22a that shows the operating states of the subsystems 3 after the combination structure has been changed. FIG. 29B is an image diagram of the state of the factory 50, viewed from above, after the combination structure has been changed.

As shown in FIGS. 29A and 29B, the 3D printer P2 stops. The 3D printer P1 creates a component b, and thereafter, creates a component c. The robot RW4 moves to the charging place BS to charge. The robot RW5 assembles a component b and a component c that have been created by the 3D printer P1. The robot RW6 stops temporarily. The robots RD1 to RD4 each perform conveyance while moving in the order of "cell production place C1→3D printer P1→inspection apparatus S1→packing→cell production place C1→ . . . ". The robots RD5 and RD6 move to the charging place BS to charge.

Accordingly, even in a state in which the 3D printer P2 is stopped, the product α can continue to be produced.

Change of Objective and Change in State of Subsystems 3 (Addition and Separation)

Next, a case where the objective has been changed and, furthermore, a change in the state of subsystems 3, that is, addition and removal of subsystems 3, has occurred will be described.

The production target of product α has been achieved, and therefore, the objective (1) in the initial state is changed to the following objective (5).

Objective (5): production and packing of a product ß and conveyance of the product ß to an external predetermined position (delivery date: T2, target production volume: Y).

Also, a case is assumed in which a robot RW10 was newly made to participate, as the addition of a subsystem 3, and the charge amount of the robot RW1 has decreased such that the robot RW1 needs to be charged, as the removal of a subsystem 3.

In such a case, one subsystem 3 out of the robots RD1 to RD7, the robots RW1 to RW9, the 3D printers P1 and P2, and the inspection apparatus S1 accepts a new target state (step S62). Also, each subsystem 3 recognizes the participation of the robot RW10 and the reduction in charge amount of the robot RW1 (refer to step S63 in FIG. 20).

Note that the robot RW1, upon recognizing the reduction in charge amount, notifies the other subsystems 3 of the fact that the leader will change. Here, it is assumed that it has been determined that the robot RW8 is the next leader.

Then, each subsystem 3 selects, from the combination structure knowledge DB 22b, a combination structure with which the changed objective (1) and the objectives (2) and (3) in the initial state can be realized in a state in which the new robot RW10 is used and the robot RW1 is not used (step S63). Then, each subsystem 3 determines whether or not the own subsystem 3 will be activated and the role thereof based on the selected combination structure (step S64). Note that, in the case where a selectable combination structure does not exist, the knowledge creation unit 28 creates knowledge regarding a new combination structure.

The above operations are similar to those in the above-described case (addition of subsystem 3).

In this way, as a result of performing coordination, the functions of the respective subsystems 3 are set based on the new combination structure.

Figure 30B:
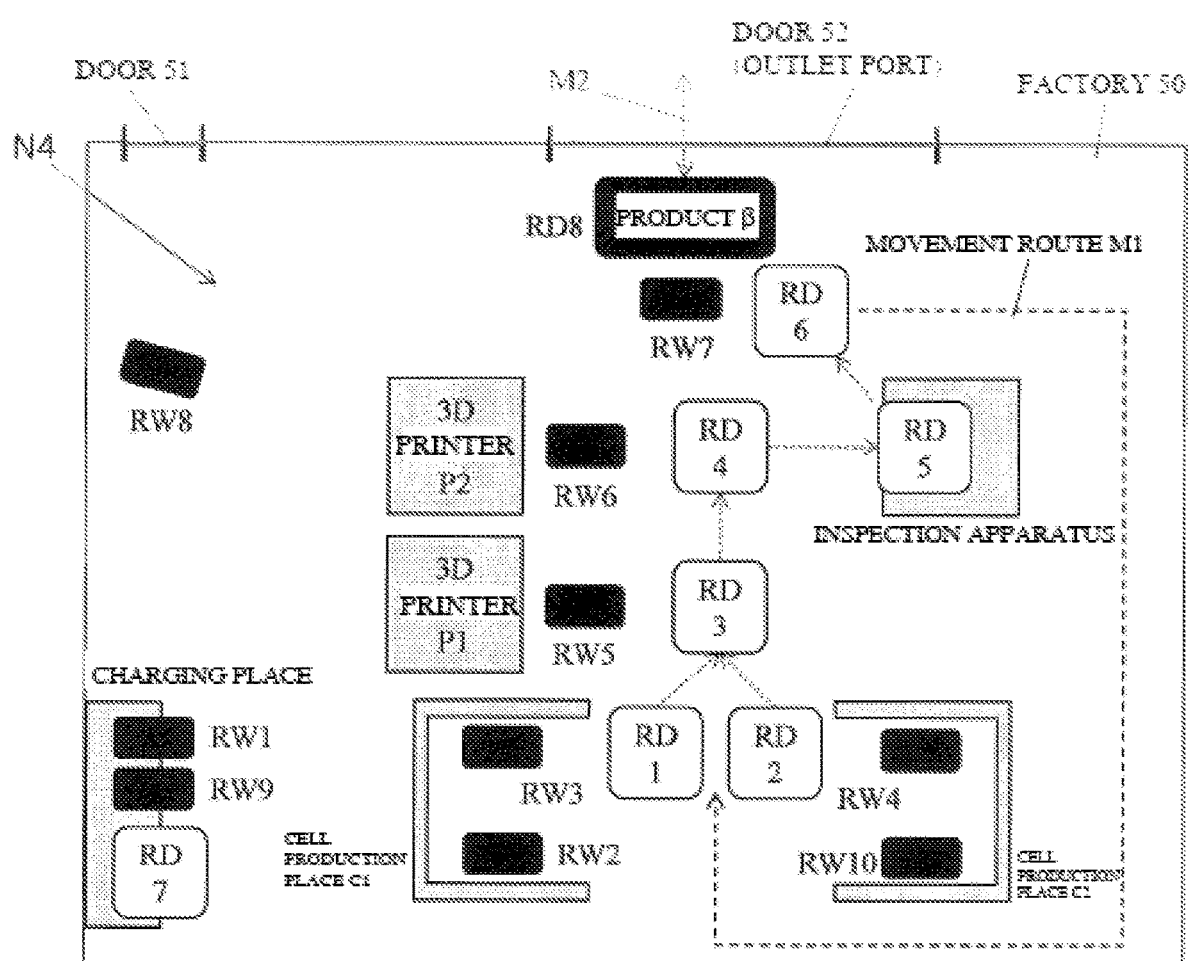
FIG. 30B is a diagram illustrating a state of a network system that executes a role, such as in FIG. 26A.
Figure 31:
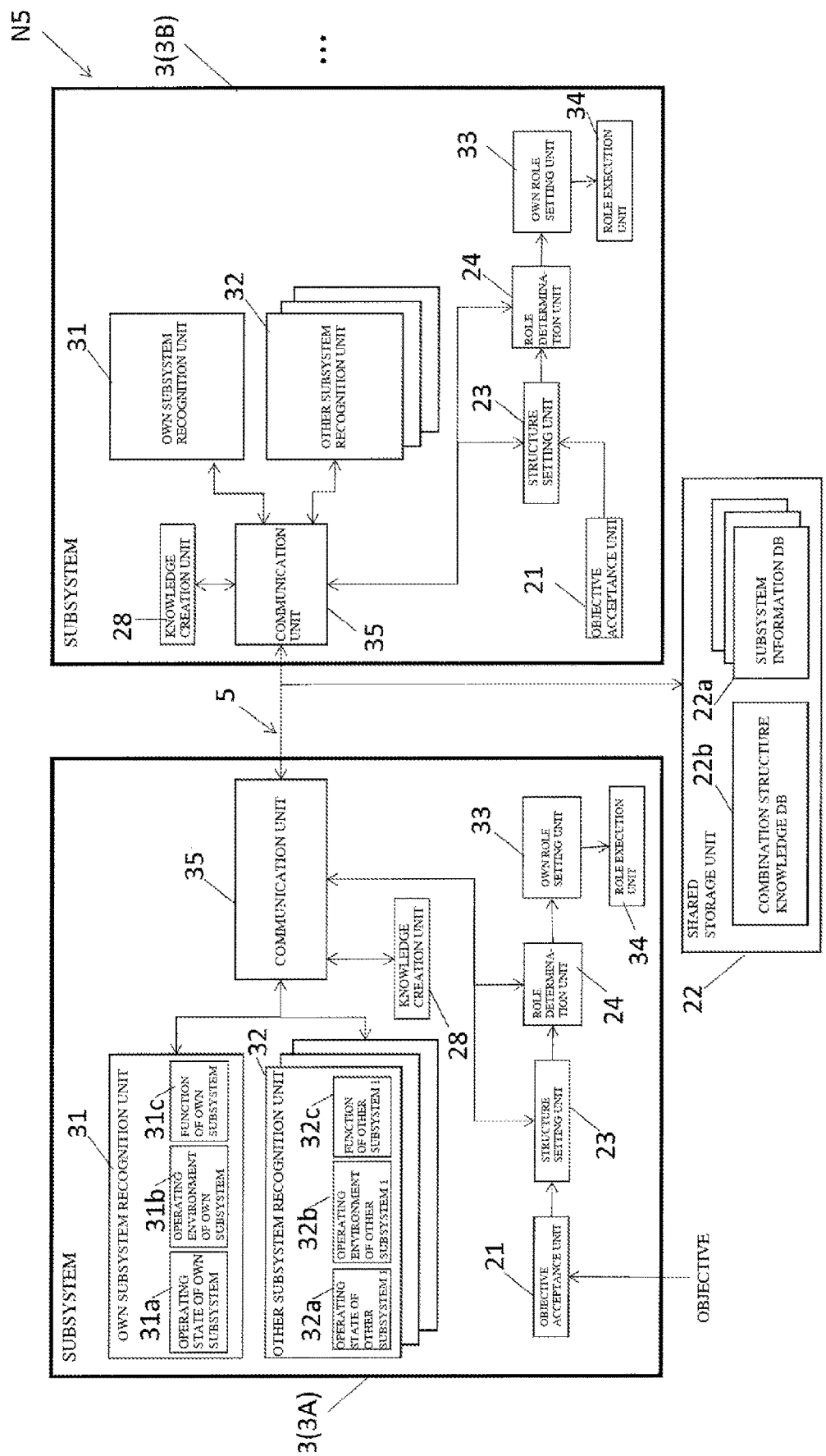
FIG. 31 is a diagram illustrating a configuration of a network system of a modification of Embodiment 2.

FIG. 30A is a portion of the subsystem information DB 22a that shows the operating states of subsystems 3 after the combination structure has been changed. FIG. 30B is an image diagram of the state of the factory 50, viewed from above, after the combination structure has been changed.

As shown in FIGS. 30A and 30B, the robot RW1, after notifying the robots and the apparatuses of the fact that the leader will change, moves to the charging place to charge. The robot RW2 and the robot RW10 each separately perform cell production, and create a component a2. The robot RW3 and the robot RW4 each perform cell production, create a component a3, and attach the component a3 to the component a2. The robot RW5 assembles a component b2 created by the 3D printer P1. The robot RW6 assembles a component c2 created by the 3D printer P2. The robot RW7 performs packing of a finished product, and moves a defective product. The robot RW8 takes over the leader, and fulfills the role of a monitoring apparatus (recognition of an intruder through doors 51 and 52, monitoring, reporting, and excluding a suspicious person). Furthermore, the robot RW8 collects information obtained from each apparatus, and notifies the host apparatus of the collected information. The robots RD1 to RD6 each convey components and products while moving in the order of "cell production place C1 or C2→3D printers P1 and P2→inspection apparatus S1→packing→cell production place C1 or C2→ . . . ". The robot RD8 conveys a product ß (finished product) whose packing is completed to the outside. The 3D printer P1 creates a component b2. The 3D printer P2 creates a component c2. The inspection apparatus 51 inspects a product ß. All of the apparatuses each notify the leader (robot RW8) of the state of the own apparatus at predetermined intervals.

Other Embodiments

Although embodiments have been described above, the present invention is not limited to the above-described embodiments and various modifications can be made without departing from the gist of the invention.

(A)

In the above-described Embodiments 1 to 4, a case has been described where a function setting method is implemented according to the flowcharts shown in FIGS. 2 to 4, 18, and 20, as the function setting method, which is an example of an embodiment, but there is no limitation thereto.

For example, an embodiment may be realized as a function setting program that causes a computer to execute the function setting method that is implemented according to the flowcharts shown in FIGS. 2 to 4, 18, and 20.

Also, as a utility form of the function setting program, a mode may be adopted in which the program is recorded in a computer-readable recording medium such as a ROM, and operates in cooperation with a computer.

Also, as a utility form of the function setting program, a mode may be adopted in which the program is transmitted through a transmission medium such as the Internet, or a transmission medium such as light, radio waves, or sound waves, is read by a computer, and operates in cooperation with the computer.

Also, the above-described computer is not limited to hardware such as a CPU, and my include firmware, an OS, and furthermore, peripheral devices.

Note that, the function setting method may be realized by software, or realized by hardware, as described above.

(B)

The central management system 2 described in Embodiment 1 described above may be provided on a cloud. Furthermore, the shared storage unit 22 in each of the network systems N2, N3, and N4 described in Embodiment 2, 3, and 4 described above is not limited to a separate apparatus, and may be on a cloud, or may be provided in any of the subsystems 3.

(C)

In the network system N1 in Embodiment 1 described above, each subsystem 3 includes the other subsystem recognition unit 32, but the subsystems 3 may not include the other subsystem recognition unit 32, and even in such a case, the central management system 2 can obtain pieces of information regarding respective subsystems 3.

That is, because each subsystem 3 transmits the own subsystem operating state 31a, the own subsystem operating environment 31b, and the own subsystem function 31c to the subsystem information DB 22a, the central management system 2 can obtain pieces of information regarding respective subsystems 3 using these pieces of information.

(D)

In the network systems N2, N3, and N4 described in Embodiments 2, 3, and 4 described above, the shared storage unit 11 is provided with the subsystem information DB 22a. Each subsystem 3 can recognize and acquire pieces of information of the other subsystems 3 by using the other subsystem recognition unit 32, and as a result, the subsystem information DB 22a may not be provided.

(E)

In Embodiment 2 described above, only one subsystem 3 out of the subsystems 3 connected to the network 5 is provided with the structure setting unit 23, the role determination unit 24, and the knowledge creation unit 28, but there is no limitation thereto. That is, all of the subsystems 3 may each be provided with the structure setting unit 23, the role determination unit 24, and the knowledge creation unit 28, and in this case, a leader that determines the roles of the other subsystems 3 is set. That is, as described in Working examples 3 and 4, one of the subsystems 3 is the leader, and the leader is changed when the objective is changed or depending on the state of the subsystems 3.

(F)

In Embodiments 1 to 4 described above, the knowledge creation unit 28 creates, in advance, knowledge regarding the combination structures, and the created knowledge regarding the combination structures is stored in the shared storage unit 22, but there is no limitation thereto, and the knowledge regarding the combination structures may not be created in advance. For example, a configuration may be adopted in which every time a target state is accepted, the knowledge creation unit 28 creates the combination structure for that time. In this case, the combination structure knowledge DB 22b may not be provided, and the shared storage unit 22 need only temporarily store the created combination structure.

(G)

In the network systems N3 and N4 described in Embodiments 3 and 4 described above, all of the subsystems 3 that each include the knowledge creation unit 28 and role coordination determination unit 37 create, in the case where a combination structure with which the objective can be implemented does not exist, a combination structure with which the objective can be implemented, but there is no limitation thereto. A configuration may be such that only a subsystem 3 that is set as the leader when an objective is set creates a new combination structure using the knowledge creation unit 28.

(H)

In the network systems N1 to N4 described in the above-described embodiments and other embodiments are each provided with the knowledge creation unit 28, and knowledge regarding the combination structure is created by machine learning using AI, but the knowledge creation unit 28 may not be provided. In this case, knowledge regarding a combination structure estimated in advance is stored in the combination structure knowledge DB 22b.

Note that an embodiment can be expressed as follows.

Note 1

A network system in which a plurality of subsystems are connected via a network, wherein each of the subsystems includes a first memory for holding a state and a function of an own subsystem and at least one first processor connected to the first memory, the network system includes a second memory including a shared storage unit for storing knowledge regarding a combination structure of functions of the respective subsystems necessary for realizing a target state, a second processor connected to the second memory or the first processor of any one of the subsystems is configured to acquire states and functions of all of the plurality of subsystems or all of the subsystems excluding the own subsystem, accept setting of a target state, automatically set a combination structure of functions of the respective subsystems, including determining whether or not the function of each of the subsystems is to be activated, based on the target state, states and functions of the subsystems, and the knowledge regarding the combination structure, determine functions to be executed by the respective subsystems based on the combination structure automatically set by the structure setting unit, and notify the subsystems of the determined functions of the respective subsystems.

Note 2

A function setting method for setting functions of subsystems for implementing a predetermined target state using a network system in which the subsystems are connected via a network, the function setting method including:

a step of accepting a setting of the target state, by at least one processor, a step of each of the subsystems holding a state and a function of the own subsystem, by at least one processor, a step of acquiring states and functions of all of the subsystems connected to the network or all of the subsystems excluding the own subsystem, by at least one processor, a step of automatically setting a combination structure of functions of the respective subsystems, including determining whether or not the function of each of the subsystems is to be activated, based on the target state, states and functions of the subsystems, and knowledge regarding a combination structure of functions of the respective subsystems necessary for realizing the target state, by at least one processor, a step of determining functions to be executed by the respective subsystems based on the combination structure automatically set in the structure setting step, by at least one processor, and a step of notifying the subsystems of the determined functions of the respective subsystems, by at least one processor.

INDUSTRIAL APPLICABILITY

The network system, the function setting method, and the function setting program of an embodiment provide an effect of improving adaptability to the situation internal and external to the system, and can be widely applied to a monitoring apparatus, factory automation, and the like.

INDEX TO THE REFERENCE NUMERALS

2: Central management system (example of management system)
3: Subsystem
5: Network
11: Shared storage unit
15: Notification unit
21: Objective acceptance unit
22: Shared storage unit
22a: Subsystem information DB
22b: Combination structure knowledge DB
23: Structure setting unit (example of structure setting unit)
24: Role determination unit (example of determination unit)
25: Role notification unit (example of notification unit)
27: Shared information communication unit (example of acquisition unit)
28: Knowledge creation unit
31: Own subsystem recognition unit
31a: Operating state
31b: Operating environment
31c: Function
32: Other subsystem recognition unit (example of acquisition unit)
32a: Operating state
32b: Operating environment
32c: Function
33: Own role setting unit
34: Role execution unit
35: Communication unit
36: Self-role determination unit (example of structure setting unit)
37: Role coordination determination unit (example of function determination unit)
40: Predetermined space
41: Information output apparatus
42: Host apparatus
50: Factory
51, 52: Door
301: First opening/closing sensor
302: Second opening/closing sensor
303: First camera
304: Second camera
305: Third camera
400: Predetermined space
401, 402: Door
BS: Charging place
C1: Cell production place
C10: Conveyer
C2: Cell production place
N1 to N4: Network system P1, P2: 3D printer
R11, R12, R21, R22, R31, R32: Robot
RD1 to RD8: Conveyance robot
RP1 to RP4: Relay device
RW1 to RW10: Working robot
S1: Inspection apparatus

The invention claimed is:

1. A network system comprising a plurality of subsystems connected via a network, each of the plurality of subsystems in the network system comprising a processor configured with a program to:
perform operations comprising operation as an own subsystem recognition unit, that holds an operating state and a function of the respective subsystem; and
perform operations comprising at least one of:
operation as an acquisition unit that acquires operating states and functions of the plurality of subsystems;
operation as an objective acceptance unit that accepts a setting of a target state of the network system for implementing a predetermined objective;
operation as a shared storage unit that stores knowledge regarding a combination structure of functions of the plurality of subsystems necessary for realizing the target states;
operation as a structure setting unit that automatically sets the combination structure of functions of the plurality of subsystems by performing operations comprising determining whether the function of each of the plurality of subsystems is to be activated, based on: the target state; the operating states and the functions of the plurality of subsystems; and the knowledge regarding the combination structure;
operation as a determination unit that determines functions to be executed by the plurality of subsystems based on the combination structure automatically set by the structure setting unit; and
operation as a notification unit that notifies the respective subsystems of the functions determined by the determination unit, wherein
the operation as the acquisition unit, the operation as the objective acceptance unit, the operation as the shared storage unit, the operation as the structure setting unit, the operation as the determination unit, and the operation as the notification unit are all performed in the network system.

2. The network system according to claim 1, further comprising a management system that manages the plurality of subsystems, the management system comprising a processor configured with a program to perform operations comprising operation as the acquisition unit that acquires operating states and functions of the plurality of subsystems from the own subsystem recognition units of the plurality of subsystems.

3. The network system according to claim 1, further comprising a management system that manages the plurality of subsystems, the management system comprising a processor configured with a program to perform operations comprising operation as, the acquisition unit,
for each of the plurality of subsystems, the processor is configured with the program to perform operations comprising operation as an other subsystem recognition unit that recognizes operating states and functions of the others of the plurality of subsystems, and
the processor of the management system is configured with the program such that the acquisition unit acquires operating states and functions of the plurality of subsystems from the own subsystem recognition unit and the other subsystem recognition unit of any of the plurality of subsystems.

4. The network system according to claim 1,
wherein the acquisition unit is provided in any of the plurality of subsystems, and the processor of the subsystem in which the acquisition unit is provided is configured with the program such that the acquisition unit recognizes and acquires operating states and functions of the plurality of subsystems excluding the subsystem in which the acquisition unit is provided.

5. The network system according to claim 4, wherein the processor of at least one of the plurality of subsystems is configured with the program such that any of the plurality of subsystems is provided with the objective acceptance unit, the structure setting unit, the determination unit, and the notification unit, and notifies the others of the plurality of subsystems of functions of the others of the plurality of subsystems.

6. The network system according to claim 4,
wherein the processor of each of the plurality of subsystems is configured with the program such that the plurality of subsystems connected to the network are each provided with the objective acceptance unit, and
in response to one of the plurality of subsystems accepting a setting of the target state, the one of the plurality of subsystems that accepted the target state notifies the others of the plurality of subsystems of the accepted target state.

7. The network system according to claim 6, wherein the processor of a predetermined one of the plurality of subsystems is configured with the program to perform operations further comprising operation as a function coordination unit that coordinates functions to be executed by the plurality of subsystems, and
the processor of each of the plurality of subsystems is configured with the program such that:
each of the plurality of subsystems are provided with the acquisition unit and the structure setting unit;
the structure setting unit of each of the plurality of subsystems determines the function of the respective subsystem from the automatically set combination structure;
the subsystems other than the predetermined one of the plurality of subsystems each notify the predetermined one of the plurality of subsystems of the determined function of the respective subsystem, and
the processor of the predetermined one of the plurality of subsystems is configured with the program such that the function coordination unit coordinates functions of the plurality of subsystems based on the combination structure automatically set by the predetermined one of the plurality of subsystems and the functions of the others of the plurality of subsystems that have been notified.

8. The network system according to claim 7,
wherein the processors of at least some of the plurality of subsystems are configured with the program such that:
the at least some of the plurality of subsystems are each provided with the function coordination unit, and
one of the at least some of the plurality of subsystems that performs the coordination is changed based on the target state and a current operating state and function of each of the plurality of subsystems.

9. The network system according to claim 4,
wherein the processors of the plurality of subsystems are configured with the program such that:

the plurality of subsystems are each provided with the objective acceptance unit, the acquisition unit, the structure setting unit, the determination unit, and the notification unit, and one of the plurality of subsystems that is to automatically set the combination structure is changed based on the target state and a current operating state and function of each of the plurality of subsystems.

10. The network system according to claim 1, wherein the processor of at least one of the plurality of subsystems is configured with the program such that, in response to a newly set target state being accepted by the objective acceptance unit, the structure setting unit automatically sets a new combination structure based on the new target state;

the determination unit determines new functions to be executed by the plurality of subsystems based on the new combination structure, and the notification unit notifies the plurality of subsystems of the respective new functions.

11. The network system according to claim 1, wherein the processor of at least one of the plurality of subsystems is configured with the program such that, in response to the own subsystem recognition unit recognizing a change in the operating state of the respective subsystem that affects a role that the subsystem is currently executing in order to achieve the predetermined objective;

the structure setting unit automatically sets a new combination structure based on new operating states of the plurality of subsystems;

the determination unit determines new functions to be executed by the plurality of subsystems based on the new combination structure; and the notification unit notifies the plurality of subsystems of the respective new functions.

12. The network system according to claim 1, wherein each of the plurality of subsystems stores a deactivation condition for stopping operations of the respective subsystem as the function of the respective subsystem, and the processor of at least one of the plurality of subsystems is configured with the program such that:

in response to, the condition for stopping any of the plurality of subsystems being satisfied, the structure setting unit automatically sets a new combination structure based on new operating states of the plurality of subsystems;

the determination unit determines new functions to be executed by the plurality of subsystems based on the new combination structure; and the notification unit notifies the plurality of subsystems of the respective new functions.

13. The network system according to claim 1, wherein the processor of at least one of the plurality of subsystems is configured with the program such that:

in response to a new subsystem being added to the network, the structure setting unit automatically sets a new combination structure based on new operating states of the plurality of subsystems;

the determination unit determines new functions to be executed by the plurality of subsystems based on the new combination structure; and the notification unit notifies the plurality of subsystems of the respective new functions.

14. The network system according to claim 1, wherein the processor of at least one of the plurality of subsystems is configured with the program such that the shared storage unit stores knowledge regarding the combination structure as a plurality of options.

15. The network system according to claim 14, wherein the processor of at least one of the plurality of subsystems is configured with the program to perform operations further comprising operation as a knowledge creation unit that provides knowledge regarding the combination structure based on the target state and the operating state and function of each of the plurality of subsystems using machine learning.

16. The network system according to claim 15, wherein, the processor of at least one of the plurality of subsystems is configured with the program such that, in response to the knowledge regarding the combination structure of functions of the plurality of subsystems necessary for realizing the target state not being stored in the shared storage unit, the knowledge creation unit provides the knowledge regarding the combination structure of functions of the plurality of subsystems by using machine learning.

17. A function setting method for setting functions of subsystems in order to realize a target state for implementing a predetermined objective using a network system in which the subsystems are connected via a network, the function setting method comprising:

accepting a setting of the target state;

holding, by each of the subsystems, a state and a function of the respective subsystem;

acquiring operating states and functions of the subsystems;

automatically setting a combination structure of functions of the plurality of subsystems by performing operations comprising determining whether the function of each of the plurality of subsystems is to be activated, based on: the target state; the operating states and functions of the plurality of subsystems; and knowledge regarding the combination structure of functions of the subsystems necessary for realizing the target state;

determining functions to be executed by the plurality of subsystems based on the automatically set combination structure; and notifying the respective subsystems of the determined functions.

18. A non-transitory computer-readable storage medium storing a function setting program for setting functions of subsystems in order to realize a target state for implementing a predetermined objective using a network system in which the subsystems are connected by a network, the function setting program causing a computer to perform operations comprising:

accepting a setting of the target state;

holding, by each of the subsystems, a state and a function of the respective subsystem;

acquiring operating states and functions of the subsystems;

automatically setting a combination structure of functions of the plurality of subsystems by performing operations comprising determining whether the function of each of the plurality of subsystems is to be activated, based on: the target state; the operating states and functions of the plurality of subsystems; and knowledge regarding the combination structure of functions of the subsystems necessary for realizing the target state;

determining functions to be executed by the plurality of subsystems based on the automatically set combination structure; and notifying the respective subsystems of the determined functions.

\* \* \* \* \*